(12) United States Patent
Jeong et al.

(10) Patent No.: US 10,906,519 B2
(45) Date of Patent: Feb. 2, 2021

(54) ELECTRONIC BRAKE SYSTEM AND METHOD FOR OPERATING THE SAME

(71) Applicant: MANDO CORPORATION, Gyeonggi-do (KR)

(72) Inventors: Hyojin Jeong, Gyeonggi-do (KR); Seong Ho Choi, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 116 days.

(21) Appl. No.: 16/138,969

(22) Filed: Sep. 22, 2018

(65) Prior Publication Data
US 2019/0092302 A1 Mar. 28, 2019

(30) Foreign Application Priority Data

Sep. 25, 2017 (KR) .................. 10-2017-0123547
Sep. 26, 2017 (KR) .................. 10-2017-0124276

(Continued)

(51) Int. Cl.
*B60T 13/68* (2006.01)
*B60T 8/40* (2006.01)
(Continued)

(52) U.S. Cl.
CPC .............. *B60T 13/686* (2013.01); *B60L 7/18* (2013.01); *B60L 7/26* (2013.01); *B60T 8/17* (2013.01);
(Continued)

(58) Field of Classification Search
CPC ..... B60T 7/18; B60T 7/26; B60T 8/17; B60T 8/341; B60T 8/4081; B60T 8/409;
(Continued)

(56) References Cited

U.S. PATENT DOCUMENTS 10,040,438 B2 * 8/2018 Lim ..................... B60T 8/4081
10,071,717 B2 * 9/2018 Kim ..................... B60T 13/745
(Continued)

FOREIGN PATENT DOCUMENTS

EP      2 520 473      11/2012
JP      2006-7874       1/2006
(Continued)

OTHER PUBLICATIONS

Extended European Search Report dated Dec. 14, 2018 for European Patent Application No. 18196618.5.
(Continued)

*Primary Examiner* — Thomas W Irvin
(74) *Attorney, Agent, or Firm* — Ladas & Parry, LLP

(57) ABSTRACT

An electronic brake system and a method for operating the same are disclosed. The electronic brake system includes a hydraulic-pressure supply device and a hydraulic-pressure control unit. The hydraulic-pressure supply device operates a hydraulic piston using an electric signal corresponding to a displacement of a brake pedal, and thus generates hydraulic pressure. The hydraulic-pressure control unit controls hydraulic pressure of a pressure medium supplied to individual wheel cylinders. The electronic brake system controls a plurality of valves mounted to the hydraulic-pressure control unit, and thus performs a normal operation mode, an abnormal operation mode, a regenerative braking mode, and an inspection mode using the valves.

19 Claims, 26 Drawing Sheets

(30) Foreign Application Priority Data

Sep. 29, 2017 (KR) ........................ 10-2017-0127467
Sep. 29, 2017 (KR) ........................ 10-2017-0127532

(51) Int. Cl.

| | | |
|---|---|---|
| B60L 7/18 | (2006.01) | |
| B60L 7/26 | (2006.01) | |
| B60T 8/17 | (2006.01) | |
| B60T 8/34 | (2006.01) | |
| B60T 13/16 | (2006.01) | |
| B60T 13/58 | (2006.01) | |
| B60T 15/02 | (2006.01) | |
| B60T 17/22 | (2006.01) | |
| B60T 8/90 | (2006.01) | |

(52) U.S. Cl.

CPC ............ B60T 8/341 (2013.01); B60T 8/409 (2013.01); B60T 8/4081 (2013.01); B60T 13/165 (2013.01); B60T 13/58 (2013.01); B60T 15/028 (2013.01); B60T 17/221 (2013.01); *B60T 8/90* (2013.01); *B60T 2270/402* (2013.01); *B60T 2270/404* (2013.01); *B60T 2270/406* (2013.01); *B60T 2270/604* (2013.01); *B60T 2270/82* (2013.01)

(58) Field of Classification Search

CPC ...... B60T 13/165; B60T 13/58; B60T 13/686; B60T 13/745; B60T 15/028; B60T 17/22; B60T 17/221; B60T 2270/10; B60T 2270/404; B60T 2270/82; B60T 2270/88

See application file for complete search history.

(56) References Cited

U.S. PATENT DOCUMENTS

| | | | | |
|---|---|---|---|---|
| 10,077,036 | B2* | 9/2018 | Kim | B60T 13/662 |
| 10,166,959 | B2* | 1/2019 | Jeong | B60T 11/232 |
| 10,173,659 | B2* | 1/2019 | Kim | B60T 13/686 |
| 10,442,416 | B2* | 10/2019 | Jung | B60T 13/745 |
| 10,457,261 | B2* | 10/2019 | Jeon | B60T 13/146 |
| 10,513,249 | B2* | 12/2019 | Kim | B60T 8/17 |
| 10,583,819 | B2* | 3/2020 | Kim | B60T 13/662 |
| 10,696,281 | B2* | 6/2020 | Jeong | B60T 15/028 |
| 10,696,286 | B2* | 6/2020 | Jeong | B60T 13/142 |
| 10,752,227 | B2* | 8/2020 | Jung | B60T 8/17 |
| 2012/0169112 | A1 | 7/2012 | Jungbecker et al. | |
| 2017/0106843 | A1* | 4/2017 | Jeong | B60T 11/232 |
| 2017/0144642 | A1* | 5/2017 | Kim | B60T 13/146 |
| 2017/0144643 | A1 | 5/2017 | Kim et al. | |
| 2017/0144644 | A1* | 5/2017 | Kim | B60T 8/4081 |
| 2017/0158180 | A1* | 6/2017 | Kim | B60T 7/042 |
| 2017/0210369 | A1* | 7/2017 | Lim | B60T 7/042 |
| 2017/0334417 | A1* | 11/2017 | Choi | B60T 8/442 |
| 2018/0050670 | A1* | 2/2018 | Feigel | B60T 7/042 |
| 2018/0099652 | A1* | 4/2018 | Jung | B60T 8/00 |
| 2018/0111593 | A1* | 4/2018 | Kim | B60T 8/17 |
| 2018/0111594 | A1* | 4/2018 | Kim | B60T 13/142 |
| 2018/0339690 | A1* | 11/2018 | Kim | B60T 7/042 |
| 2018/0339692 | A1* | 11/2018 | Jeong | B60T 8/172 |
| 2019/0092295 | A1 | 3/2019 | Jeong et al. | |
| 2019/0092300 | A1 | 3/2019 | Jeong et al. | |
| 2019/0092301 | A1 | 3/2019 | Jeong et al. | |
| 2019/0100179 | A1* | 4/2019 | Lee | B60T 13/745 |
| 2019/0100183 | A1* | 4/2019 | Jung | B60T 13/166 |
| 2019/0100185 | A1* | 4/2019 | Jeong | B60T 13/662 |
| 2019/0100186 | A1* | 4/2019 | Jeong | B60T 8/4081 |
| 2019/0100187 | A1* | 4/2019 | Jeong | B60T 13/662 |
| 2019/0135256 | A1* | 5/2019 | Lee | B60T 8/4081 |
| 2019/0232935 | A1* | 8/2019 | Kim | B60T 11/20 |
| 2019/0329749 | A1* | 10/2019 | Jeong | B60T 7/042 |
| 2019/0329751 | A1* | 10/2019 | Jeong | B60T 13/745 |
| 2019/0366997 | A1* | 12/2019 | Jeong | B60T 8/4081 |
| 2020/0079338 | A1* | 3/2020 | Roh | B60T 13/66 |
| 2020/0114893 | A1* | 4/2020 | Kim | B60T 13/662 |

FOREIGN PATENT DOCUMENTS

| | | |
|---|---|---|
| KR | 10-2013-0130710 | 12/2013 |
| KR | 10-2014-0006041 | 1/2014 |
| KR | 10-2015-0028331 | 3/2015 |
| KR | 10-2016-0088382 | 7/2016 |
| KR | 10-2016-0134833 | 11/2016 |
| WO | 2016/087506 | 6/2016 |

OTHER PUBLICATIONS

Extended European Search Report dated Dec. 13, 2018 for European Patent Application No. 18196611.0.

Extended European Search Report dated Dec. 14, 2018 for European Patent Application No. 18196503.9.

Extended European Search Report dated Dec. 14, 2018 for European Patent Application No. 18196272.1.

* cited by examiner

ELECTRONIC BRAKE SYSTEM AND METHOD FOR OPERATING THE SAME

CROSS-REFERENCE TO RELATED APPLICATION

This application is based on and claims priority under 35 U.S.C. § 119 to Korean Patent Application Nos. 2017-0124276, 2017-0127467, 2017-0127532 and 2017-0123547, respectively filed on 26 Sep. 2017, 26 Sep. 2017, 29 Sep. 2017, and 25 Sep. 2017 in the Korean Intellectual Property Office, the disclosure of which is incorporated by reference in its entirety.

BACKGROUND

1. Field

Embodiments of the present disclosure relate to an electronic brake system and a method for operating the same, and more particularly to an electronic brake system for generating braking force using an electrical signal corresponding to a displacement of a brake pedal, and a method for operating the same.

2. Description of the Related Art

A brake system for braking of a vehicle is essentially mounted to a vehicle, and various brake systems have recently been proposed to secure safety of a driver and passengers.

Conventionally, when a driver depresses a brake pedal, a conventional brake system is designed to supply hydraulic pressure needed for braking to wheel cylinders using a booster mechanically connected to the brake pedal. However, as the demand of users who desire to implement various braking functions according to vehicle driving environments is rapidly increasing, an electronic brake system provided with a hydraulic-pressure supply device has recently been developed and rapidly come into widespread use. Once a driver pushes a brake pedal, the hydraulic-pressure supply device of the electronic brake system senses a displacement of the brake pedal through a pedal displacement sensor, and receives an electric signal indicating the driver's braking intention from the pedal displacement sensor, such that hydraulic pressure needed for braking is supplied to wheel cylinders.

When the electronic brake system is in a normal operation mode, a displacement of the brake pedal depressed by the driver is converted into an electric signal, the electric signal is supplied to the hydraulic-pressure supply device, and the hydraulic-pressure supply device is electrically operated and controlled based on the electric signal, such that hydraulic pressure needed for braking is formed and supplied to wheel cylinders. Since the electronic brake system can be electrically operated and controlled as described above, the electronic brake system can implement complicated and various braking actions. However, if technical issues occur in electronic components of the electronic brake system, hydraulic pressure needed for braking is not stably formed, there is a high possibility of threatening the safety of a driver and passengers who ride in the vehicle.

Therefore, if any one of various electronic components embedded in the vehicle abnormally operates or if it is impossible to control the abnormal electronic component, the electronic brake system enters an abnormal operation mode. In this case, there is needed a mechanism in which an operation state of the brake pedal depressed by the driver is directly interoperable with wheel cylinders. That is, during the abnormal operation mode of the electronic brake system, hydraulic pressure needed for braking needs to be immediately formed in response to a pedal effort of the brake pedal depressed by the driver, and the hydraulic pressure needs to be directly supplied to wheel cylinders.

Meanwhile, as the demand of users who desire to use eco-friendly vehicles is rapidly increasing, hybrid vehicles are becoming more and more popular with consumers. Generally, a hybrid vehicle converts kinetic energy generated by vehicle deceleration into electric energy, stores the electric energy in a battery, and supplementarily uses the stored energy during vehicle driving, resulting in increased fuel efficiency. As a result, hybrid vehicles have become prevalent and more popular with consumers.

In order to increase an energy recovery rate, the hybrid vehicle is designed to recover energy using a generator or the like during braking or deceleration of the vehicle, such that this braking operation is referred to as a regenerative braking operation. However, during regenerative braking, this regenerative braking mode may unavoidably affect distribution of brake force applied to a plurality of vehicle wheels, such that oversteer, understeer, or slippage of the wheels may occur, resulting in reduction of vehicle driving stability.

CITED REFERENCE

Patent Document

European Registered Patent No. EP 2 520 473 A1 (Honda Motor Co., Ltd.), (Nov. 7, 2012)

SUMMARY

Therefore, it is an aspect of the present disclosure to provide an electronic brake system for stably distributing and providing brake pressure to wheels of a vehicle during regenerative braking of the vehicle, and a method for operating the same.

It is another aspect of the present disclosure to provide an electronic brake system for efficiently braking a vehicle in various driving situations, and a method for operating the same.

It is another aspect of the present disclosure to provide an electronic brake system for implementing driving stability of a vehicle, and a method for operating the same.

It is another aspect of the present disclosure to provide an electronic brake system capable of stably generating high brake pressure, and a method for operating the same.

It is another aspect of the present disclosure to provide an electronic brake system for improving performance and operational stability of a product, and a method for operating the same.

It is another aspect of the present disclosure to provide an electronic brake system for improving product durability by reducing load applied to electronic components, and a method for operating the same.

It is another aspect of the present disclosure to provide an electronic brake system for reducing the size of a product and the number of electronic components of the product, and a method for operating the same.

Additional aspects of the invention will be set forth in part in the description which follows and, in part, will be obvious from the description, or may be learned by practice of the invention.

In accordance with an aspect of the present disclosure, an electronic brake system includes a hydraulic-pressure supply device configured to generate a hydraulic pressure by operating a hydraulic piston using an electric signal that is output in response to a displacement of a brake pedal, and include not only a first pressure chamber formed at one side of the hydraulic piston movably disposed in a cylinder block, but also a second pressure chamber formed at the other side of the hydraulic piston, and a hydraulic control unit configured to include not only a first hydraulic circuit to control a hydraulic pressure applied to two wheel cylinders, but also a second hydraulic circuit to control a hydraulic pressure applied to two other wheel cylinders. The hydraulic control unit includes a first hydraulic passage configured to communicate with the first pressure chamber, second and third hydraulic passages branched from the first hydraulic passage, and respectively connected to the first and second hydraulic circuits, a fourth hydraulic passage connected to the second hydraulic passage while communicating with the second pressure chamber, a fifth hydraulic passage configured to connect the second hydraulic passage to the third hydraulic passage, and a sixth hydraulic passage configured to connect the second hydraulic passage to the fifth hydraulic passage.

The hydraulic control unit may include first and second valves provided in the second hydraulic passage to control flow of a pressure medium, a third valve provided in the third hydraulic passage to control flow of a pressure medium, a fourth valve provided in the fourth hydraulic passage to control flow of a pressure medium, a fifth valve disposed between one position connected to the sixth hydraulic passage on the fifth hydraulic passage and another position connected to the second hydraulic passage on the fifth hydraulic passage, a sixth valve disposed between one position connected to the sixth hydraulic passage on the fifth hydraulic passage and another position connected to the third hydraulic passage on the fifth hydraulic passage, and a seventh valve provided in the sixth hydraulic passage.

Each of the second, fourth, and seventh valves may be provided as a solenoid valve to control bidirectional flow of the pressure medium. The first valve may be provided as a check valve that allows only flow of the pressure medium flowing from the first pressure chamber to the first hydraulic circuit. The third valve may be provided as a check valve that allows only flow of the pressure medium flowing from the first pressure chamber to the second hydraulic circuit. The fifth valve may be provided as a check valve that allows only flow of the pressure medium flowing from the second hydraulic passage to the position connected to the sixth hydraulic passage. The sixth valve may be provided as a check valve that allows only flow of the pressure medium flowing from the third hydraulic passage to the position connected to the sixth hydraulic passage.

The electronic brake system may further include a generator provided in two wheel cylinders of the first hydraulic circuit.

The electronic brake system may further include a reservoir configured to store a pressure medium therein, a master cylinder configured to include a master chamber and a master piston, wherein the master piston is provided to form a displacement changeable by operation of a brake pedal, pressurizes the pressure medium stored in the master chamber, and discharges the pressurized pressure medium, a simulation device configured to include a simulation chamber and a simulation piston, wherein the simulation piston is provided to form a displacement changeable by the pressure medium discharged from the master chamber, pressurizes the pressure medium stored in the simulation chamber, and discharges the pressurized pressure medium, and a reservoir passage through which the master chamber, the simulation chamber, and the reservoir communicate with one another.

The electronic brake system may further include a simulator check valve provided in the reservoir passage, and allows the pressure medium to flow in only one direction from the reservoir to the master chamber and the simulation chamber, and a simulator valve provided in a bypass passage connected parallel to the simulator check valve on the reservoir passage, and configured to control flow of bidirectional flow of the pressure medium.

The master piston may include a first master piston directly pressurized by the brake pedal and a second master piston indirectly pressurized by the first master piston. The master chamber may include a first master chamber in which the first master piston is disposed and a second master chamber in which the second master piston is disposed. The simulation piston may be provided to form a displacement by operation of the pressure medium that is pressurized and discharged from the first master chamber. The reservoir passage may be provided to allow the first master chamber, the simulation chamber, and the reservoir to communicate with one another.

The simulation device may further include a reaction force spring configured to elastically support the simulation piston.

The electronic brake system may further include a first dump passage configured to connect the first pressure chamber to the reservoir, a second dump passage configured to connect the second pressure chamber to the reservoir, a first dump valve provided in the first dump passage to control flow of a pressure medium, and provided as a check valve that allows only flow of a pressure medium flowing from the reservoir to the first pressure chamber, a second dump valve provided in the second dump passage to control flow of a pressure medium, and provided as a check valve that allows only flow of a pressure medium flowing from the reservoir to the second pressure chamber, and a third dump valve provided in a bypass passage connected parallel to the second dump valve on the second dump passage so as to control flow of a pressure medium, and provided as a solenoid valve that controls bidirectional flow of the pressure medium flowing between the reservoir and the second pressure chamber.

The electronic brake system may further include a first backup passage configured to connect the first master chamber to the first hydraulic circuit, a second backup passage configured to connect the second master chamber to the second hydraulic circuit, a first cut valve provided in the first backup passage to control flow of a pressure medium, and a second cut valve provided in the second backup passage to control flow of a pressure medium.

The second valve may be disposed between the first hydraulic circuit and a specific position connected to the fourth hydraulic passage on the second hydraulic passage.

The second valve may be disposed between one position where the first valve is provided on the second hydraulic passage and another position connected to the fourth hydraulic passage on the second hydraulic passage.

The hydraulic control unit may further include a seventh hydraulic passage branched from the fourth hydraulic passage, and connected to the third hydraulic passage.

The hydraulic control unit may include a first valve provided in the second hydraulic passage to control flow of a pressure medium, a second valve provided in the third hydraulic passage to control flow of a pressure medium, a third valve provided in the fourth hydraulic passage to control flow of a pressure medium, a fourth third valve provided in the fifth hydraulic passage to control flow of a pressure medium, a fifth valve provided in the sixth hydraulic passage to control flow of a pressure medium, and a sixth valve provided in the seventh hydraulic passage to control flow of a pressure medium.

Each of the first and second valves may be provided as a check valve that allows only flow of a pressure medium flowing from the first pressure chamber to the first and second hydraulic circuits. The sixth valve may be provided as a check valve that allows only flow of a pressure medium flowing from the second pressure chamber to the third hydraulic passage. Each of the third, fourth, and fifth valves may be provided as a solenoid valve to control bidirectional flow of a pressure medium.

The hydraulic control unit may include a first valve provided in the second hydraulic passage to control flow of a pressure medium, a second valve provided in the third hydraulic passage to control flow of a pressure medium, a third valve provided in the fourth hydraulic passage to control flow of a pressure medium, a fourth valve disposed between one position connected to the sixth hydraulic passage on the fifth hydraulic passage and another position connected to the second hydraulic passage on the fifth hydraulic passage, and configured to control flow of a pressure medium, a fifth valve disposed between one position connected to the sixth hydraulic passage on the fifth hydraulic passage and another position connected to the third hydraulic passage on the fifth hydraulic passage, and configured to control flow of a pressure medium, a sixth valve provided in the sixth hydraulic passage to control flow of a pressure medium, and a seventh valve provided in the seventh hydraulic passage to control flow of a pressure medium.

Each of the first and second valves may be provided as a check valve that allows only flow of the pressure medium flowing from the first pressure chamber to the first and second hydraulic circuits. The fourth valve may be provided as a check valve that allows only flow of the pressure medium flowing from the position connected to the second hydraulic passage to the other position connected to the sixth hydraulic passage. The fifth valve may be provided as a check valve that allows only flow of the pressure medium flowing from the position connected to the third hydraulic passage to the other position connected to the sixth hydraulic passage. The seventh valve may be provided as a check valve that allows only flow of the pressure medium flowing from the second pressure chamber to the third hydraulic passage. Each of the third and sixth valves may be provided as a solenoid valve to control bidirectional flow of the pressure medium.

Each of the first and second valves may be provided as a check valve that allows only flow of a pressure medium flowing from the first pressure chamber to the first and second hydraulic circuits. The third valve may be provided as a check valve that allows only flow of a pressure medium flowing from the second pressure chamber to the second hydraulic passage. The fourth valve may be provided as a check valve that allows only flow of a pressure medium flowing from the position connected to the second hydraulic passage to the other position connected to the sixth hydraulic passage. The fifth valve may be provided as a check valve that allows only flow of a pressure medium flowing from the position connected to the third hydraulic passage to the other position connected to the sixth hydraulic passage. The seventh valve may be provided as a check valve that allows only flow of a pressure medium flowing from the second pressure chamber to the third hydraulic passage. The sixth valve may be provided as a solenoid valve to control bidirectional flow of a pressure medium.

The hydraulic control unit may further include an eighth valve disposed between the first valve and the first hydraulic circuit on the second hydraulic passage so as to control flow of a pressure medium, wherein the eighth valve is provided as a solenoid valve to control bidirectional flow of a pressure medium.

The electronic brake system may further include a generator provided in two wheel cylinders of the first hydraulic circuit.

The eighth valve may be disposed between one position connected to the fourth hydraulic passage on the second hydraulic passage and another position connected to the first hydraulic passage on the second hydraulic passage.

The eighth valve may be disposed between one position where the first valve is provided on the second hydraulic passage and another position connected to the fourth hydraulic passage on the second hydraulic passage.

A method for operating the electronic brake system may include performing a normal operation mode. The normal operation mode is classified into a low-pressure mode for providing a relatively low hydraulic pressure and a high-pressure mode for providing a relatively high hydraulic pressure according to a level of a hydraulic pressure flowing from the hydraulic-pressure supply device to the wheel cylinders, and controls the low-pressure mode and the high-pressure mode to be sequentially carried out according to the level of the hydraulic pressure flowing from the hydraulic-pressure supply device to the wheel cylinders.

The low-pressure mode may include opening the second valve, and supplying a hydraulic pressure formed in the first pressure chamber by forward movement of the hydraulic piston to the first hydraulic circuit and the second hydraulic circuit.

The high-pressure mode may include opening the second valve, after lapse of the low-pressure mode, supplying some parts of the hydraulic pressure formed in the first pressure chamber by forward movement of the hydraulic piston, opening the fourth valve to the first hydraulic circuit and the second hydraulic circuit, and supplying some parts of a remaining hydraulic pressure of the hydraulic pressure formed in the first pressure chamber to the second pressure chamber.

A method for operating the electronic brake system includes performing a normal operation mode provided with a regenerative braking mode in which two wheel cylinders provided at the first hydraulic circuit perform a regenerative braking mode using the generator. The regenerative braking mode closes the second valve and thus prevents a hydraulic pressure from flowing into the first hydraulic circuit.

A method for operating the electronic brake system may include performing an abnormal operation mode. The abnormal operation mode includes opening the first cut valve in a manner that the first master chamber communicates with the first hydraulic circuit, and opening the second cut valve in a manner that the second master chamber communicates with the second hydraulic circuit.

A method for operating the electronic brake system may include performing a normal operation mode. The normal operation mode includes opening the simulator valve, and generating a displacement of the simulation piston by the pressure medium discharged from the first master chamber, and allowing the pressure medium stored in the simulation chamber to flow into the reservoir through the reservoir passage.

A method for operating the electronic brake system may include performing an inspection mode in which presence or absence of a leak in the master cylinder or in the simulator valve is confirmed. The inspection mode includes closing the closing the simulator valve and the second cut valve, and opening the first cut valve, supplying a hydraulic pressure generated by activation of the hydraulic-pressure supply device to the first master chamber, and comparing an estimated pressing-medium hydraulic pressure value scheduled to be generated based on a displacement of the hydraulic piston with a hydraulic pressure value of a pressure medium supplied to the first master chamber.

A method for operating the electronic brake system may include performing a normal operation mode. The normal operation mode is classified into a low-pressure mode for providing a relatively low hydraulic pressure and a high-pressure mode for providing a relatively high hydraulic pressure according to a level of a hydraulic pressure flowing from the hydraulic-pressure supply device to the wheel cylinders, and controls the low-pressure mode and the high-pressure mode to be sequentially carried out according to the level of the hydraulic pressure flowing from the hydraulic-pressure supply device to the wheel cylinders.

The low-pressure mode may include opening the fourth and fifth valves, and supplying a hydraulic pressure formed in the first pressure chamber by forward movement of the hydraulic piston to the first hydraulic circuit and the second hydraulic circuit.

The high-pressure mode may include opening the fourth and fifth valves, after lapse of the low-pressure mode, supplying some parts of the hydraulic pressure formed in the first pressure chamber by forward movement of the hydraulic piston to the first hydraulic circuit and the second hydraulic circuit, opening the third valve, and supplying some parts of a remaining hydraulic pressure of the hydraulic pressure formed in the first pressure chamber to the second pressure chamber.

A method for operating the electronic brake system may include performing a normal operation mode. The normal operation mode is classified into a low-pressure mode for providing a relatively low hydraulic pressure and a high-pressure mode for providing a relatively high hydraulic pressure according to a level of a hydraulic pressure flowing from the hydraulic-pressure supply device to the wheel cylinders, and controls the low-pressure mode and the high-pressure mode to be sequentially carried out according to the level of the hydraulic pressure flowing from the hydraulic-pressure supply device to the wheel cylinders.

The low-pressure mode may include opening the sixth valve, and supplying a hydraulic pressure formed in the first pressure chamber by forward movement of the hydraulic piston to the first hydraulic circuit and the second hydraulic circuit.

The high-pressure mode may include opening the sixth valve, after lapse of the low-pressure mode, supplying some parts of the hydraulic pressure formed in the first pressure chamber by forward movement of the hydraulic piston to the first hydraulic circuit and the second hydraulic circuit, opening the third valve, and supplying some parts of a remaining hydraulic pressure of the hydraulic pressure formed in the first pressure chamber to the second pressure chamber.

A method for operating the electronic brake system may include performing a normal operation mode provided with a regenerative braking mode in which two wheel cylinders provided at the first hydraulic circuit perform a regenerative braking mode using the generator. The regenerative braking mode closes the eighth valve and prevents a hydraulic pressure from flowing into the first hydraulic circuit.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
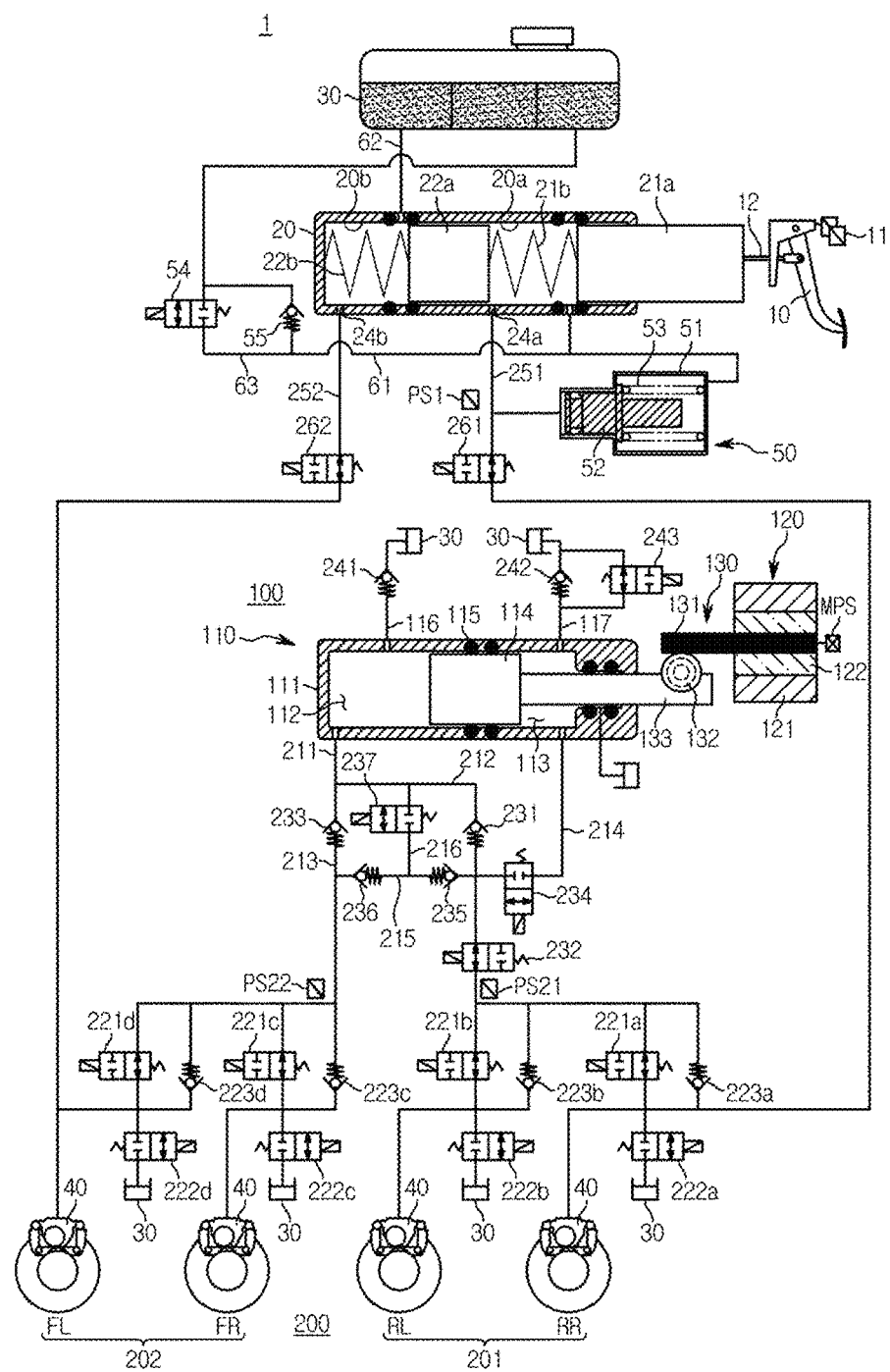
FIG. 1 is a hydraulic circuit diagram illustrating an electronic brake system according to a first embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

FIG. 1 is a hydraulic circuit diagram illustrating an electronic brake system 1 according to a first embodiment of the present disclosure.

Referring to FIG. 1, the electronic brake system 1 may include a master cylinder 20 to pressurize and discharge a pressure medium (e.g., brake fluid) included therein according to a pedal effort of a brake pedal 10 depressed by a driver of a vehicle, a reservoir 30 formed to communicate with the master cylinder 20 to store the pressure medium, one or more wheel cylinders 40 to perform braking of respective wheels RR, RL, FR, and FL upon receiving hydraulic pressure generated by the pressure medium, a simulation device 50 to provide the driver with reaction force corresponding to a pedal effort of the brake pedal 10, a hydraulic-pressure supply device 100 to generate hydraulic pressure of a pressure medium by mechanically operating upon receiving an electric signal indicating the driver's braking intention from a pedal displacement sensor 11 sensing displacement of the brake pedal 10, a hydraulic control unit 200 to control hydraulic pressure applied to the wheel cylinders 40, and an electronic control unit (ECU) (not shown) to control the hydraulic-pressure supply device 100 and various valves based on hydraulic pressure information and pedal displacement information.

The master cylinder 20 may be configured to have at least one chamber, such that the master cylinder 20 may pressurize and discharge the pressure medium therein. The master cylinder 20 may include a first master chamber 20a, a second master chamber 20b, a first master piston 21a provided in the first master chamber 20a, and a second master piston 22a provided in the second master chamber 20b.

The first master chamber 20a may include the first master piston 21a connected to the input rod 12, and the second master chamber 20b may include the second master piston 22a. The first master chamber 20a may communicate with a first hydraulic port 24a through which a pressure medium (i.e., fluid) is input and output. The second master chamber 20b may communicate with a second hydraulic port 24b through which a pressure medium (i.e., fluid) is input and output. For example, the first hydraulic port 24a may be connected to a first backup passage 251, and the second hydraulic port 24b may be connected to a second backup passage 252. Meanwhile, the first master chamber 20a may include a third hydraulic port 24c connected to a first reservoir passage 61.

The master cylinder 20 according to a first embodiment of the present disclosure may include two master chambers 20a and 20b configured to be independent of each other, such that the master cylinder 20 may secure safety in the event of malfunction. For example, the first master chamber 20a of the two master chambers 20a and 20b may be connected to the rear left wheel RL and the rear right wheel RR, and the other master chamber 20b may be connected to the front left wheel FL and the front right wheel RR of the vehicle, such that braking of the vehicle remains possible even when one of the two master chambers malfunctions.

For example, one of the two master chambers may be connected to the front left wheel FL and the rear left wheel RL, and the other master chamber may be connected to the rear right wheel RR and the front right wheel FR. One of the two master chambers may be connected to the front left wheel FL and the rear left wheel RL, and the other master chamber may be connected to the front left wheel FL and the rear left wheel RL. In other words, wheels connected to the master chambers of the master cylinder 20 may not be limited to any one structure and may also be located at various positions.

A first spring 21b may be disposed between the first master piston 21a and the second master piston 22a of the master cylinder 20, and a second spring 22b may be disposed between the second master piston 22a and one end of the master cylinder 20. That is, the first master piston 21b may be contained in the first master chamber 20a, and the second mater piston 22b may be contained in the second master chamber 20b.

The first spring 21b and the second spring 22b may be compressed by the first master piston 21a and the second master piston 22a that move in response to change of displacement of the brake pedal 10 depressed by the driver. When the driver takes their foot off the brake pedal 10 to release the pedal effort applied to the brake pedal 10, the first spring 21b and the second spring 22b may be expanded by elastic force, such that the first master piston 21a and the second piston 221 can move back to original positions thereof.

Meanwhile, the brake pedal 10 may be coupled to the first master piston 21a of the master cylinder 20 through the input rod 12. The input rod 12 may be directly coupled to the first master piston 21a, or may closely contact the first master piston 21a. Therefore, the brake pedal 10 depressed by the driver may directly pressurize the master cylinder 20 without a pedal free stroke region.

The first master chamber 20a together with a simulation chamber 51 of a simulation device 50 may be connected to the reservoir 30 through a first reservoir passage 61, and the second master chamber 20b may be connected to the reservoir 30 through a second reservoir passage 62. The first reservoir passage 61 may be connected to the rear end of the simulation chamber 51 of the simulation device 50 such that the rear end of the simulation chamber 51 may communicate with the first master chamber 20a and the reservoir 30. The first reservoir passage 61 may include a bypass passage 63, a simulator valve 54, and a check valve 55, and a detailed description thereof will be described later.

The master cylinder 20 may include two sealing members 25a and 25b that are connected to the first master chamber 20a and are respectively disposed before and after the first reservoir passage 61, and two other sealing members 25c and 25d respectively disposed before and after of the second reservoir passage 62.

Each of the four sealing members 25a, 25b, 25c, and 25d may be formed in a ring shape protruding from the inner surface of the master cylinder 20 or the outer circumference of the first or second master piston 21a or 22a.

The simulation device 50 may be connected to a first backup passage 251, may receive hydraulic pressure from the first master chamber 20a, and may thus provide reaction force corresponding to a pedal effort of the brake pedal 10. The simulation device 50 may provide reaction force corresponding to a pedal effort of the brake pedal 10 depressed by the driver, and may provide pedal feel to the driver, such that the brake pedal 10 can more precisely operate and braking force can also be precisely adjusted as intended by the driver.

Figure 2:
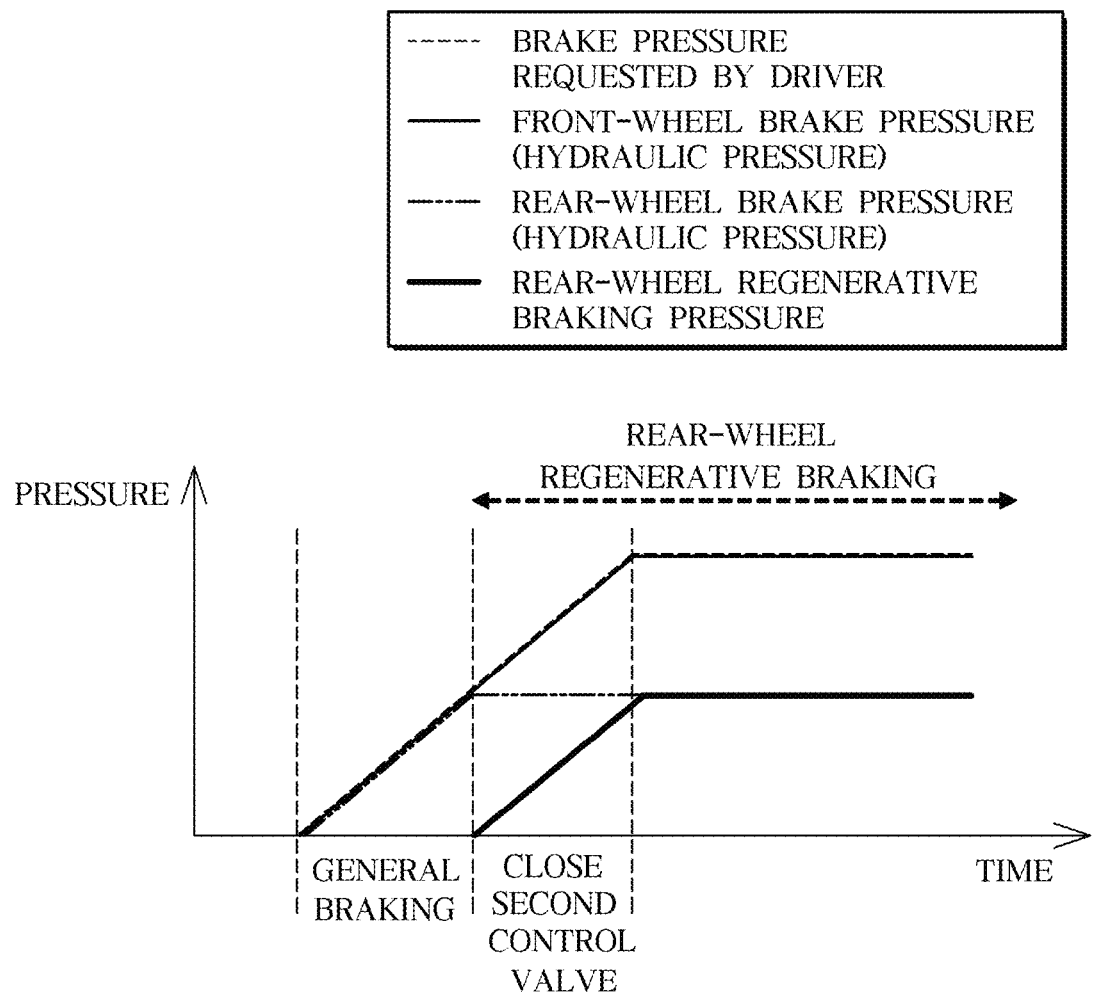
FIG. 2 is a graph illustrating characteristics of hydraulic pressures and regenerative brake pressures of wheel cylinders during regenerative braking based on the electronic brake system according to a first embodiment of the present disclosure.

Referring to FIGS. 1 and 2, the simulation device 50 may include a simulation piston 52, a simulation chamber 51, a pedal simulator, a simulator valve 54. The simulation piston 52 may be configured to provide a displacement thereof using a pressure medium discharged from the hydraulic port 24a. By the displacement of the simulation piston 52, a pressure medium stored in the simulation chamber 51 is pressurized or discharged. The pedal simulator may be provided with a reaction force spring 52 that elastically supports the simulation piston 52. The simulator valve 54 may be arranged at a downstream side of the simulation chamber 51 on the first reservoir passage 61.

The simulation piston 52 and the reaction force spring 53 may be installed to have a predetermined range of displacement within the simulation chamber 51 by the pressure medium that flows from the first master chamber 20a to the simulation chamber 51 through a first backup passage 251. The simulator valve 54 may be connected parallel to a check valve 55 on a first reservoir passage 61 that connects the rear end of the simulation chamber 51 to the reservoir 30. Therefore, the simulation chamber 51 can receive the pressure medium from the reservoir 30 even when the simulation piston 52 moves back to the original position thereof by the check valve 55, such that the simulation chamber 51 may always be fully filled with the pressure medium.

Meanwhile, the reaction force spring 53 is merely an example capable of supplying elastic force to the simulation piston 52, and may be implemented as any of other examples capable of storing elastic force therein. For example, the reaction force spring 53 may be formed of a material such as rubber, or may include various members formed in a coil or plate shape to store elastic force therein.

The check valve 55 allows a pressure medium to flow from the reservoir 30 to the first master chamber 20a and the simulation chamber 51, and prevents a pressure medium from flowing from the first master chamber 20a and the simulation chamber 51 to the reservoir 30. In other words, the check valve 55 may be provided to allow the pressure medium to flow in only one direction from the reservoir 30 to the first master chamber 20a and the simulation chamber 51.

The first reservoir passage 61 may be provided with a bypass passage connected parallel to the check valve 55. The simulator valve 54 for controlling bidirectional flow of the pressure medium may be provided in the bypass passage 63. In more detail, the bypass passage 63 may be provided as a detour on the first reservoir passage 61 such that a front end of the check valve 55 is connected to a rear end of the check valve through the bypass passage 63 acting as the detour. The simulator valve 54 may be implemented as a normally closed (NC) solenoid valve that remains closed in a normal state and is then closed upon receiving an opening signal from an electronic control unit (ECU).

If a pedal effort is applied to the brake pedal 10 by the driver of the vehicle, the simulator valve 54 is open, a pressure medium stored in the rear side (i.e., a right side of the simulation piston in FIG. 1) of the simulation piston 52 of the simulation chamber 51 is transmitted to the reservoir 30 through the first reservoir passage 61, such that the pressure medium stored in the first master chamber 20a is transmitted to the front side (i.e., a left side of the simulation piston in FIG. 1) of the simulation piston 52 included in the simulation chamber 51. As a result, the reaction force spring 53 is compressed such that proper pedal feel can be provided to the driver.

Meanwhile, when the first master piston 21a moves forward by the brake pedal 10 depressed by the driver, the third hydraulic port 24c may be blocked and sealed by the first master piston 21a and two sealing members 25a and 25b, such that the pressure medium stored in the rear side of the simulation piston 52 can be prevented from flowing again into the first master chamber 20a through the first reservoir passage 61.

The simulation device 50 may operate as follows. If a pedal effort is applied to the brake pedal 10 by the driver of the vehicle, the simulator valve 54 is open, and the first master piston 21a moves, such that the pressure medium stored in the first master chamber 20a may be transmitted to the front end of the simulation piston 52 of the simulation chamber 51, resulting in formation of a displacement in the simulation piston 51. In this case, the pressure medium stored in the rear end of the simulation piston 52 of the simulation chamber 51 moves along the first reservoir passage 61 that is open by the open simulator valve 54, and then arrives at the reservoir 30. Thereafter, the simulation piston 42 compresses the reaction force spring 53, a reaction force caused by the compressed reaction force spring 53 may allow the driver to feel a pedal effort (i.e., pedal feel).

If the driver takes their foot off the brake pedal 10 to release the pedal effort applied to the brake pedal 10, the reaction force spring 53 is expanded by elastic force such that the reaction force piston 52 may move back to an original position thereof. The pressure medium filling the front side of the reaction force piston 52 of the simulation chamber 51 may be discharged to the first master chamber 20a or the first backup passage 251 through the simulator valve 54 or the simulator check valve 55. In this case, the rear side of the reaction force piston 52 provided in the simulation chamber 51 may receive the pressure medium from the reservoir 30 through the first reservoir passage 61, such that the simulation chamber 51 may be fully filled with the pressure medium again.

As described above, the simulation chamber 51 is always filled with the pressure medium. Therefore, frictional force of the simulation piston 52 is minimized during operation of the simulation device 50, such that durability of the simulation device 50 can be improved and foreign materials from the outside can be prevented from flowing into the simulation device 50.

The simulator valve 54 may also be used as an inspection valve that is designed to operate in an inspection mode of the electronic brake system 1. A detailed description thereof will be described later.

Meanwhile, several reservoirs 30 may be shown in the drawings, and the respective reservoirs 30 may be denoted by the same reference number. However, the reservoirs 30 may be implemented as the same or different components. For example, the reservoir 30 connected to the simulation device 50 may be identical to the reservoir 30 connected to the master cylinder 20, or may store a pressure medium therein in a different way from the reservoir 30 connected to the master cylinder 20.

The hydraulic-pressure supply device 100 may mechanically operate by receiving an electrical signal indicating the driver's braking intention from the pedal displacement sensor 11 sensing displacement of the brake pedal 10, such that hydraulic pressure caused by the pressure medium may occur.

The hydraulic-pressure supply device 100 may include a hydraulic-pressure providing unit 110 to supply pressing-medium pressure to wheel cylinders 40, a motor 120 to produce rotational force according to an electrical signal from the pedal displacement sensor 11, and a power switching unit 130 to convert rotational motion of the motor 120 into rectilinear motion and to provide the rectilinear motion to the hydraulic-pressure providing unit 110. In this case, the hydraulic-pressure providing unit 110 may also operate by pressure supplied from a high-pressure accumulator, instead of using driving force supplied from the motor 120.

The hydraulic-pressure providing unit 110 may include a cylinder block 111, a hydraulic piston 114, one or more sealing members 115, and a drive shaft 133. The cylinder block 111 may have a pressure chamber to store a pressure medium supplied thereto. The hydraulic piston 114 may be provided in the cylinder block 111. The sealing member 115 may be disposed between the hydraulic piston 114 and the cylinder block 111 to seal the pressure chamber. The drive shaft 133 may transfer power from the power switching unit 130 to the hydraulic piston 114.

The pressure chamber may include a first pressure chamber 112 located at a front side (i.e., a forward direction, see a left side of the hydraulic piston in FIG. 1) of the hydraulic piston 114, and a second pressure chamber 113 located at a rear side (i.e., a backward direction, see a right side of FIG. 1) of the hydraulic piston 114. That is, the first pressure chamber 112 may be divided by the cylinder block 111 and the front end of the hydraulic piston 114, and may have a volume changeable according to movement of the hydraulic piston 114. The second pressure chamber 113 may be divided by the cylinder block 111 and the rear end of hydraulic piston 114, and may have a volume changeable according to movement of the hydraulic piston 114.

The first pressure chamber 112 may be connected to a first hydraulic passage 211 through a first communication hole 111a formed at the cylinder block 111. The second pressure chamber 113 may be connected to a sixth hydraulic passage 214 through a second communication hole 111b formed at the cylinder block 111.

The sealing member may include a piston sealing member 115 and a drive-shaft sealing member. The piston sealing member 115 may be disposed between the hydraulic piston 114 and the cylinder block 111 to seal a gap between the first pressure chamber 112 and the second pressure chamber 113. The drive-shaft sealing member (not shown) may be disposed between the drive shaft 113 and the cylinder block 111 to seal a gap between the second pressure chamber 113 and the opening of the cylinder block 111. Hydraulic pressure or negative pressure of the first and second pressure chambers 112 and 113 affected by forward or backward movement of the hydraulic piston 114 may be blocked by the piston sealing member 115, so that the resultant hydraulic pressure or negative pressure of the first and second pressure chambers 112 and 113 can be transmitted to the first and sixth hydraulic passages 211 and 214 without leaking to the second pressure chamber 113. Hydraulic pressure or negative pressure of the second pressure chamber 113 affected by forward or backward movement of the hydraulic piston 114 may be blocked by the drive-shaft sealing member, so that the resultant hydraulic pressure or negative pressure of the second pressure chamber 113 may not leak to the outside of the cylinder block 111.

The first pressure chamber 112 may be connected to the reservoir 30 through the first dump passage 116, such that the first pressure chamber 112 may receive a pressure medium from the reservoir 30 and store the received pressure medium or may transmit the pressure medium of the first pressure chamber 112 to the reservoir 30. The second pressure chamber 113 may be connected to the reservoir 30 through the second dump passage 117, such that the second pressure chamber 113 may receive a pressure medium from the reservoir 30 and store the received pressure medium or may transmit the pressure medium of the second pressure chamber 113 to the reservoir 30. To this end, the first dump passage 116 may communicate with the first pressure chamber 112 through a third communication hole 111c formed in the cylinder block 111, and may be connected to the reservoir 30. The second dump passage 117 may communicate with the second pressure chamber 113 through a fourth communication hole 111d formed in the cylinder block 111, and may be connected to the reservoir 30.

The motor 120 may produce driving force according to an electric signal from the ECU. The motor 120 may include a stator 121 and a rotor 122, and may rotate in a forward or backward direction using the stator 121 and the rotor 122, such that the motor 120 may produce power or force through which displacement of the hydraulic piston 114 occurs. A rotational angular speed and a rotation angle of the motor 120 may be precisely controlled by a motor control sensor (MPS). The motor 120 is well known to those skilled in the art, and as such a detailed description thereof will herein be omitted for convenience of description.

The power switching unit 130 may convert rotational force of the motor 120 into rectilinear movement. For example, the power switching unit 130 may include a worm shaft 131, a worm wheel 132, and a drive shaft 133.

The worm shaft 131 may be integrated with a rotational shaft of the motor 120. At least one worm may be formed at the outer circumference of the worm shaft 131 in a manner that the worm shaft 131 is meshed with the worm wheel 132 so that the worm wheel 132 can rotate. The worm wheel 132 may be meshed with the drive shaft 133 so that the drive shaft 133 performs rectilinear motion. The drive shaft 133 is connected to the hydraulic piston 114, such that the hydraulic piston 114 may slidably move within the cylinder block 111.

In more detail, a signal sensed by the pedal displacement sensor 11 due to displacement of the brake pedal 10 may be transmitted to the ECU, and the ECU may operate the motor 120 in one direction so that the worm shaft 131 may also rotate in one direction. Rotational force of the worm shaft 131 may be transmitted to the drive shaft 133 through the worm wheel 132, and the hydraulic piston 114 connected to the drive shaft 133 moves forward, so that hydraulic pressure may occur in the first pressure chamber 112.

In contrast, when a pedal effort is removed from the brake pedal 10, the ECU may operate the motor 120 so that the worm shaft 131 may rotate in the opposite direction. Accordingly, the worm wheel 132 may also rotate in the opposite direction, and the hydraulic piston 114 connected to the drive shaft 133 moves backward, thereby generating negative pressure in the first pressure chamber 112.

Hydraulic pressure and negative pressure may also occur in other directions opposite to the above-mentioned directions as necessary. In other words, a signal sensed by the pedal displacement sensor 11 due to displacement of the brake pedal 10 may be transmitted to the ECU, and the ECU may operate the motor 120 in an opposite direction so that the worm shaft 131 may also rotate in the opposite direction. Rotational force of the worm shaft 131 may be transmitted to the drive shaft 133 through the worm wheel 132, and the hydraulic piston 114 connected to the drive shaft 133 moves backward, so that hydraulic pressure may occur in the second pressure chamber 113.

In contrast, when a pedal effort is removed from the brake pedal 10, the ECU may operate the motor 120 in one direction so that the worm shaft 131 may also rotate in one direction. Accordingly, the worm wheel 132 may also rotate in the opposite direction, and the hydraulic piston 114 connected to the drive shaft 133 moves forward, thereby generating negative pressure in the second pressure chamber 113.

As described above, according to a rotation direction of the worm shaft 131 affected by driving of the motor 120, hydraulic pressure may occur in the first pressure chamber 112 or negative pressure may occur in the second pressure chamber 113. Information as to whether to brake the vehicle using hydraulic pressure or information as to whether to release braking using negative pressure may be determined by controlling several valves. A detailed description thereof will hereinafter be described.

Although not shown in the drawings, the power switching unit 130 may also be formed of a ball-screw-nut assembly. For example, the power switching unit 130 may include a screw that is integrated with a rotational shaft of the motor 120 or rotates with the rotational shaft of the motor 120, and a ball nut that is screw-coupled to the screw in a restricted rotation state and performs rectilinear motion according to rotation of the screw. The above-mentioned ball-screw-nut assembly is well known to those skilled in the art, and as such a detailed description thereof will herein be omitted. In addition, the power switching unit 130 may be implemented not only as the ball-screw-nut assembly, but also as any structure capable of converting rotational force into rectilinear motion without departing from the scope and spirit of the present disclosure.

The hydraulic control unit 200 may be provided to control hydraulic pressure applied to wheel cylinders 40, and the ECU may be provided to control the hydraulic-pressure supply device 100 and various valves based on hydraulic pressure information and pedal displacement information.

The hydraulic control unit 200 may include a first hydraulic circuit 201 to control flow of hydraulic pressure applied to two wheel cylinders 40, and a second hydraulic circuit 202 to control flow of hydraulic pressure applied to two other wheel cylinders 40. The hydraulic control unit 200 may include a plurality of flow passages and a plurality of valves to control hydraulic pressure flowing from the hydraulic-pressure supply device 100 to the wheel cylinders 40.

Referring back to FIG. 1, the hydraulic control unit 200 will hereinafter be described.

Referring to FIG. 1, the first hydraulic passage 211 may be provided to connect the first pressure chamber 112 to the first and second hydraulic circuits 201 and 202. The first hydraulic passage 211 may be branched into a second hydraulic passage 212 communicating with the first hydraulic circuit 201 and a third hydraulic passage 213 communicating with the second hydraulic circuit 202. As a result, hydraulic pressure generated by the first pressure chamber 112 according to forward movement of the hydraulic piston 114 may be transmitted to the first hydraulic circuit 201 and the second hydraulic circuit 202 through the first hydraulic passage 211 and the third hydraulic passage 213.

A second valve 231 and a first valve 232 to control flow of a pressure medium may be sequentially provided in the second hydraulic passage 212. The second valve 231 may be provided as a check valve that allows the pressure medium to flow from the first pressure chamber 112 to the first hydraulic circuit 201 and prevents the pressure medium from flowing from the first hydraulic circuit 201 to the first pressure chamber 112. That is, the second valve 231 may allow a hydraulic pressure produced in the first pressure chamber 112 to flow into the first hydraulic circuit 201, and may prevent a hydraulic pressure produced in the first hydraulic circuit 201 from leaking to the first pressure chamber 112 through the second hydraulic passage 212.

The first valve 232 may be provided at the rear end of a specific position connected to the fourth hydraulic passage 214 on the second hydraulic passage 212. The first valve 232 may be implemented as a bidirectional valve to control flow of the pressure medium received through the second hydraulic passage 212. The first valve 232 may be implemented as a normally open (NO) solenoid valve that remains open in a normal state and is then open upon receiving a closing signal from the ECU.

The first valve 232 may be disposed between the pressure chamber of the hydraulic pressure generator and at least one wheel cylinder to be used for regenerative braking, such that the first valve 232 may selectively connect the pressure chamber to the corresponding hydraulic circuit or may selectively sever such connection between the pressure chamber and the corresponding hydraulic circuit, such that only some parts of hydraulic pressure of the pressure medium may be transmitted to the corresponding wheel cylinder. For example, as shown in FIG. 1, the first valve 232 may be provided in the second hydraulic passage 212 between the first pressure chamber 112 and the first hydraulic circuit 201 provided with the wheel cylinders 40 of the rear wheels RL and RR in which rear-wheel regenerative braking is implemented, such that the first valve 232 may selectively connect the first pressure chamber 112 to the first hydraulic circuit 201 or may selectively sever such connection between the first pressure chamber 112 and the first hydraulic circuit 201, and thus only some parts of hydraulic pressure of the pressure medium can be transmitted to the rear wheel cylinders 40. A detailed description thereof will hereinafter be described.

A third valve 233 to control flow of the pressure medium may be provided in the third hydraulic passage 213. The third valve 233 may be provided as a check valve that allows the pressure medium to flow from the first pressure chamber 112 to the second hydraulic circuit 202 and prevents the pressure medium from flowing from the second hydraulic circuit 202 to the first pressure chamber 112. That is, the third valve 233 may allow a hydraulic pressure produced in the first pressure chamber 112 to flow into the second hydraulic circuit 202, and may prevent a hydraulic pressure produced in the second hydraulic circuit 202 from leaking to the first pressure chamber 112 through the third hydraulic passage 213.

The fourth hydraulic passage 214 may connect the second pressure chamber 113 to the first and second hydraulic circuits 201 and 202. One end of the fifth hydraulic passage 215 may be connected between the second valve 231 and the second valve on the second hydraulic passage 112, and the other end of the fifth hydraulic passage 215 may be connected to the rear end of the third valve 233 of the third hydraulic passage 213, such that the second hydraulic passage 212 may be connected to the third hydraulic passage 213. In addition, the sixth hydraulic passage 216 may be provided to interconnect the second hydraulic passage 212 and the fifth hydraulic passage 215. To this end, both ends of the sixth hydraulic passage 216 may be provided to communicate not only with the front end of the second valve 231 on the second hydraulic passage 212, but also with the fifth hydraulic passage 215.

The sixth hydraulic passage 214 may be provided with the fourth valve 234 to control flow of a pressure medium.

The fourth valve 234 may be implemented as a bidirectional valve to control flow of the pressure medium flowing through the sixth hydraulic passage 214 communicating with the second pressure chamber 113.

The fourth valve 234 may be implemented as a normally closed (NC) solenoid valve that remains closed in a normal state and is then open upon receiving an opening signal from the ECU.

The fourth hydraulic passage 215 may be provided with the fifth and sixth valves 235 and 236 to control flow of a pressure medium.

The fifth valve 235 may be disposed between a first position connected to the fifth hydraulic passage 216 and a second position connected to the second hydraulic passage 212 on the fourth hydraulic passage 215. The sixth valve 236 may be disposed between a third position connected to the fifth hydraulic passage 216 and a fourth position connected to the third hydraulic passage 213 on the fourth hydraulic passage 215. The fifth valve 235 may be implemented as a check valve that allows a pressure medium to flow from the second hydraulic passage 212 to the second position connected to the fifth hydraulic passage 216 and prevents the pressure medium from flowing from the second point to the second hydraulic passage 212. The sixth valve 236 may be implemented as a check valve that allows a pressure medium to flow from the third hydraulic passage 213 to the third position connected to the fifth hydraulic passage 216 and prevents the pressure medium from flowing from the third point to the third hydraulic passage 213.

The fifth hydraulic passage 216 may be provided with the seventh valve 237 to control flow of a pressure medium.

The seventh valve 237 may be implemented as a bidirectional valve to control flow of a pressure medium flowing through the fifth hydraulic passage 216. The seventh valve 237 may be implemented as a normally closed (NC) solenoid valve that remains closed in a normal state and is then open upon receiving an opening signal from the ECU.

By the above-mentioned passages and valves, hydraulic pressure produced in the second pressure chamber 113 by backward movement of the hydraulic piston 114 may be supplied to the second hydraulic passage 212 through the sixth hydraulic passage 214, and may be supplied to the third hydraulic passage 212 through the fourth hydraulic passage 215, such that hydraulic pressure produced in the second pressure chamber 113 may be transmitted to the first hydraulic circuit 201 and the second hydraulic circuit 202.

The first and seventh valves 232 and 237 are open when a pressure medium is taken out from the wheel cylinders 40 and then flows into the first pressure chamber 112 in a manner that hydraulic pressure applied to the wheel cylinders 40 is released, because the second and first valves 231 and 232 are implemented as check valves for allowing the pressure medium to flow only in one direction.

The first hydraulic circuit 201 and the second hydraulic circuit 202 of the hydraulic control unit 200 will hereinafter be described.

The first hydraulic circuit 201 may control hydraulic pressure of wheel cylinders 40 installed in the rear right wheel RR and the rear left wheel RL. The second hydraulic circuit 202 may control hydraulic pressure of other wheel cylinders 40 installed in the front right wheel FR and the front left wheel FL.

The first hydraulic circuit 201 may be connected to the first hydraulic passage 211 and the second hydraulic passage 212 so as to receive hydraulic pressure from the hydraulic-pressure supply device 100, and the second hydraulic passage 212 may be branched into two passages that are respectively connected to the rear right wheel RR and the rear left wheel RL. Likewise, the second hydraulic circuit 202 may be connected to the first hydraulic passage 211 and the third hydraulic passage 213 so as to receive hydraulic pressure from the hydraulic-pressure supply device 100, and the third hydraulic passage 213 may be branched into two passages that are respectively connected to the front right wheel FR and the front left wheel FL.

The first and second hydraulic circuits 201 and 202 may include a plurality of inlet valves 221 (221*a*, 221*b*, 221*c*, 221*d*) to control flow of the pressure medium and hydraulic pressure. For example, the first hydraulic circuit 201 may be provided with two inlet valves 221*a* and 221*b* connected to the second hydraulic passage 212 such that the two inlet valves 221*a* and 221*b* may respectively control hydraulic pressures applied to two wheel cylinders 40. The second hydraulic circuit 202 may be provided with two inlet valves 221*c* and 221*d* connected to the third hydraulic passage 213 such that the two inlet valves 221*c* and 221*d* may respectively control hydraulic pressures applied to the wheel cylinders 40.

The inlet valves 221 may be arranged upstream of the wheel cylinders 40. The inlet valves 221 may be implemented as normally open (NO) solenoid valves that remain open in a normal state and are then closed upon receiving a closing signal from the ECU.

The first and second hydraulic circuits 201 and 202 may include check valves 223*a*, 223*b*, 223*c*, and 223*d* connected parallel to the inlet valves 221*a*, 221*b*, 221*c*, and 221*d*. The check valves 223*a*, 223*b*, 223*c*, and 223*d* may be provided in bypass passages by which front ends and rear ends of the respective inlet valves 221*a*, 221*b*, 221*c*, and 221*d* are connected to one another in the first and second hydraulic circuits 201 and 202. The check valves 223*a*, 223*b*, 223*c*, and 223*d* may allow a pressure medium to flow from the wheel cylinders 40 to the hydraulic-pressure providing unit 110 and prevents the pressure medium from flowing from the hydraulic-pressure providing unit 110 to the wheel cylinders 40. The check valves 223*a*, 223*b*, 223*c*, and 223*d* may allow hydraulic pressure of the pressure medium applied to the wheel cylinders 40 to be rapidly discharged. Alternatively, during abnormal operation of the inlet valves 221*a*, 221*b*, 221*c*, and 221*d*, the check valves 223*a*, 223*b*, 223*c*, and 223*d* may allow hydraulic pressure of the pressure medium applied to the wheel cylinders 40 to flow into the hydraulic-pressure providing unit 110.

The first and second hydraulic circuits 201 and 202 may further include a plurality of outlet valves 222 (222*a*, 222*b*, 222*c*, 222*d*) connected to the reservoir 30 so as to improve performance or throughput when braking of the wheel cylinders 40 is released. The outlet valves 222 may be respectively connected to the wheel cylinders 40 so as to control flow of the pressure medium discharged from the wheel cylinders 40 of the respective wheels RR, RL, FR, and FL. That is, the outlet valves 222 may sense brake pressures of the respective wheels RR, RL, FR, and FL. If decompression braking is needed, the outlet valves 222 may be selectively open to control decompression of the wheel cylinders 40.

The outlet valves 222 may be implemented as normally closed (NC) solenoid valves that remain closed in a normal state and are then open upon receiving an opening signal from the ECU.

Meanwhile, a first dump valve 241 may be provided in the first dump passage 116 to control flow of a pressure medium, and a second dump valve 242 may be provided in the second dump passage 117 to control flow of the pressure medium. Referring back to FIG. 1, the first dump valve 241 may be implemented as a check valve that allows the pressure medium to flow from the reservoir 30 to the first pressure chamber 112 and prevents the pressure medium from flowing from the first pressure chambers 112 to the reservoir 30. The second dump valve 242 may be implemented as a check valve that allows the pressure medium to flow from the reservoir 30 to the second pressure chamber 113 and prevents the pressure medium from flowing from the second pressure chamber 113 to the reservoir 30. That is, the first dump valve 241 may allow the pressure medium to flow from the reservoir 30 to the first pressure chamber 112, and may prevent the pressure medium from flowing from the first pressure chambers 112 to the reservoir 30. The second dump valve 242 may allow the pressure medium to flow from the reservoir 30 to the second pressure chamber 113, and may prevent the pressure medium from flowing from the second pressure chamber 113 to the reservoir 30.

In addition, the first dump passage 117 may be provided with a bypass passage connected parallel to the second dump valve 242. In more detail, the bypass passage may be provided as a detour (i.e., a bypass route) on the second dump passage 117 such that a front end of the second dump valve 242 is connected to a rear end of the second dump valve 242 through the bypass passage. The bypass passage may include a third dump valve 243 configured to control flow of a pressure medium between the second pressure chamber 113 and the reservoir 30.

The third dump valve 243 may be implemented as a bidirectional valve to control flow of a pressure medium between the second pressure chamber 113 and the reservoir 30. The third dump valve 243 may be implemented as a normally open (NO) solenoid valve that remains open in a normal state and is then closed upon receiving a closing signal from an electronic control unit (ECU).

The hydraulic-pressure providing unit 110 of the electronic brake system 1 according to the first embodiment of the present disclosure may operate in a double-acting manner.

In more detail, hydraulic pressure produced in the first pressure chamber 112 by forward movement of the hydraulic piston 114 may be transmitted to the first hydraulic circuit 201 through the first and second hydraulic passages 211 and 212, the second hydraulic passage 212, and the eighth hydraulic passage 218, thereby braking the wheel cylinders 40 installed in the rear right wheel RR and the rear left wheel RL. In addition, hydraulic pressure produced in the first pressure chamber 112 by forward movement of the hydraulic piston 114 may be transmitted to the second hydraulic circuit 202 through the first hydraulic passage 211 and the third hydraulic passage 213, thereby braking the wheel cylinders 40 installed in the front right wheel FR and the front left wheel FL.

Likewise, hydraulic pressure produced in the second pressure chamber 113 by backward movement of the hydraulic piston 114 may be transmitted to the first hydraulic circuit 201 through the sixth hydraulic passage 214 and the second hydraulic passage 212, thereby braking the wheel cylinders 40 installed in the rear right wheel RR and the rear left wheel RL. In addition, hydraulic pressure produced in the second pressure chamber 113 by backward movement of the hydraulic piston 114 may be transmitted to the second hydraulic circuit 202 through the sixth hydraulic passage 214 and the third hydraulic passage 213, thereby braking the wheel cylinders 40 installed in the front right wheel FR and the front left wheel FL.

Negative pressure produced in the first pressure chamber 112 by backward movement of the hydraulic piston 114 may suction the pressure medium from the wheel cylinders 40 installed in the rear right wheel RR and the rear left wheel RL, such that the pressure medium may move back from the first hydraulic circuit 201 to the first pressure chamber 112 through the second hydraulic passage 212, the fourth hydraulic passage 215, and the fifth hydraulic passage 216. In addition, the negative pressure produced in the first pressure chamber 112 by backward movement of the hydraulic piston 114 may suction the pressure medium from the wheel cylinders 40 installed in the front right wheel FR and the front left wheel FL, such that the pressure medium may move back from the second hydraulic circuit to the first pressure chamber 112 through the fourth hydraulic passage 215 and the fifth hydraulic passage 216.

The electronic brake system 1 according to the first embodiment of the present disclosure may include a first backup passage 251 and a second backup passage 252, each of which is configured to directly transmit the pressure medium discharged from the master cylinder 20 to the wheel cylinders 40 during abnormal operation of the electronic brake system 1, resulting in braking of the vehicle. A mode in which hydraulic pressure from the master cylinder 20 can be directly transmitted to the wheel cylinders 40 is referred to as a fallback mode.

The first backup passage 251 may connect the first hydraulic port 24a of the master cylinder 20 to the first hydraulic circuit 201, and the second backup passage 252 may connect the second hydraulic port 24b of the master cylinder 20 to the second hydraulic circuit 202. In more detail, the first backup passage 251 may be linked to front ends of the first and second inlet valves 221a and 221b in the first hydraulic circuit 201, and the second backup passage 252 may be linked to front ends of the third and fourth inlet valves 221c and 221d in the second hydraulic circuit 202.

The first backup passage 251 may be provided with the first cut valve 261 for controlling flow of the pressure medium, and the second backup passage 252 may be provided with the second cut valve 262 for controlling flow of the pressure medium. The first and second cut valves 261 and 262 may be implemented as normally open (NO) solenoid valves that remain open in a normal state and are then closed upon receiving a closing signal from the ECU.

Therefore, hydraulic pressure supplied from the hydraulic-pressure supply device 100 when the first and second cut valves 261 and 262 are closed may be supplied to the wheel cylinders 40 through the first and second hydraulic circuits 201 and 202. Hydraulic pressure supplied from the master cylinder 20 when the first and second cut valves 261 and 262 are open may be supplied to the wheel cylinders 40 through the first and second backup passages 251 and 252.

Meanwhile, the electronic brake system 1 according to the first embodiment may include a backup-passage pressure sensor PS1 to sense hydraulic pressure of the master cylinder 20, and passage pressure sensors PS21 and PS22 to sense hydraulic pressure of at least one of the first hydraulic circuit 201 and the second hydraulic circuit 202. For example, the backup-passage pressure sensor PS1 may be provided at the front end of the first cut valve 262 on the first backup passage 261, thereby sensing hydraulic pressure produced in the master cylinder 20. The passage pressure sensors PS21 and PS22 may be provided at the front end of the inlet valve 221 of at least one of the first hydraulic circuit 201 and the second hydraulic circuit 202, thereby sensing hydraulic pressure applied to the first hydraulic circuit 201 and hydraulic pressure applied to the second hydraulic circuit 202. Although the drawings have disclosed that the passage pressure sensors PS21 and PS22 are respectively provided in the first hydraulic circuit 201 and the second hydraulic circuit 202 for convenience of description, the scope or spirit of the present disclosure is not limited thereto, and it should be noted that the number of passage pressure sensors may also be set to 1 or any other number so long as hydraulic pressure applied to each of the hydraulic circuits 201 and 202 can be sensed.

Meanwhile, as the demand of users who desire to use eco-friendly vehicles is rapidly increasing, hybrid vehicles having superior fuel efficiency are becoming more and more popular with consumers. Generally, a hybrid vehicle converts kinetic energy generated by vehicle deceleration into electric energy, stores the electric energy in a battery, and uses a motor as an auxiliary driving source of the vehicle. In order to increase an energy gain factor, the hybrid vehicle is designed to recover energy using a generator (not shown) or the like during braking or deceleration of the vehicle, such that this braking operation is referred to as a regenerative braking operation. However, during regenerative braking, not only a brake hydraulic pressure caused by hydraulic pressures applied to four wheels of the vehicle, but also a regenerative brake pressure produced by the generator or the like is additionally applied to the four wheels, such that cooperative control between a brake hydraulic pressure caused by the hydraulic-pressure supply device and a regenerative brake pressure is needed for stable braking obtained by constant brake force applied to four wheels.

FIG. 2 is a graph illustrating characteristics of hydraulic pressures and regenerative brake pressures of wheel cylinders during regenerative braking based on the electronic brake system according to the first embodiment of the present disclosure.

Referring to FIG. 2, if an energy recovery device such as a generator is installed in the rear wheels RL and RR of the first hydraulic circuit 201 as shown in FIG. 1, a brake hydraulic pressure corresponding to a braking level desired by the driver is produced by the hydraulic-pressure supply device, the entire brake force of the front wheels receiving only a brake hydraulic pressure caused by hydraulic pressure may be increased and maintained in the same manner as in the brake hydraulic pressure. However, according to the rear wheels needed for implementation of regenerative braking, the entire rear-wheel brake force corresponding to the sum of a brake hydraulic pressure caused by the hydraulic-pressure supply device and a regenerative brake pressure caused by the generator should be identical to the entire front-wheel brake force or the brake hydraulic pressure desired by the driver. Therefore, as soon as the vehicle starts regenerative braking, the first valve 232 of the hydraulic control unit 200 is closed, such that a brake hydraulic pressure flowing from the hydraulic-pressure supply device to the rear wheels may be kept constant. Simultaneously, a regenerative brake pressure caused by the energy recovery device such as a generator may increase, such that the entire rear-wheel brake force may be identical to the entire front-wheel brake force or a brake hydraulic pressure desired by the driver. A detailed description thereof will be given later with reference to FIG. 4.

A method for operating the electronic brake system 1 according to the first embodiment of the present disclosure will hereinafter be described.

The electronic brake system 1 according to the first embodiment may allow the hydraulic-pressure supply device 100 to be used in a low-pressure mode and a high-pressure mode in different ways. The hydraulic control unit 200 may operate in different ways according to the low-pressure mode and the high-pressure mode. The hydraulic-pressure supply device 100 may use the high-pressure mode, such that the hydraulic-pressure supply device 100 can provide a high hydraulic pressure without increasing an output level of the motor 120, resulting in reduction in load applied to the motor 120. As a result, the production cost and weight of the brake system can be reduced and stable brake force can be obtained, resulting in an increase in durability and operational reliability of the brake system.

If the hydraulic piston 114 moves forward by driving of the motor 120, hydraulic pressure may occur in the first pressure chamber 112. As the hydraulic piston 114 gradually moves forward from an initial position thereof, (i.e., as an operation stroke of the hydraulic piston 114 gradually increases), the amount of a pressure medium flowing from the first pressure chamber 112 to the wheel cylinders 40 is gradually increased, such that a brake pressure is also increased. However, there is an effective stroke in the hydraulic piston 114, such that a maximum pressure caused by forward movement of the hydraulic piston 114 may be present in the hydraulic piston 114.

In this case, a maximum pressure of the low-pressure mode may be lower than a maximum pressure of the high-pressure mode. However, compared with the low-pressure mode, the high-pressure mode may have a smaller pressure increase rate per stroke of the hydraulic piston 114, because the entire pressure medium discharged from the first pressure chamber 112 is partially transmitted to the second pressure chamber 113 without being fully transmitted to the second pressure chamber 113. A detailed description thereof will be given later with reference to FIG. 5.

Therefore, during an initial braking stage in which braking response characteristics are considered important, the electronic brake system 1 may use the low-pressure mode in which a pressure increase rate per stroke is high. During the latter braking stage in which a maximum brake pressure is considered important, the electronic brake system 1 may use the high-pressure mode in which a maximum pressure is high.

Figure 3:
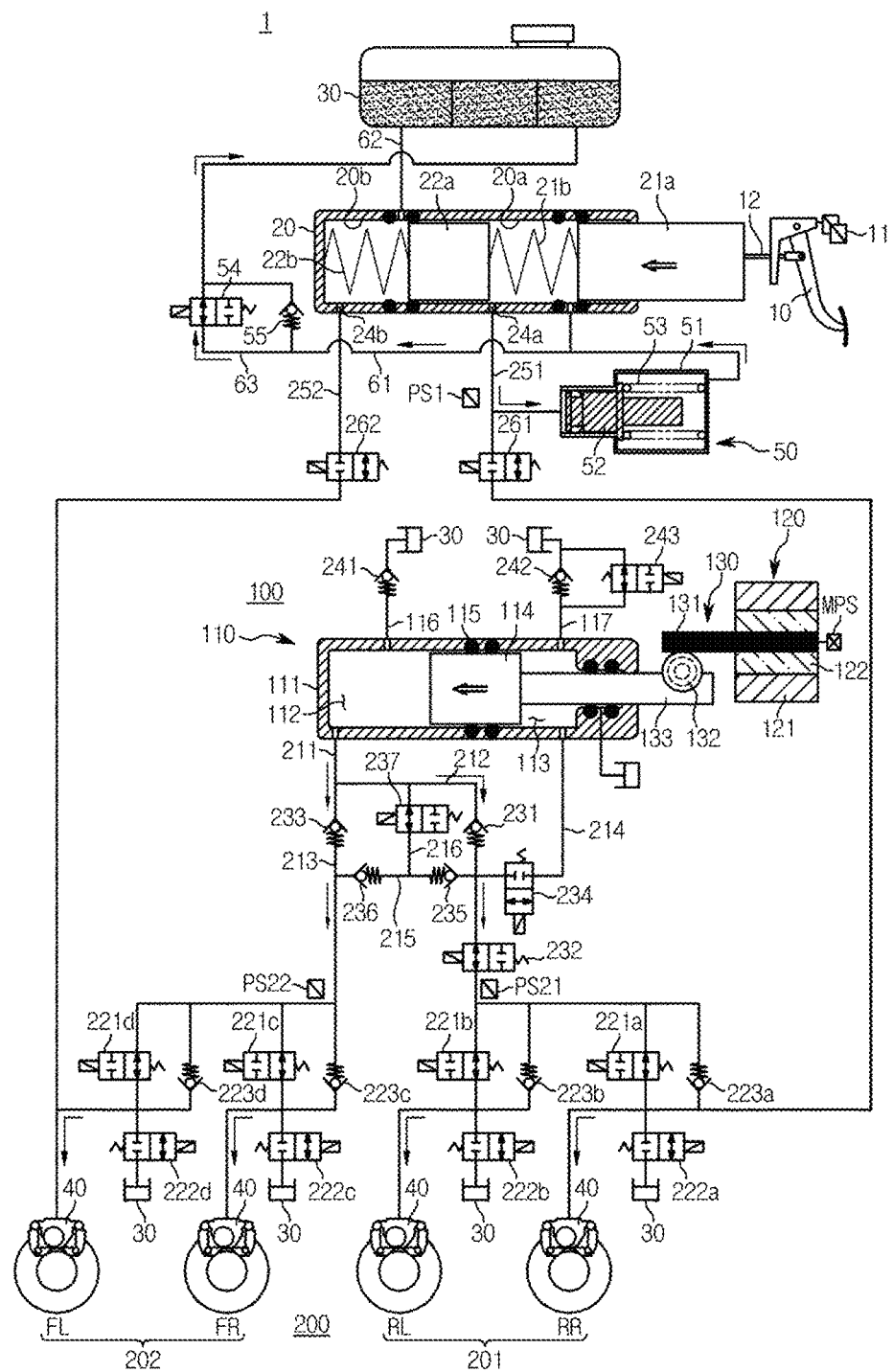
FIG. 3 is a hydraulic circuit diagram illustrating the electronic brake system for providing brake pressure of a low-pressure mode by forward movement of a hydraulic piston according to a first embodiment of the present disclosure.
Figure 4:
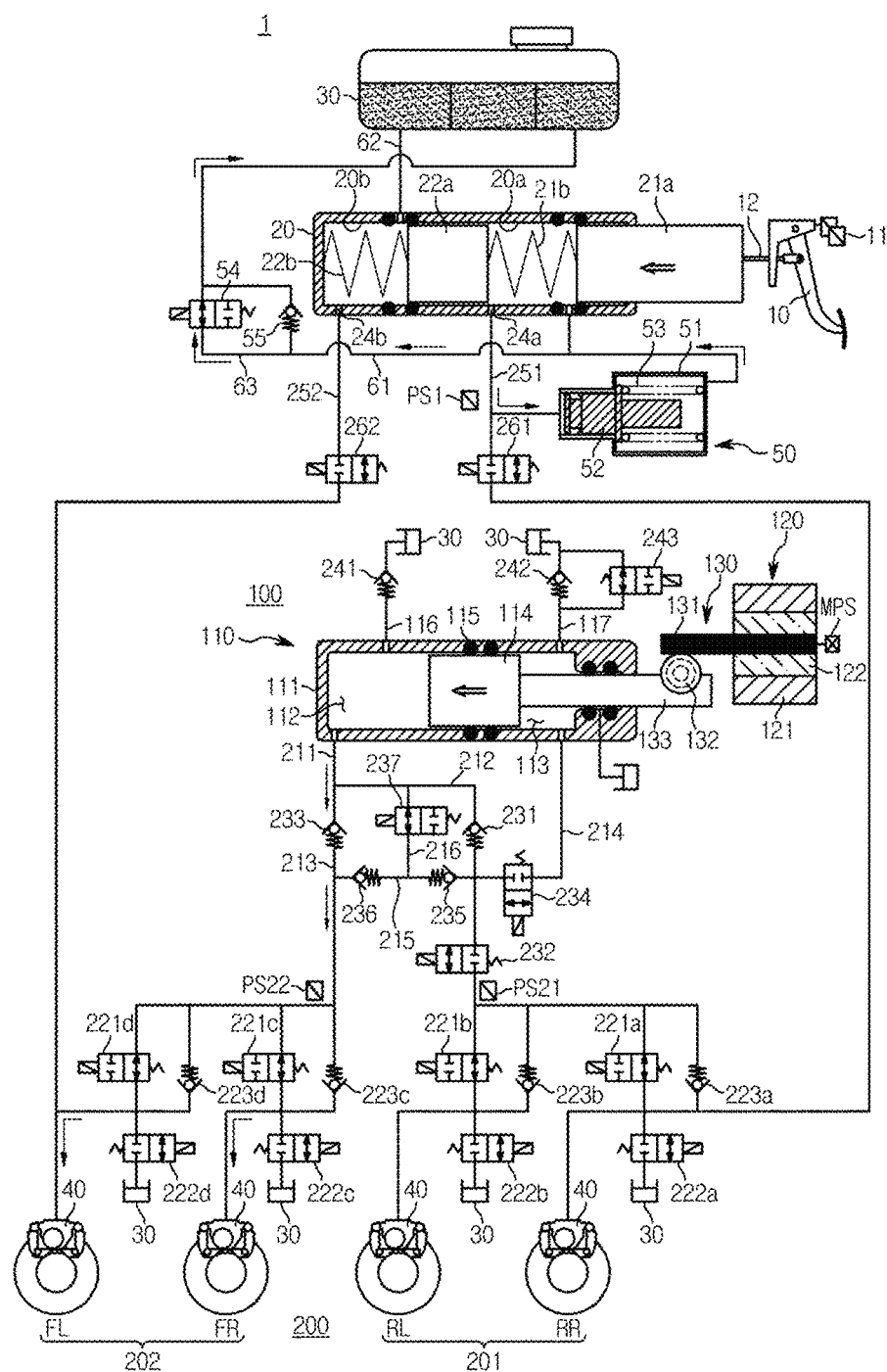
FIG. 4 is a hydraulic circuit diagram illustrating a rear-wheel regenerative braking state of the electronic brake system using brake pressure generated by forward movement of a hydraulic piston according to a first embodiment of the present disclosure.
Figure 5:
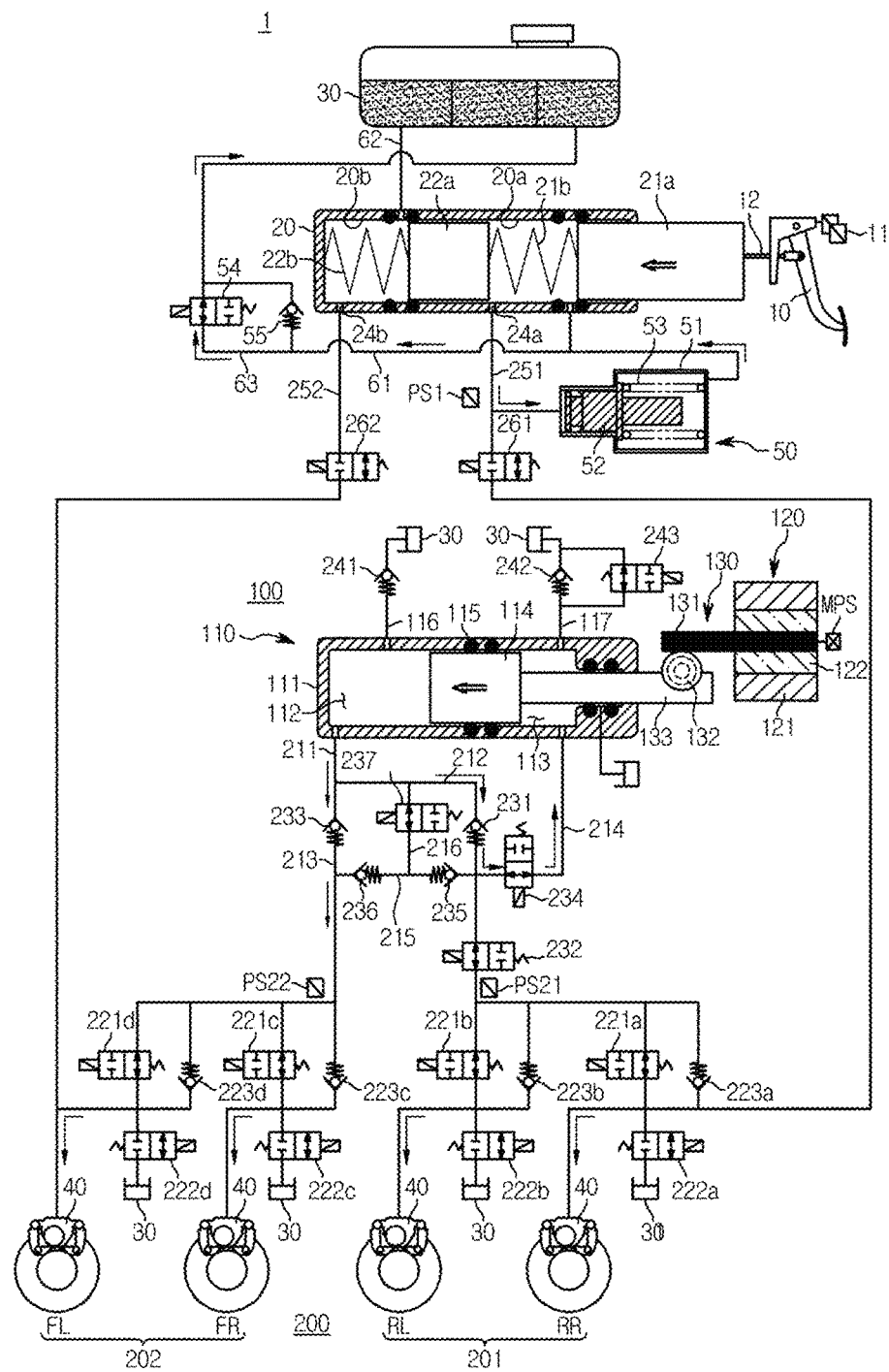
FIG. 5 is a hydraulic circuit diagram illustrating the electronic brake system for providing brake pressure of a low-pressure mode by forward movement of a hydraulic piston according to a first embodiment of the present disclosure.

FIG. 3 is a hydraulic circuit diagram illustrating the electronic brake system 1 for providing brake pressure of the low-pressure mode by forward movement of the hydraulic piston 114 according to the first embodiment of the present disclosure. FIG. 4 is a hydraulic circuit diagram illustrating the rear-wheel regenerative braking state of the electronic brake system 1 in the brake pressure providing state of FIG. 3. FIG. 5 is a hydraulic circuit diagram illustrating the electronic brake system 1 for providing brake pressure of the high-pressure mode by forward movement of the hydraulic piston 114 according to a first embodiment of the present disclosure.

Referring to FIG. 3, when the driver depresses the brake pedal 10 in the initial braking stage, the motor 120 may rotate in one direction, rotational force of the motor 120 may be transmitted to the hydraulic-pressure providing unit 110 by the power switching unit 130, the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided to four wheels through the first hydraulic circuit 201 and the second hydraulic circuit 202, such that braking force occurs in the wheel cylinders 40.

In more detail, hydraulic pressure supplied from the first pressure chamber 112 may be directly transmitted to the wheel cylinders 40 provided in the first hydraulic circuit 201 through the first hydraulic passage 211 and the second hydraulic passage 212. In this case, the first and second inlet valves 221a and 222b respectively installed in two passages branched from the first hydraulic circuit 201 may remain open, and the first and second outlet valves 222a and 222b installed in passages branched from two passages branched from the first hydraulic circuit 201 may remain closed, such that hydraulic pressure is prevented from leaking to the reservoir 30.

In addition, hydraulic pressure supplied from the first pressure chamber 112 may be directly transmitted to the wheel cylinders 40 provided in the second hydraulic circuit 202 not only through the first hydraulic passage 211 connected to the first communication hole 111a, but also through the third hydraulic passage 213. In this case, the third and fourth inlet valves 221c and 222d respectively installed in two passages branched from the second hydraulic circuit 202 may remain open, and the third and fourth outlet valves 222c and 222d installed in passages branched from two passages branched from the second hydraulic circuit 202 may remain closed, such that hydraulic pressure is prevented from leaking to the reservoir 30. In this case, the first valve 232 may remain open, and the seventh valve 238 may also transition to the open state.

The fourth valve 234 may remain closed, such that the sixth hydraulic passage 214 can be blocked. As a result, hydraulic pressure produced in the first pressure chamber 112 may be prevented from flowing into the second pressure chamber 113 through the sixth hydraulic passage 214, such that a pressure increase rate per stroke of the hydraulic piston 114 may be improved. Therefore, the electronic brake system 1 may obtain a rapid braking response in the initial braking stage.

When hydraulic pressure of the pressure medium occurs by the hydraulic-pressure supply device 100, the first and second cut valves 261 and 262 provided in the first and second backup passages 251 and 252 may be closed, such that hydraulic pressure discharged from the master cylinder 20 is prevented from flowing into the wheel cylinders 40. Hydraulic pressure produced in the master cylinder 20 according to a pedal effort of the brake pedal 10 may be transmitted to the simulation device 50 connected to the master cylinder 20. In this case, the simulator valve 54 provided in the first reservoir passage 61 may be opened, and hydraulic pressure discharged from the first master chamber 20a of the master cylinder 20 may be transmitted to the front side of the simulation piston 52. As a result, the reaction force spring 53 may be compressed by movement of the simulation piston 52, and the pressure medium stored in the simulation chamber 51 may be transmitted to the reservoir 30 through the first reservoir passage 61 opened by the simulator valve 54. A reaction force corresponding to a pedal effort of the brake pedal may occur by elastic restoring force of the reaction force spring 53, resulting in formation of proper pedal feel for the driver.

The passage pressure sensors PS21 and PS22 for sensing hydraulic pressure of at least one of the first hydraulic circuit 201 and the second hydraulic circuit 202 may sense hydraulic pressure applied to wheel cylinders 40, and may control the hydraulic-pressure supply device 100 based on the sensed hydraulic pressure, such that the amount or hydraulic pressure of the pressure medium applied to the wheel cylinders 40 can be controlled. Moreover, during regenerative braking of the rear wheel cylinders 40 of the first hydraulic circuit 201, the ECU may determine whether to close the first valve 232 based on pressure information sensed by the passage pressure sensor P21, and may also determine a closing start time of the first valve 232 based on the pressure information sensed by the passage pressure sensor P21. In addition, if hydraulic pressure applied to the wheel cylinders 40 is higher than a target pressure value corresponding to the pedal effort of the brake pedal 10, at least one of the first to fourth outlet valves 222 is open such that the resultant hydraulic pressure may be controlled to correspond to the target pressure value.

The rear-wheel regenerative braking operation of the electronic brake system 1 according to the first embodiment of the present disclosure will hereinafter be described with reference to the attached drawings.

Referring to FIG. 4, during the initial braking stage in which pressure of the low-pressure mode is provided, if the driver depresses the brake pedal 10, the motor 120 may rotate in one direction, rotational force of the motor 120 may be transmitted to the hydraulic-pressure providing unit 110 by the power switching unit 130, the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided at four wheels through the first hydraulic circuit 201 and the second hydraulic circuit 202, resulting in occurrence of braking force.

Thereafter, when the ECU determines that regenerative braking is driven in the rear wheels (for example, in the wheel cylinders 40 of the first hydraulic circuit 201), the ECU may calculate the magnitude of a brake hydraulic pressure calculated in response to a difference between a brake pressure requested by the driver (hereinafter referred to as a driver-requested brake pressure) and a regenerative braking pressure, and the first hydraulic circuit 201 may close the first valve 232 after applying hydraulic pressure corresponding to the corresponding pressure level to the rear wheel cylinders 40. Accordingly, a brake hydraulic pressure of the rear wheels in which regenerative braking has occurred may be less than in a non-operation state of the regenerative-braking.

The ECU may stably control a brake hydraulic pressure flowing from the hydraulic-pressure supply device 100 to the rear wheel cylinders 40 of the first hydraulic circuit 201 using the passage pressure sensor PS21 that senses a hydraulic pressure of the first hydraulic circuit 201. In more detail, the ECU may allow the passage pressure sensor PS22 to sense a brake hydraulic pressure applied to the front wheel cylinders 40 of the second hydraulic circuit 202 that receives only a brake hydraulic pressure caused by hydraulic pressure produced from the hydraulic-pressure supply device 100, may compare the sensed brake hydraulic pressure with the brake hydraulic pressure applied to the rear wheel cylinders 40 of the first hydraulic circuit 201, and may more precisely control a rear-wheel brake hydraulic pressure that needs to be blocked or reduced by the rear wheel cylinders 40 of the first hydraulic circuit 201 during regenerative braking.

As described above, during rear-wheel regenerative braking, the ECU may control operation of the first valve 232, such that a brake hydraulic pressure applied to the rear wheel cylinders 40 of the first hydraulic circuit 201 can be stably adjusted according to a regenerative braking pressure. As a result, a brake pressure or braking force can be evenly applied to four wheels of the vehicle, such that stability in vehicle braking is increased and oversteer or understeer of the vehicle is prevented, resulting in increased driving stability of the vehicle.

The hydraulic-pressure supply device 100 of the electronic brake system 1 according to the first embodiment may transition from the low-pressure mode shown in FIGS. 3 and 4 to the high-pressure mode shown in FIG. 5 before the hydraulic piston 114 moves forward by a maximum distance.

Referring to FIG. 5, if a hydraulic pressure sensed by each of the passage pressure sensors PS21 and PS22 is higher than a predetermined pressure level, the ECU may transition from the low-pressure mode to the high-pressure mode. During the high-pressure mode, the fourth valve 234 may transition to the open state, such that the sixth hydraulic passage 214 may be open. Therefore, some parts of the hydraulic pressure produced in the first pressure chamber 112 may be transmitted to the second pressure chamber 113 after sequentially passing through the first hydraulic passage 211, the second hydraulic passage 212, and the sixth hydraulic passage 214, the resultant hydraulic pressure can allow the hydraulic piston 114 to move farther forward and load applied to the motor 120 can also be reduced.

In the high-pressure mode, some parts of the pressure medium discharged from the first pressure chamber 112 may flow into the second pressure chamber 113, such that the pressure increase rate per stroke is reduced. However, some parts of a hydraulic pressure produced in the first pressure chamber 112 may allow the hydraulic piston 114 to move farther forward, such that a maximum pressure of the pressure medium can be increased. The reason why the maximum pressure of the pressure medium is increased is that the drive shaft 133 passes through the second pressure chamber 113 so that a volume change rate per stroke of the hydraulic piston 114 is relatively smaller in the second pressure chamber 113 than in the first pressure chamber 112.

In addition, as the hydraulic piston 114 moves farther forward, a hydraulic pressure of the first pressure chamber 112 is increased, force needed for backward movement of the hydraulic piston 114 affected by the increased hydraulic pressure of the first pressure chamber 112 becomes stronger, such that load applied to the motor 120 is also increased. However, the sixth hydraulic circuit 214 is open under control of the fourth valve 234, and some parts of the pressure medium discharged from the first pressure chamber 112 are transmitted to the second pressure chamber 113, such that a hydraulic pressure may also occur in the second pressure chamber 113, resulting in reduction of load applied to the motor 120.

In this case, the third dump valve 243 may transition to the closed state. Since the third dump valve 243 is closed, the pressure medium in the first pressure chamber 112 may rapidly flow into the second pressure chamber 113 having a negative pressure, such that a hydraulic pressure may also occur in the second pressure chamber 113. However, the third dump valve 243 is kept open as necessary, such that the pressure medium stored in the second pressure chamber 113 may flow into the reservoir 30.

A method for releasing brake pressure in a normal operation state of the electronic brake system 1 according to the first embodiment of the present disclosure will hereinafter be described with reference to the attached drawings.

Figure 6:
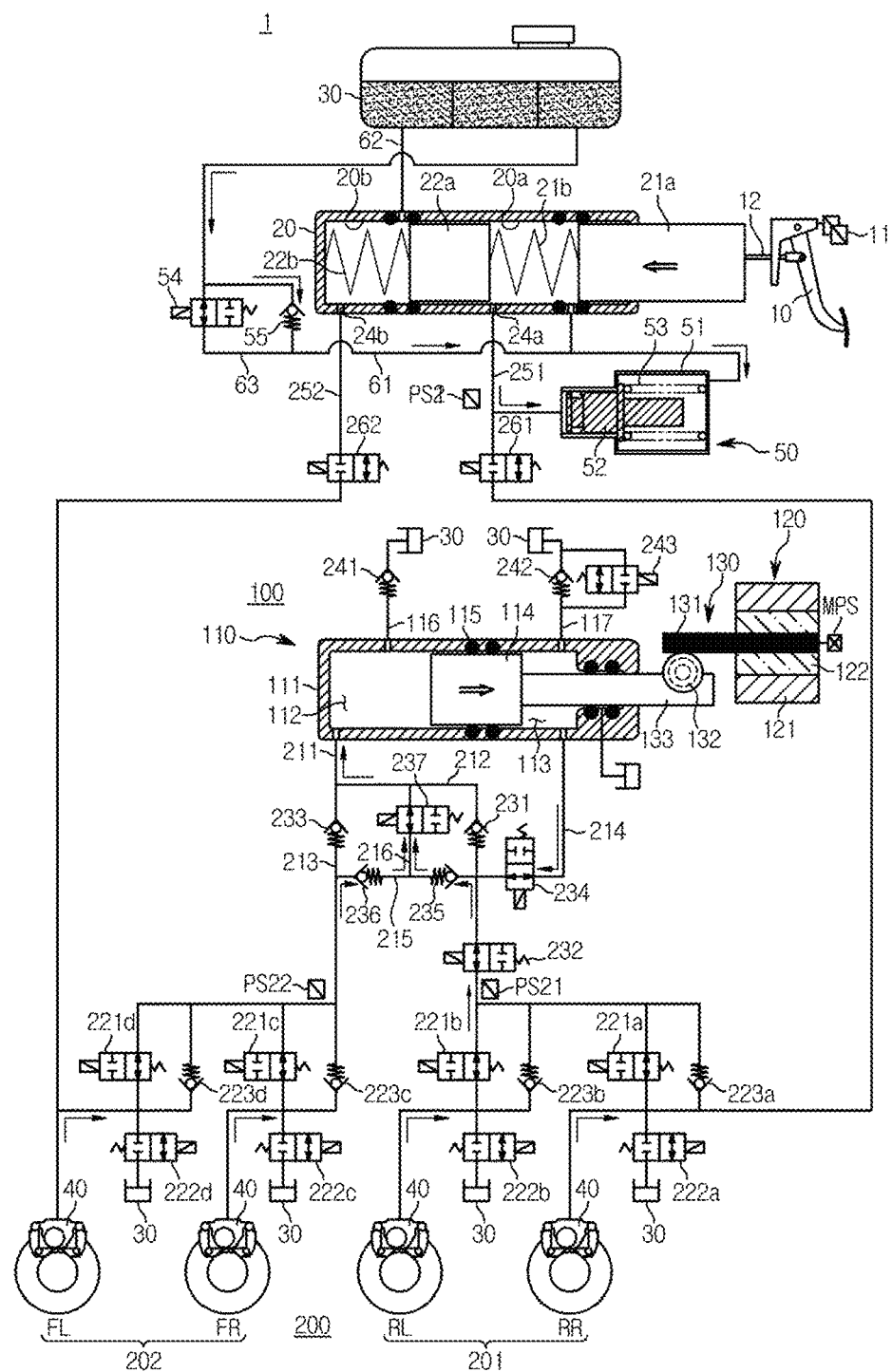
FIG. 6 is a hydraulic circuit diagram illustrating the electronic brake system for releasing brake pressure of a high-pressure mode by backward movement of a hydraulic piston according to a first embodiment of the present disclosure.
Figure 7:
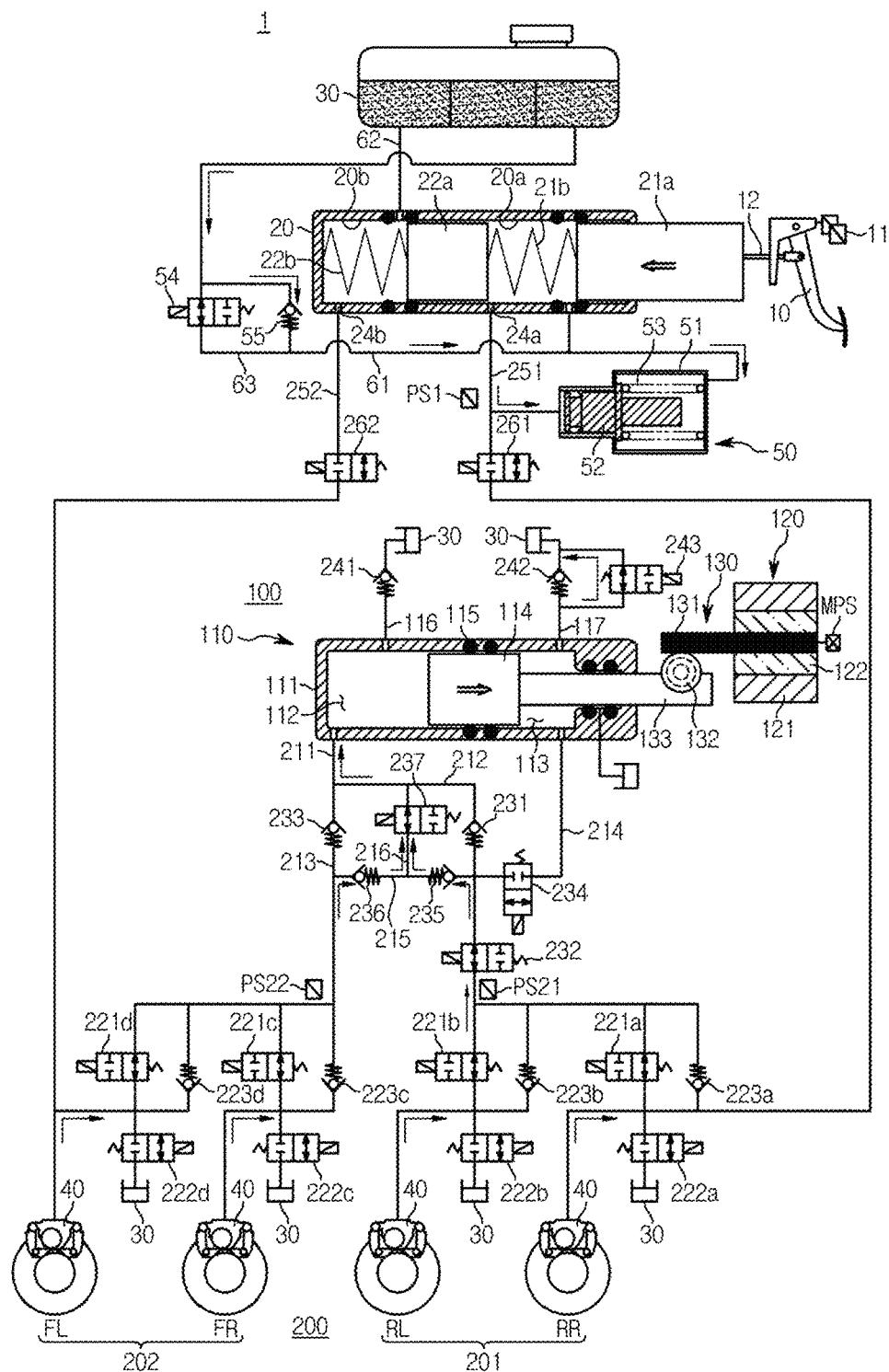
FIG. 7 is a hydraulic circuit diagram illustrating the electronic brake system for releasing brake pressure of a low-pressure mode by backward movement of a hydraulic piston according to a first embodiment of the present disclosure.

FIG. 6 is a hydraulic circuit diagram illustrating the electronic brake system 1 for releasing brake pressure of the high-pressure mode by backward movement of the hydraulic piston 114 according to the first embodiment of the present disclosure. FIG. 7 is a hydraulic circuit diagram illustrating the electronic brake system 1 for releasing brake pressure of the low-pressure mode by backward movement of the hydraulic piston 114 according to the first embodiment of the present disclosure.

Referring to FIG. 6, when a pedal effort applied to the brake pedal 10 is released, the motor 120 produces rotational force in an opposite direction to the braking rotation direction and transmits the rotational force to the power switching unit 130, the worm shaft 131, the worm wheel 132, and the drive shaft 133 of the power switching unit 130 may rotate in the opposite direction to the braking rotation direction, such that the hydraulic piston 114 moves back to an original position thereof. As a result, hydraulic pressure from the first pressure chamber 112 may be released, and a negative pressure may occur in the first pressure chamber 112. Simultaneously, the pressure medium discharged from the wheel cylinders 40 may be transmitted to the first pressure chamber 112 through the first and second hydraulic circuits 201 and 202.

In more detail, a negative pressure produced in the first pressure chamber 112 may release a pressure from the wheel cylinders 40 mounted to the first hydraulic circuit 201 after passing through the second hydraulic passage 212, the fifth hydraulic passage 215, the sixth hydraulic passage 216, and the first hydraulic passage 211. In this case, the first and second inlet valves 221a and 221b respectively installed in two passages branched from the first hydraulic circuit 201 may remain open, and the first and second outlet valves 222a and 222b respectively installed in two passages branched from the hydraulic circuit 202 may remain closed, such that the pressure medium of the reservoir 30 is prevented from flowing into the first pressure chamber 112. In this case, the first valve 232 provided in the second hydraulic passage 212 and the seventh valve 232 provided in the sixth hydraulic passage 216 may be controlled to be open.

In addition, a negative pressure produced in the first pressure chamber 112 may release a pressure from the wheel cylinders 40 mounted to the second hydraulic circuit 202 after passing through the third hydraulic passage 213 connected to the first communication hole 111a, the fourth hydraulic passage 215, the fifth hydraulic passage 216, and the first hydraulic passage 211. In this case, the third and fourth inlet valves 221c and 221d respectively installed in two passages branched from the second hydraulic circuit 202 may remain open, and the third and fourth outlet valves 222c and 222d respectively installed in two passages branched from the second hydraulic circuit 202 may remain closed, such that the pressure medium of the reservoir 30 is prevented from flowing into the first pressure chamber 112.

Meanwhile, the fourth valve 234 may transition to the open state, and the sixth hydraulic passage 214 may also transition to the open state, such that the first pressure chamber 112 may communicate with the second pressure chamber 113.

That is, in order to form a negative pressure in the first pressure chamber 112, the hydraulic piston 114 should move backward. However, when hydraulic pressure of the pressure medium is present in the second pressure chamber 113, unexpected resistance may occur in backward movement of the hydraulic piston 114. Therefore, the fourth valve 234 may transition to the open state in a manner that the first pressure chamber 112 may communicate with the second pressure chamber 113, such that the pressure medium of the second pressure chamber 113 may flow into the first pressure chamber 112.

In this case, the third dump valve 243 may transition to the closed state. Since the third dump valve 243 is closed, the pressure medium of the second pressure chamber 113 may be discharged only to the sixth hydraulic passage 214. However, the third dump valve 243 may remain open as necessary, such that the pressure medium of the second pressure chamber 113 may also flow into the reservoir 30.

In addition, when a negative pressure applied to each of the first and second hydraulic circuits 201 and 202 is measured to be higher than a target pressure release value corresponding to a released pedal effort of the brake pedal 10, at least one of the first to fourth outlet valves 222 is open, such that the resultant pressure may be controlled to correspond to the target pressure value. In addition, the first and second cut valves 261 and 262 respectively installed in the first and second backup passages 251 and 252 may be closed, such that a negative pressure produced in the master cylinder 20 may not be transmitted to the hydraulic control unit 200.

Meanwhile, during a high-pressure mode shown in FIG. 6, not only the pressure medium stored in the wheel cylinders 40 but also the pressure medium stored in the second pressure chamber 113 may be supplied to the first pressure chamber 112 due to a negative pressure produced in the first pressure chamber 112 affected by backward movement of the hydraulic piston 114, such that a pressure reduction rate of the wheel cylinders 40 is at a low level. Therefore, it may be difficult to rapidly release brake pressure in the high-pressure mode. As a result, the operation for releasing brake pressure of the high-pressure mode may be used only in a high-pressure situation of the brake pressure. In order to rapidly release a brake pressure that is equal to or less than a predetermined brake pressure, the operation mode may transition to the operation for releasing brake pressure in the low-pressure mode shown in FIG. 7.

Referring to FIG. 7, when the brake pressure is released in the low-pressure mode, the third dump valve 243 transitions to the open state or remains open, instead of closing the sixth hydraulic passage 214 affected by the fourth valve 234 that remains closed or transitions to the closed state, such that the second pressure chamber 113 may communicate with the reservoir 30.

When the brake pressure is released in the low-pressure mode, a negative pressure produced in the first pressure chamber 112 may be used only to recover (or retrieve) the pressure medium of the wheel cylinders 40, such that a pressure reduction rate per stroke of the hydraulic piston 114 may be increased more than in the other case in which a brake pressure is released in the high-pressure mode. In this case, hydraulic pressure produced in the second pressure chamber 113 by backward movement of the hydraulic piston 114 may be transmitted to the reservoir 30 due to the open state of the third dump valve 243.

Differently from FIG. 7, it may be possible to release a brake pressure of the wheel cylinders 40 even when the hydraulic piston 114 moves forward.

Figure 8:
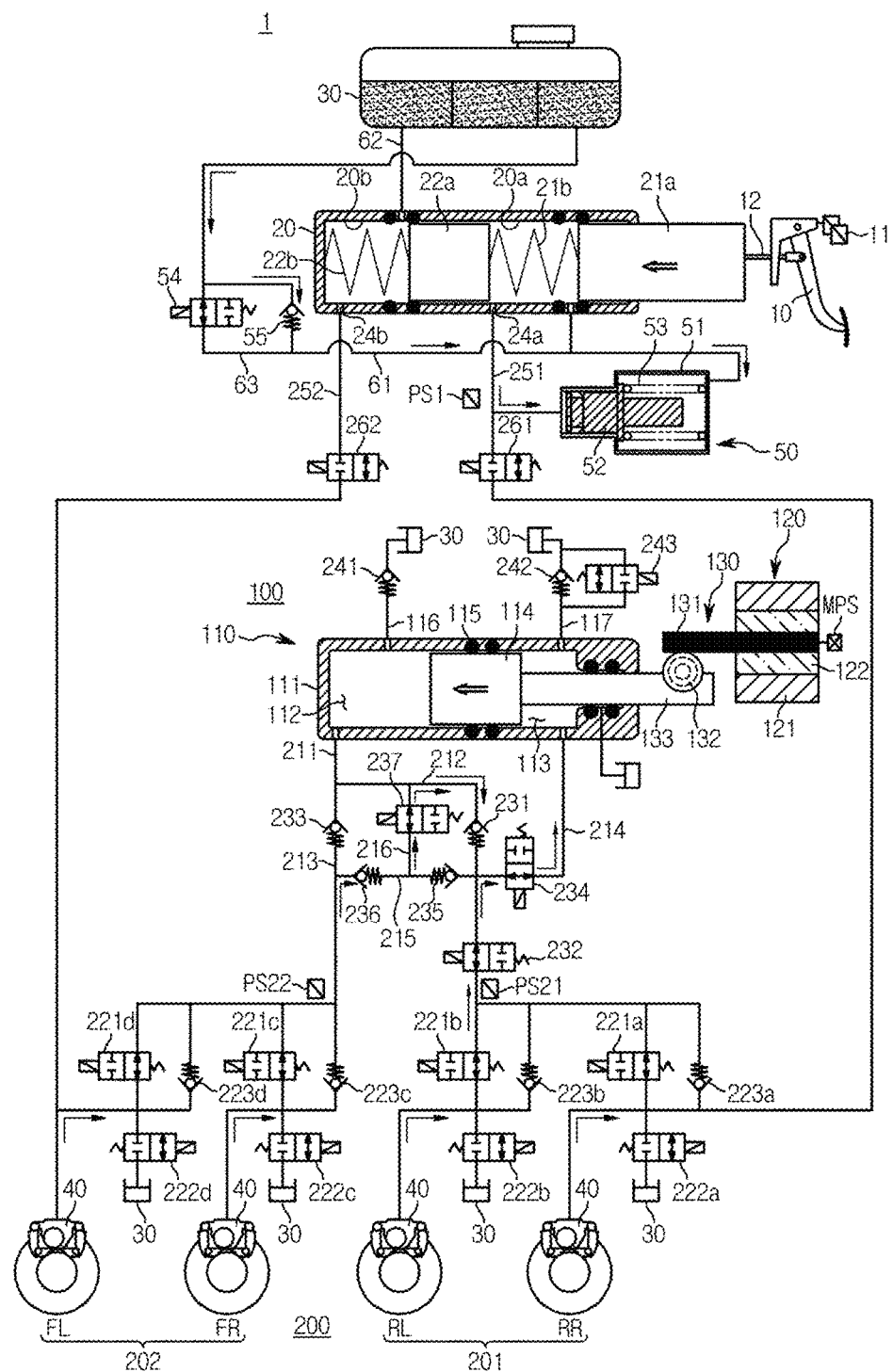
FIG. 8 is a hydraulic circuit diagram illustrating the electronic brake system for releasing brake pressure by forward movement of a hydraulic piston according to a first embodiment of the present disclosure.

FIG. 8 is a hydraulic circuit diagram illustrating the electronic brake system for releasing brake pressure by forward movement of the hydraulic piston 114 according to the first embodiment of the present disclosure.

Referring to FIG. 8, when a pedal effort applied to the brake pedal 10 is released, the motor 120 produces rotational force in an opposite direction to the braking rotation direction and transmits the rotational force to the power switching unit 130, the worm shaft 131, the worm wheel 132, and the drive shaft 133 of the power switching unit 130 may rotate in the opposite direction to the braking rotation direction, such that the hydraulic piston 114 moves forward to an original position thereof. As a result, hydraulic pressure from the second pressure chamber 113 may be released, and a negative pressure may occur in the second pressure chamber 113. Simultaneously, the pressure medium discharged from the wheel cylinders 40 may be transmitted to the second pressure chamber 113 through the first and second hydraulic circuits 201 and 202.

In more detail, a negative pressure produced in the second pressure chamber 113 may release a pressure from the wheel cylinders 40 mounted to the first hydraulic circuit 201 not only through the sixth hydraulic passage 214 connected to the second communication hole 111b, but also through the second hydraulic passage 212. In this case, the first and second inlet valves 221a and 221b respectively installed in two passages branched from the first hydraulic circuit 201 may remain open, and the first and second outlet valves 222a and 222b respectively installed in the passages branched from the first hydraulic circuit 201 may remain closed, such that the pressure medium of the reservoir 30 is prevented from flowing into the second pressure chamber 113.

In addition, a negative pressure produced in the second pressure chamber 113 may release a pressure from the wheel cylinders 40 mounted to the second hydraulic circuit 202 after passing through the sixth hydraulic passage 214 connected to the second communication hole 111b, the second hydraulic passage 212, the fifth hydraulic passage 216, a passage of the sixth valve 236 of the fourth hydraulic passage 215, and the third hydraulic passage 213. In this case, the third and fourth inlet valves 221c and 221d respectively installed in two passages branched from the second hydraulic circuit 202 may remain open, and the third and fourth outlet valves 222c and 222d respectively installed in two passages branched from the second hydraulic circuit 202 may remain closed, such that the pressure medium of the reservoir 30 is prevented from flowing into the second pressure chamber 113.

In this case, the fourth valve 234 may transition to the open state such that the sixth hydraulic passage 214 is open. Thereafter, the seventh valve 237 may also transition to the open state, such that the fifth hydraulic passes 216 may be open.

In this case, the third dump valve 243 may transition to the closed state, such that a negative pressure produced in the second pressure chamber 113 may quickly retrieve the pressure medium from the wheel cylinders 40.

In addition, when a negative pressure applied to each of the first and second hydraulic circuits 201 and 202 is measured to be higher than a target pressure release value corresponding to a released pedal effort of the brake pedal 10, at least one of the first to fourth outlet valves 222 is open, such that the resultant pressure may be controlled to correspond to the target pressure value. In addition, the first and second cut valves 261 and 262 respectively installed in the first and second backup passages 251 and 252 may be closed, such that a negative pressure produced in the master cylinder 20 may not be transmitted to the hydraulic control unit 200.

When the electronic brake system 1 according to the first embodiment of the present disclosure abnormally operates, the operation states of the electronic brake system 1 will hereinafter be described.

Figure 9:
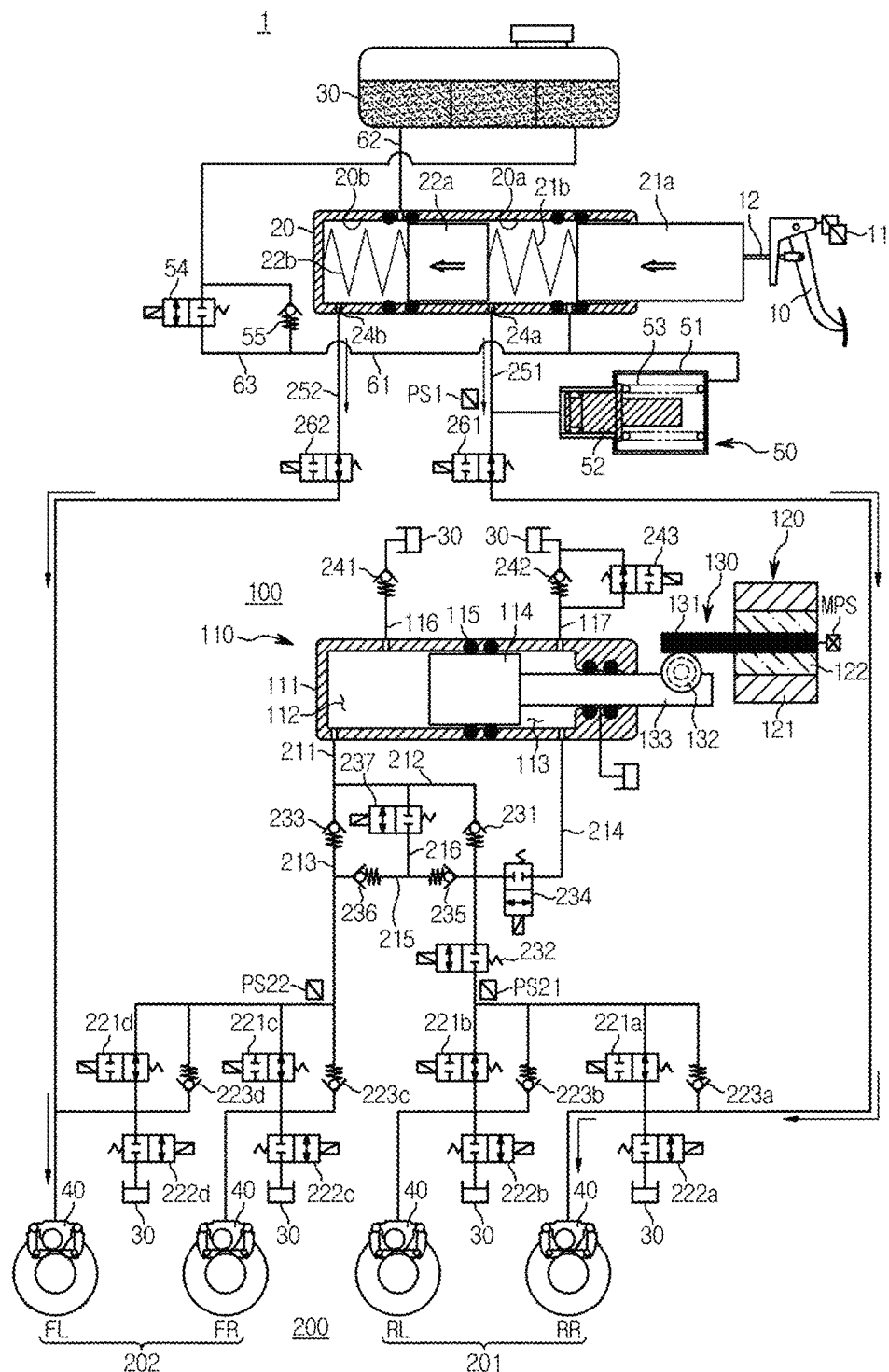
FIG. 9 is a hydraulic circuit diagram illustrating an abnormal operation state of the electronic brake system according to a first embodiment of the present disclosure.

FIG. 9 is a hydraulic circuit diagram illustrating an abnormal operation state of the electronic brake system 1 according to the first embodiment of the present disclosure.

Referring to FIG. 9, when the electronic brake system 1 abnormally operates, individual valves are controlled to return to the initial braking stage in which the valves do not operate. Thereafter, when the driver depresses the brake pedal 10, the first master piston 21a connected to the brake pedal 10 may move forward, and the second master piston 22a may also move forward by movement of the first master piston 21a. Therefore, hydraulic pressure may occur in the pressure medium stored in the first and second master chambers 20a and 20b, the hydraulic pressure produced in the first and second master chambers 20a and 20b may be transmitted to the wheel cylinders 40 through the first and second backup passages 251 and 252, resulting in formation of braking force.

In this case, the first and second cut valves 261 and 262 provided in the first and second backup passages 251 and 252 may be implemented as normally open (NO) solenoid valves. The inlet valves 221 provided in the first and second hydraulic circuits 201 and 202 may be implemented as normally open (NO) solenoid valves. The simulator valve 54 and the outlet valves 222 may be implemented as normally closed (NC) solenoid valves, such that the hydraulic pressure produced in the first and second master chambers 20a and 20b of the master cylinder 20 can be immediately transmitted to four wheel cylinders 40, such that braking stability is improved and rapid braking is carried out.

An inspection mode of the electronic brake system 1 according to the first embodiment of the present disclosure will hereinafter be described.

The inspection mode may include a first inspection mode for inspecting the presence or absence of a leak either in the master cylinder 20 or in the simulation device 50, and a second inspection mode for inspecting the presence or absence of air in the master cylinder 20.

The inspection mode may inspect the presence or absence of a leak either in the master cylinder 20 or in the simulation device 50. The electronic brake system 1 according to the first embodiment may perform the inspection mode before the vehicle starts driving or during traveling or stopping of the vehicle, such that the electronic brake system 1 may periodically or frequently inspect the presence or absence of device malfunction.

Figure 10:
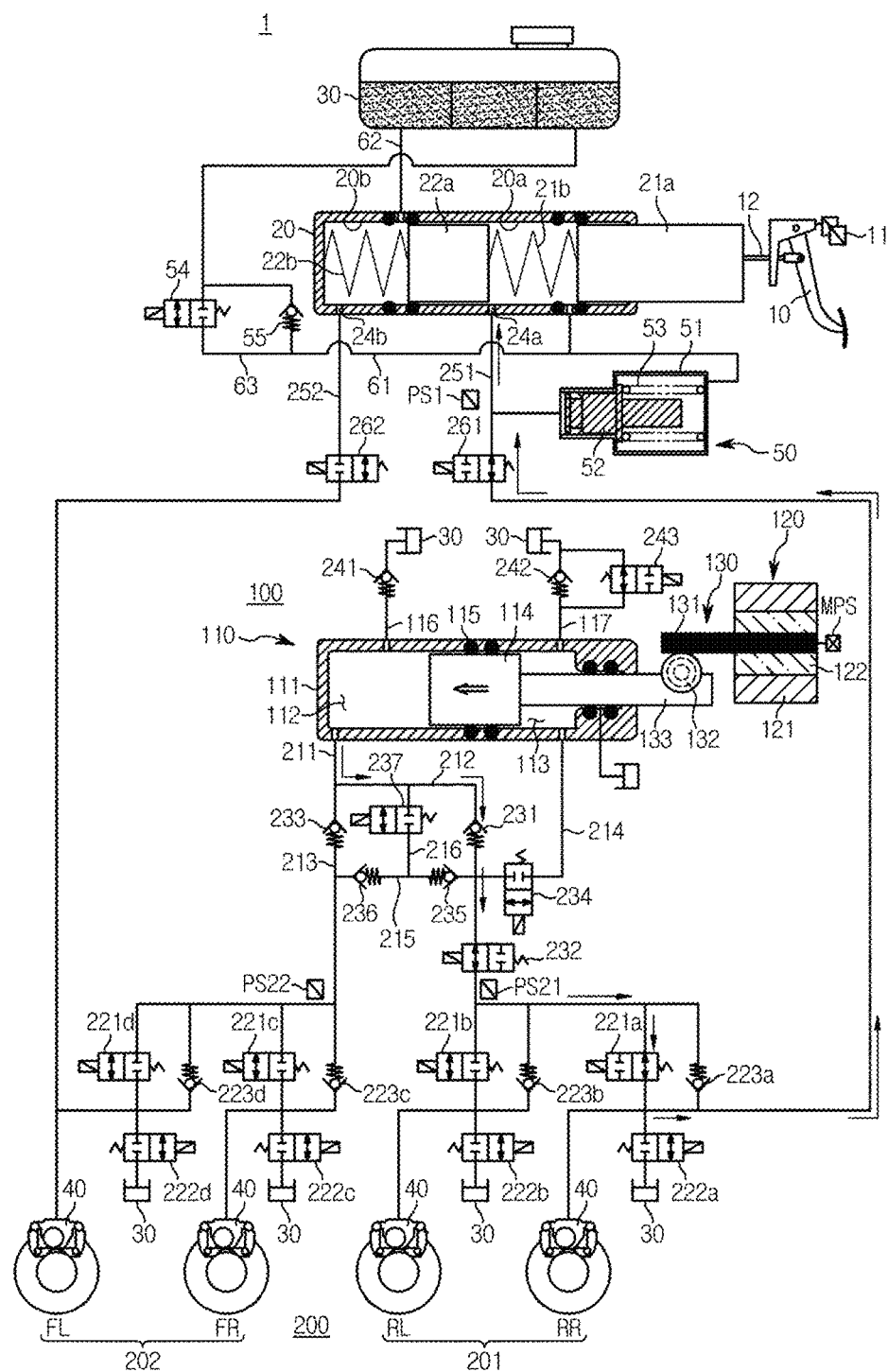
FIG. 10 is a hydraulic circuit diagram illustrating an operation state of the electronic brake system staying in an inspection mode according to a first embodiment of the present disclosure.

FIG. 10 is a hydraulic circuit diagram illustrating an operation state of the electronic brake system 1 configured to inspect the presence or absence of a leak either in the master cylinder 20 or in the simulator valve 54 according to the first embodiment of the present disclosure.

Referring to FIG. 10, during the inspection mode, the electronic brake system 1 may be controlled in a manner that individual valves are controlled to return to the initial braking stage in which the valves do not operate, and may supply hydraulic pressure only to the first backup passage 251 connected to the simulation 50 from among the first and second backup passages 251 and 252. Therefore, the second cut valve 262 may transition to the closed state so as to prevent hydraulic pressure discharged from the hydraulic-pressure supply device 100 from flowing into the master cylinder 20 through the second backup passage 252. In addition, since the simulator valve 54 transitions to the closed state, the hydraulic pressure flowing from the hydraulic-pressure supply device 100 to the master cylinder 20 is prevented from leaking to the reservoir 30 through the simulation device 50 and the first reservoir passage 61.

During the inspection mode, the ECU may generate hydraulic pressure using the hydraulic-pressure supply device 100, and may analyze a pressure value of the master cylinder 20 measured by the passage pressure sensor PS1, such that the ECU may determine the presence or absence of a leak either in the master cylinder 20 or in the simulation device 50. The ECU may compare a pressing-medium hydraulic pressure value estimated to be generated in response to the operation of the hydraulic-pressure supply device 100 with an actual inner pressure of the first master chamber 20a measured by the passage pressure sensor PS1, such that the ECU may diagnose the presence or absence of a leak or air in the master cylinder 20, and may also diagnose the presence or absence of a leak in the simulation device 50. In more detail, the ECU may compare a first hydraulic pressure value of the first pressure chamber 112, that is calculated based on the operation of the hydraulic-pressure supply device 100, with a second hydraulic pressure value actually measured by the passage pressure sensor PS1. If two hydraulic pressure values (i.e., the first hydraulic pressure value and the second hydraulic pressure value) are identical to each other, the ECU may determine the absence of a leak in the master cylinder 20 or in the simulation device 50 and may also determine the absence of the air in the master cylinder 20. In contrast, when the first hydraulic pressure value is lower than the second hydraulic pressure value, this means that some parts of hydraulic pressure of the pressure medium supplied to the first master chamber 20a are lost, such that the ECU may determine the presence of a leak either in the master cylinder 20 or in the simulator valve 54 or the presence of air in the master cylinder 20, and may inform the driver of the result of determination.

An electronic brake system 2 according to the second embodiment of the present disclosure will hereinafter be described.

In the following detailed description of the electronic brake system 2 according to the second embodiment, the remaining parts other than other constituent elements denoted by different reference numbers not shown in the electronic brake system 1 of the first embodiment are identical to those of the electronic brake system 1 of the first embodiment, and as such a detailed description thereof will herein be omitted to avoid redundant description thereof.

Figure 11:
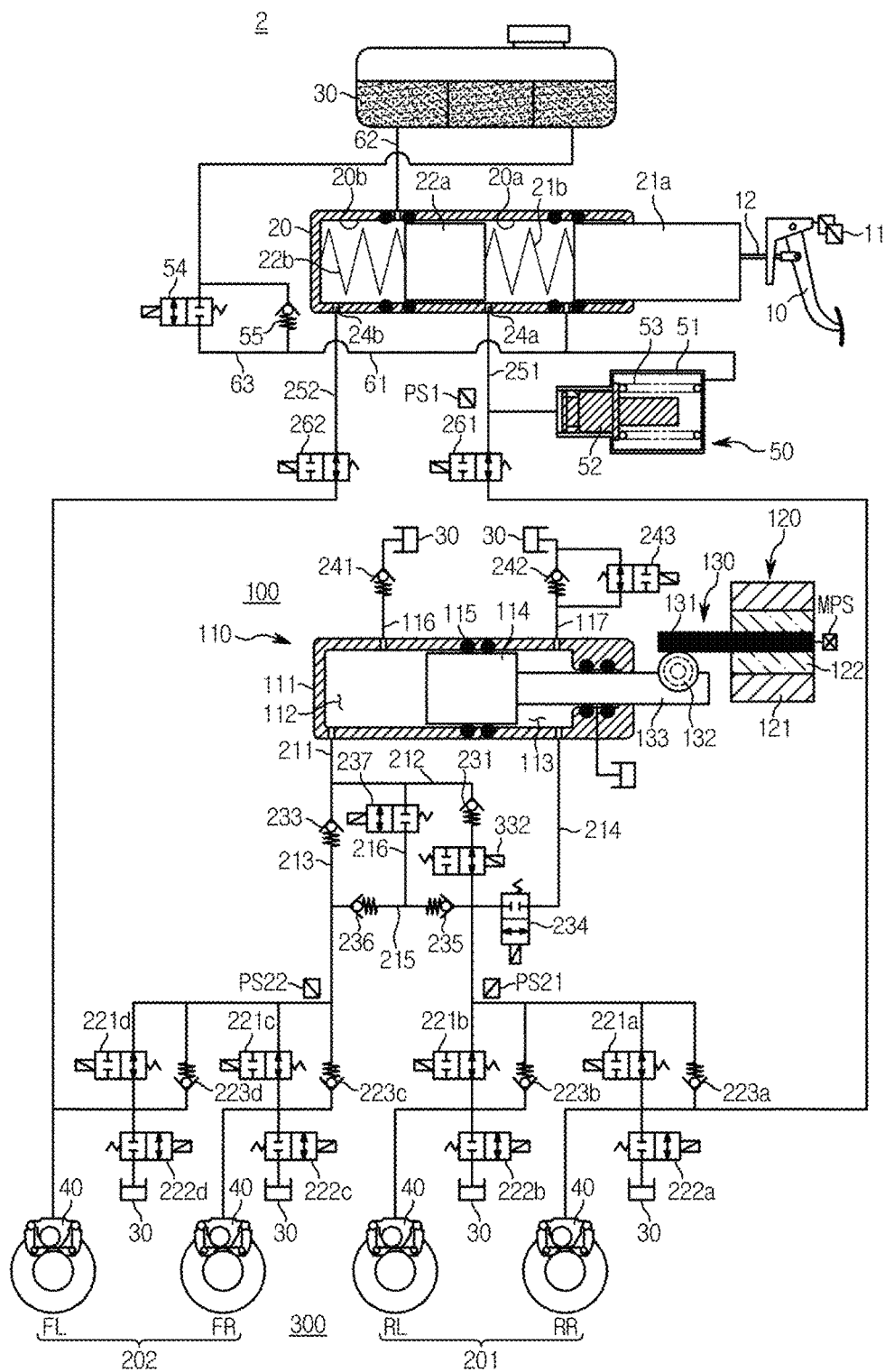
FIG. 11 is a hydraulic circuit diagram illustrating an electronic brake system according to a second embodiment of the present disclosure.

FIG. 11 is a hydraulic circuit diagram illustrating the electronic brake system 2 according to the second embodiment of the present disclosure. Referring to FIG. 11, a second valve 231 and a second valve 332 to control flow of the pressure medium may be sequentially provided in the second hydraulic passage 212. The second valve 231 may be provided as a check valve that allows the pressure medium to flow from the first pressure chamber 112 to the first hydraulic circuit 201 and prevents the pressure medium from flowing from the first hydraulic circuit 201 to the first pressure chamber 112. That is, the second valve 231 may allow a hydraulic pressure produced in the first pressure chamber 112 to flow into the first hydraulic circuit 201, and may prevent a hydraulic pressure produced in the first hydraulic circuit 201 from leaking to the first pressure chamber 112 through the second hydraulic passage 212.

The second valve 332 may be provided at the rear end of a specific position connected to the fourth hydraulic passage 214 on the second hydraulic passage 212. The second valve 332 may be implemented as a bidirectional valve to control flow of the pressure medium received through the second hydraulic passage 212. The first valve 232 may be implemented as a normally open (NO) solenoid valve that remains open in a normal state and is then open upon receiving a closing signal from the ECU.

The second valve 332 may be disposed between the pressure chamber of the hydraulic pressure generator and at least one wheel cylinder to be used for regenerative braking, such that the second valve 332 may selectively connect the pressure chamber to the corresponding hydraulic circuit or may selectively sever such connection between the pressure chamber and the corresponding hydraulic circuit, such that only some parts of hydraulic pressure of the pressure medium may be transmitted to the corresponding wheel cylinder. For example, as shown in FIG. 11, the second valve 332 may be provided in the second hydraulic passage 212 between the first pressure chamber 112 and the first hydraulic circuit 201 provided with the wheel cylinders 40 of the rear wheels RL and RR in which rear-wheel regenerative braking is implemented, such that the second valve 332 may selectively connect the first pressure chamber 112 to the first hydraulic circuit 201 or may selectively sever such connection between the first pressure chamber 112 and the first hydraulic circuit 201, and thus only some parts of hydraulic pressure of the pressure medium can be transmitted to the rear wheel cylinders 40. A detailed description thereof will hereinafter be described.

The rear-wheel regenerative braking operation of the electronic brake system 2 according to the second embodiment of the present disclosure will hereinafter be described with reference to the attached drawings.

Figure 12:
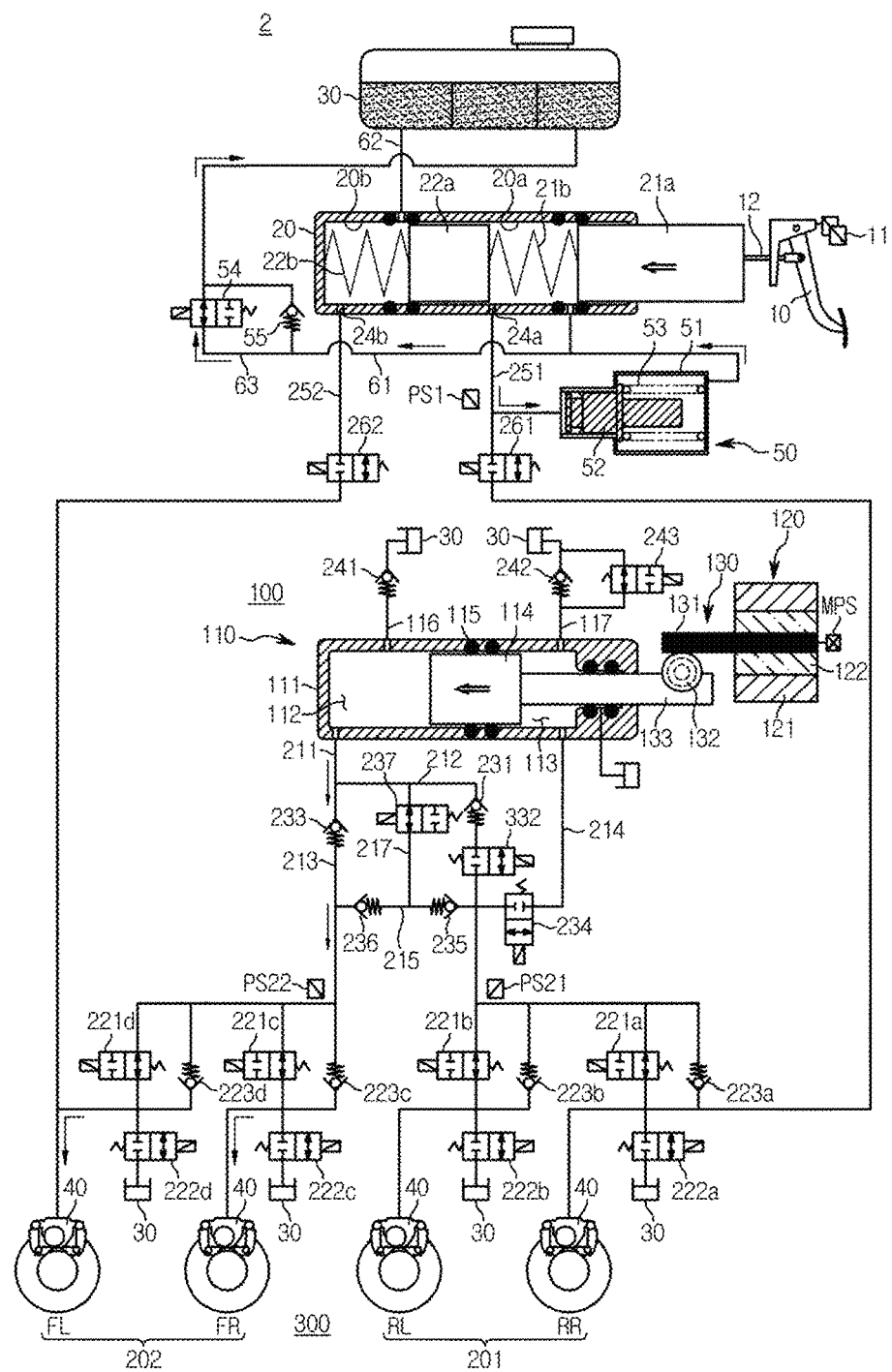
FIG. 12 is a hydraulic circuit diagram illustrating a rear-wheel regenerative braking state of the electronic brake system using brake pressure generated by forward movement of a hydraulic piston according to a second embodiment of the present disclosure.

FIG. 12 is a hydraulic circuit diagram illustrating an operate state of the electronic brake system 2 for providing brake pressure by forward movement of the hydraulic piston 114, and at the same time implementing a rear-wheel regenerative braking state according to the second embodiment of the present disclosure. Referring to FIG. 12, during the initial braking stage in which pressure of the low-pressure mode is provided, if the driver depresses the brake pedal 10, the motor 120 may rotate in one direction, rotational force of the motor 120 may be transmitted to the hydraulic-pressure providing unit 110 by the power switching unit 130, the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided at four wheels through the first hydraulic circuit 201 and the second hydraulic circuit 202, resulting in occurrence of braking force.

Thereafter, when the ECU determines that regenerative braking is driven in the rear wheels (for example, in the wheel cylinders 40 of the first hydraulic circuit 201), the ECU may calculate the magnitude of a brake hydraulic pressure calculated in response to a difference between a driver-requested brake pressure and a regenerative braking pressure, and the first hydraulic circuit 201 may close the second valve 332 after applying hydraulic pressure corresponding to the corresponding pressure level to the rear wheel cylinders 40. Accordingly, a brake hydraulic pressure of the rear wheels in which regenerative braking has occurred may be less than in a non-operation state of the regenerative-braking.

The ECU may stably control a brake hydraulic pressure flowing from the hydraulic-pressure supply device 100 to the rear wheel cylinders 40 of the first hydraulic circuit 201 using the passage pressure sensor PS21 that senses hydraulic pressure of the first hydraulic circuit 201. In more detail, the ECU may allow the passage pressure sensor PS22 to sense a brake hydraulic pressure applied to the front wheel cylinders 40 of the second hydraulic circuit 202 that receives only a brake hydraulic pressure caused by hydraulic pressure produced from the hydraulic-pressure supply device 100, may compare the sensed brake hydraulic pressure with the brake hydraulic pressure applied to the rear wheel cylinders 40 of the first hydraulic circuit 201, and may more precisely control a rear-wheel brake hydraulic pressure that needs to be blocked or reduced by the rear wheel cylinders 40 of the first hydraulic circuit 201 during regenerative braking.

As described above, during rear-wheel regenerative braking, the ECU may control operation of the second valve 332, such that a brake hydraulic pressure applied to the rear wheel cylinders 40 of the first hydraulic circuit 201 can be stably adjusted according to a regenerative braking pressure. As a result, a brake pressure or braking force can be evenly applied to four wheels of the vehicle, such that stability in vehicle braking is increased and oversteer or understeer of the vehicle is prevented, resulting in increased driving stability of the vehicle.

An electronic brake system 3 according to the third embodiment of the present disclosure will hereinafter be described.

In the following detailed description of the electronic brake system 3 according to the third embodiment, the remaining parts other than other constituent elements denoted by different reference numbers not shown in the electronic brake system 1 of the first embodiment are identical to those of the electronic brake system 1 of the first embodiment, and as such a detailed description thereof will herein be omitted to avoid redundant description thereof.

Figure 13:
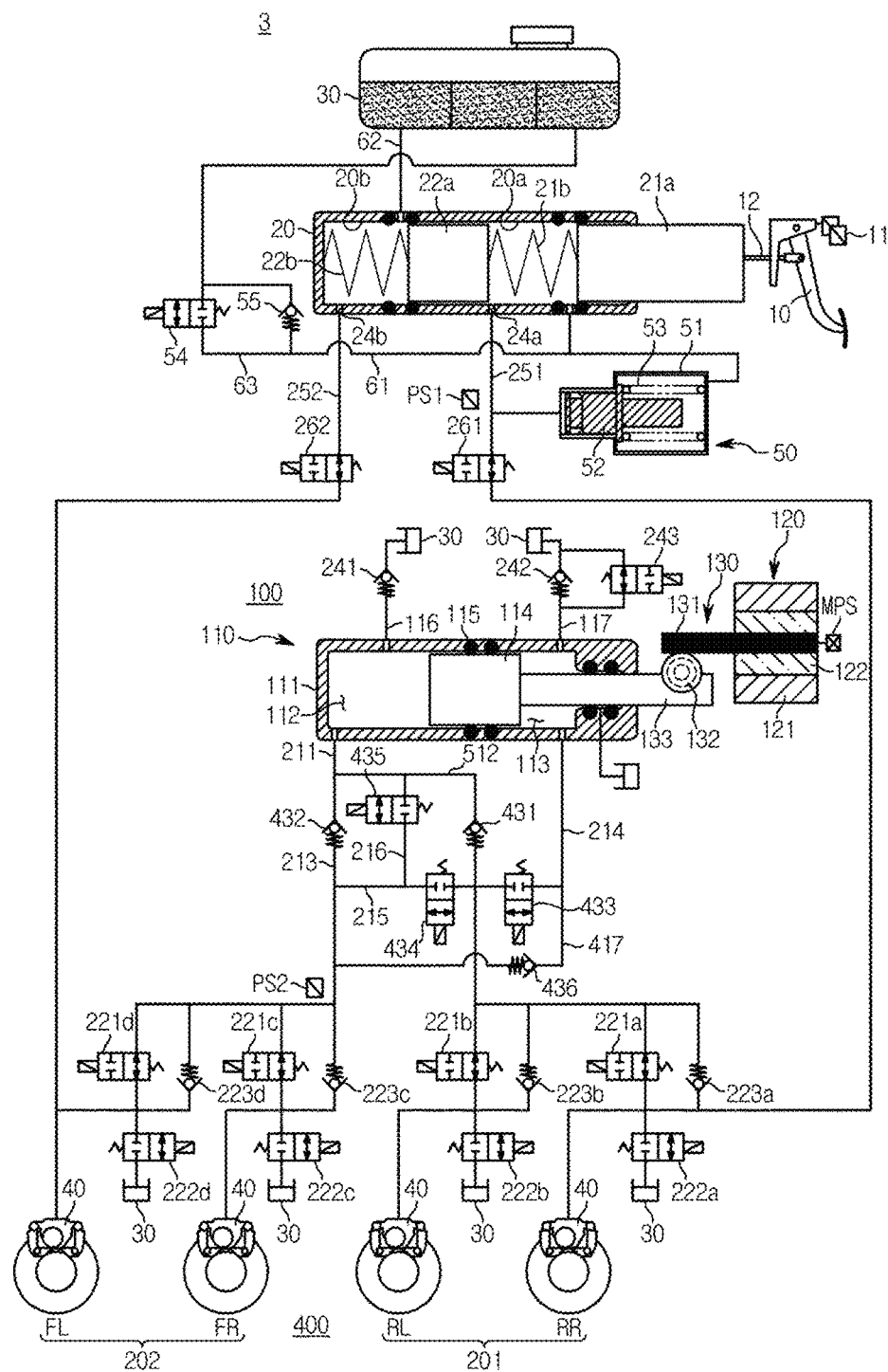
FIG. 13 is a hydraulic circuit diagram illustrating an electronic brake system according to a third embodiment of the present disclosure.

FIG. 13 is a hydraulic circuit diagram illustrating the electronic brake system 3 according to a third embodiment of the present disclosure.

Referring to FIG. 13, the first hydraulic passage 211 may be provided to connect the first pressure chamber 112 to the first and second hydraulic circuits 201 and 202. The first hydraulic passage 211 may be branched into a second hydraulic passage 212 communicating with the first hydraulic circuit 201 and a third hydraulic passage 213 communicating with the second hydraulic circuit 202. As a result, hydraulic pressure generated by the first pressure chamber 112 according to forward movement of the hydraulic piston 114 may be transmitted to the first hydraulic circuit 201 and the second hydraulic circuit 202 through the second hydraulic passage 212 and the third hydraulic passage 213.

The second hydraulic passage 212 may be provided with a first valve 431 to control flow of a pressure medium, and the third hydraulic passage 213 may be provided with a second valve 432 to control flow of a pressure medium. The first and second valves 431 and 432 may be implemented as check valves that allow a pressure medium to flow from the first pressure chamber 112 to the first and second hydraulic circuits 201 and 202 and prevent the pressure medium from flowing from the first and second hydraulic circuits 201 and 202 to the first pressure chamber 112. That is, the first and second valves 431 and 432 may allow hydraulic pressure of the first pressure chamber 112 to flow into the first and second hydraulic circuits 201 and 202, and may prevent hydraulic pressure of the first and second hydraulic circuits 201 and 202 from leaking to the first pressure chamber 112 through the second and third hydraulic passages 212 and 213.

The sixth hydraulic passage 214 may connect the second pressure chamber 113 to the first hydraulic circuit 201, and may be provided by branching of a seventh hydraulic passage 417. The seventh hydraulic passage 417 may be branched from the front end of the third valve 433 on the sixth hydraulic passage 214, and may be connected to the rear end of the second valve 432 on the third hydraulic passage 213. In addition, both ends of the fourth hydraulic passage 215 may respectively communicate with the rear ends of the first and second valves 431 and 432 on the second and third hydraulic passages 212 and 213, such that the second hydraulic passage 212 may be connected to the third hydraulic passage 213. Both ends of the fifth hydraulic passage 216 may respectively communicate with the front end of the first valve 431 and the fourth hydraulic passage 215 on the second hydraulic passage 212, such that the second hydraulic passage 212 may be connected to the fourth hydraulic passage 215.

The sixth hydraulic passage 214 may be provided with a third valve 433 to flow of the pressure medium. The third valve 433 may be implemented as a bidirectional valve to control flow of the pressure medium flowing through the sixth hydraulic passage 214. The third valve 433 may be implemented as a normally closed (NC) solenoid valve that remains closed in a normal state and is then open upon receiving an opening signal from the ECU.

The fourth hydraulic passage 215 may be provided with a fourth valve 434 to control flow of a pressure medium, and the sixth hydraulic passage 216 may be provided with a fifth valve 435 to control flow of a pressure medium.

The fourth valve 434 may be implemented as a bidirectional valve to control flow of the pressure medium flowing through the fourth hydraulic passage 215. The fourth valve 434 may be disposed between one position connected to the sixth hydraulic passage 216 on the fourth hydraulic passage 215 and the other point connected to the second hydraulic passage 212 on the fourth hydraulic passage 215. The fourth valve 434 may be implemented as a normally closed (NC) solenoid valve that remains closed in a normal state and is then open upon receiving an opening signal from the ECU.

The fourth hydraulic passage 215 may be provided with a fourth valve 434 to control flow of a pressure medium, and the fifth hydraulic passage 216 may be provided with a fifth valve 435 to control flow of a pressure medium.

The fourth valve 434 may be implemented as a bidirectional valve to control flow of the pressure medium flowing through the fourth hydraulic passage 215. The fourth valve 434 may be disposed between one position connected to the fifth hydraulic passage 216 on the fourth hydraulic passage 215 and the other point connected to the second hydraulic passage 212 on the fourth hydraulic passage 215. The fourth valve 434 may be implemented as a normally closed (NC) solenoid valve that remains closed in a normal state and is then open upon receiving an opening signal from the ECU.

The fifth valve 435 may be implemented as a bidirectional valve to control flow of the pressure medium flowing through the fifth hydraulic passage 216. The fifth valve 435 may be implemented as a normally closed (NC) solenoid valve that remains closed in a normal state and is then open upon receiving an opening signal from the ECU.

The seventh hydraulic passage 417 may be provided with a sixth valve 436 to control flow of the pressure medium.

The sixth valve 436 may be implemented as a check valve that allows the pressure medium to flow from the sixth hydraulic passage 214 communicating with the second pressure chamber 113 to the third hydraulic passage 213 and prevents the pressure medium from flowing from the third hydraulic passage 213 to the sixth hydraulic passage 214. That is, the sixth fourth valve 436 may prevent hydraulic pressure of the second hydraulic circuit 202 from leaking to the sixth hydraulic passage 214 through the seventh hydraulic passage 417.

By the above-mentioned passages and valves, hydraulic pressure produced in the second pressure chamber 113 by backward movement of the hydraulic piston 114 may be supplied to the second and third hydraulic passages 212 and 213 through the sixth hydraulic passage 214 and the seventh hydraulic passage 417, such that hydraulic pressure produced in the second pressure chamber 113 may be transmitted to the first hydraulic circuit 201 and the second hydraulic circuit 202.

A method for operating the electronic brake system 3 according to the third embodiment of the present disclosure will hereinafter be described.

The electronic brake system 3 according to the third embodiment may allow the hydraulic-pressure supply device 100 to be used in a low-pressure mode and a high-pressure mode in different ways. The hydraulic control unit 400 may operate in different ways according to the low-pressure mode and the high-pressure mode.

The hydraulic-pressure supply device 100 may use the high-pressure mode, such that the hydraulic-pressure supply device 100 can provide a high hydraulic pressure without increasing an output level of the motor 120, resulting in reduction in load applied to the motor 120. As a result, the production cost and weight of the brake system can be reduced and stable brake force can be obtained, resulting in an increase in durability and operational reliability of the brake system.

Figure 14:
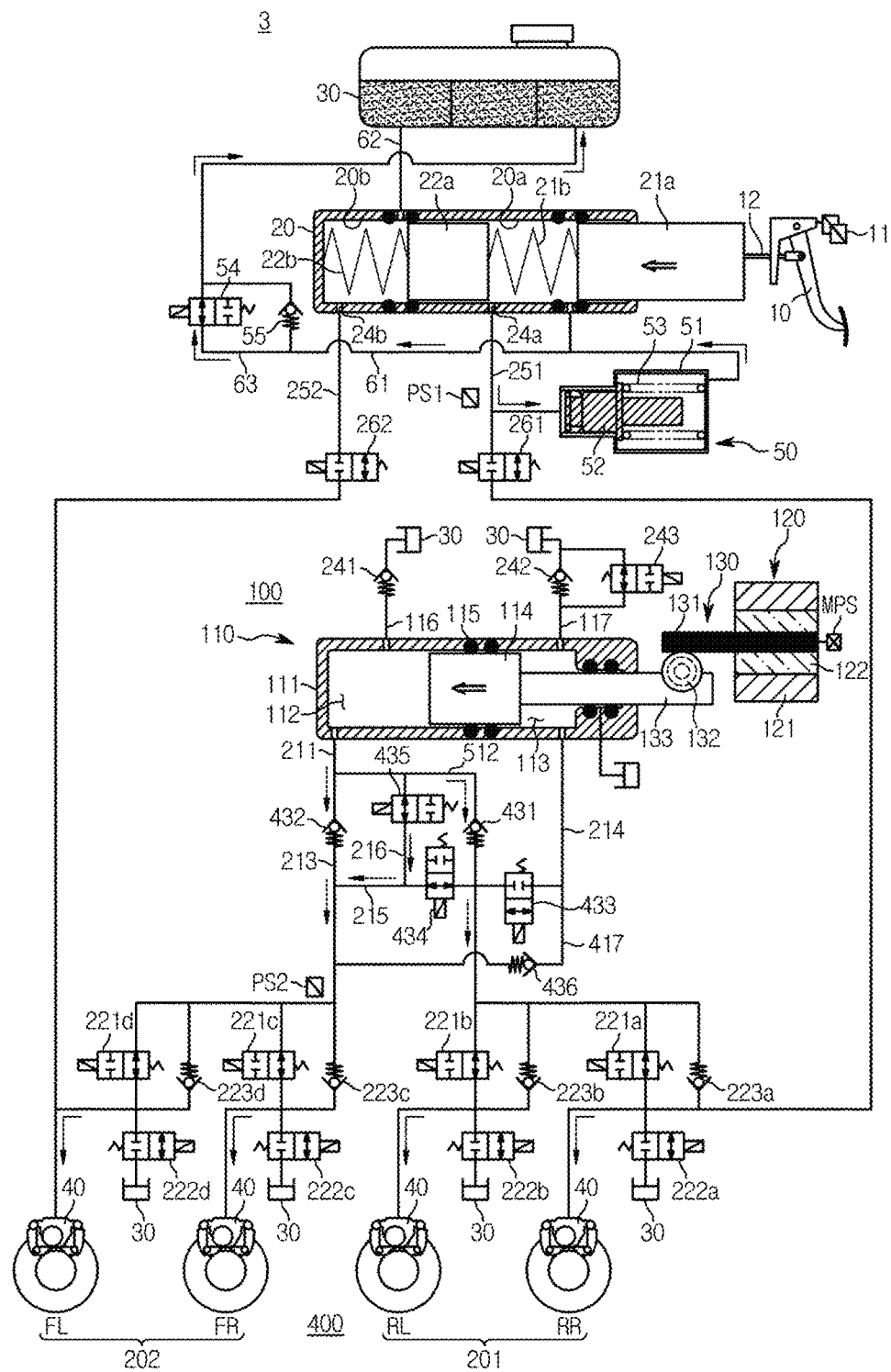
FIG. 14 is a hydraulic circuit diagram illustrating the electronic brake system for providing brake pressure of a low-pressure mode by forward movement of a hydraulic piston according to a third embodiment of the present disclosure.
Figure 15:
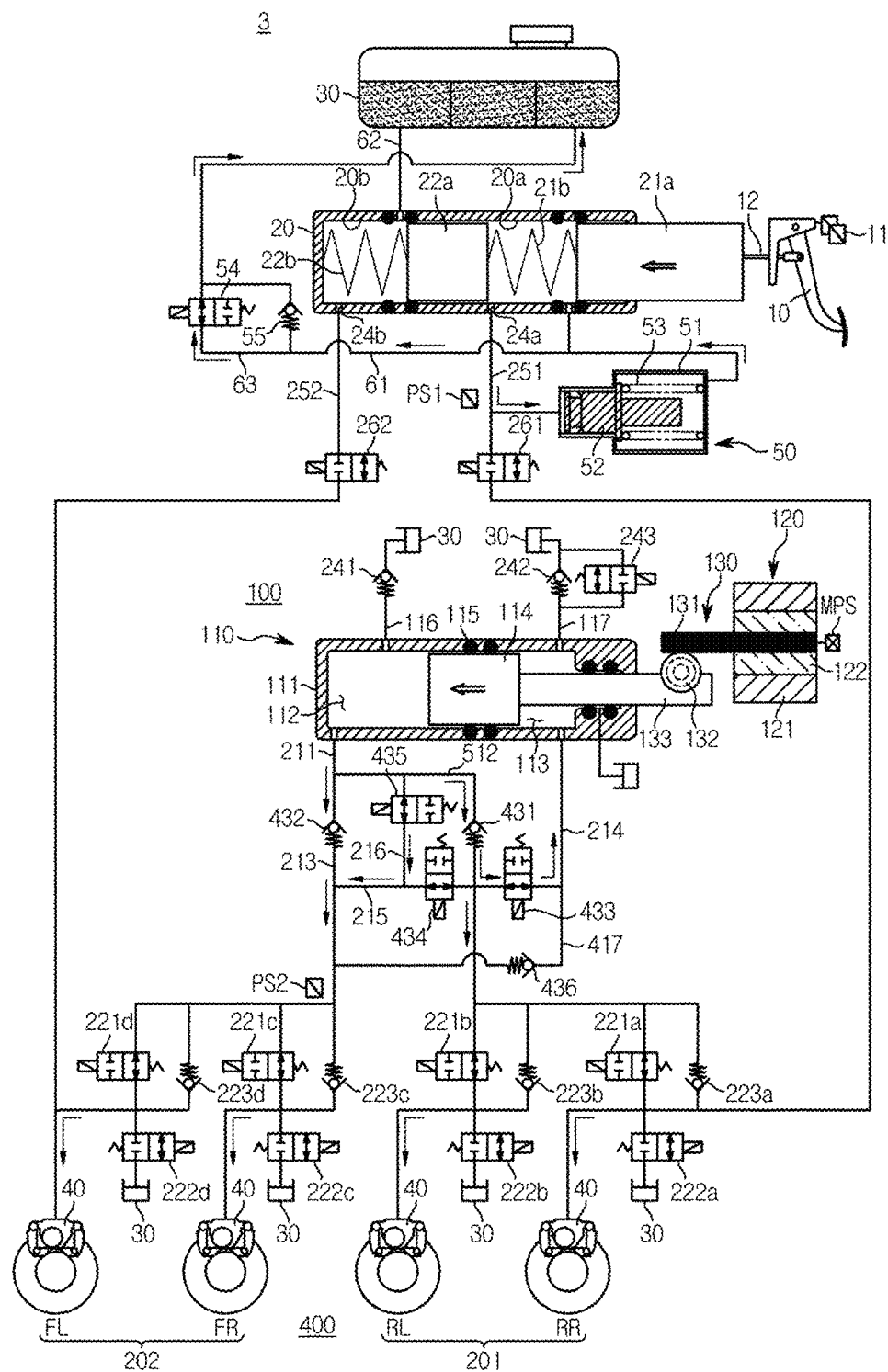
FIG. 15 is a hydraulic circuit diagram illustrating the electronic brake system for releasing brake pressure of a high-pressure mode by backward movement of a hydraulic piston according to a third embodiment of the present disclosure.

FIG. 14 is a hydraulic circuit diagram illustrating the electronic brake system 3 for providing brake pressure of the low-pressure mode by forward movement of the hydraulic piston 114 according to the third embodiment of the present disclosure. FIG. 15 is a hydraulic circuit diagram illustrating the electronic brake system 3 for providing brake pressure of the high-pressure mode by forward movement of the hydraulic piston 114 according to the third embodiment of the present disclosure.

Referring to FIG. 14, when the driver depresses the brake pedal 10 in the initial braking stage, the motor 120 may rotate in one direction, rotational force of the motor 120 may be transmitted to the hydraulic-pressure providing unit 110 by the power switching unit 130, the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided to four wheels through the first hydraulic circuit 201 and the second hydraulic circuit 202, such that braking force occurs in the wheel cylinders 40.

In more detail, hydraulic pressure supplied from the first pressure chamber 112 may be directly transmitted to the wheel cylinders 40 provided in the first hydraulic circuit 201 not only through the first hydraulic passage 211 connected to the first communication hole 111a, but also through the second hydraulic passage 212. In this case, the first and second inlet valves 221a and 222b respectively installed in two passages branched from the first hydraulic circuit 201 may remain open, and the first and second outlet valves 222a and 222b installed in passages branched from two passages branched from the first hydraulic circuit 201 may remain closed, such that hydraulic pressure is prevented from leaking to the reservoir 30.

In addition, hydraulic pressure supplied from the first pressure chamber 112 may be directly transmitted to the wheel cylinders 40 provided in the second hydraulic circuit 202 not only through the first hydraulic passage 211 connected to the first communication hole 111a, but also through the third hydraulic passage 213. In this case, the third and fourth inlet valves 221c and 222d respectively installed in two passages branched from the second hydraulic circuit 202 may remain open, and the third and fourth outlet valves 222c and 222d installed in passages branched from two passages branched from the second hydraulic circuit 202 may remain closed, such that hydraulic pressure is prevented from leaking to the reservoir 30.

Further, the fourth valve 434 and the fifth valve 435 may transition to the open state, such that the fourth hydraulic passage 215 and the fifth hydraulic passage 216 may be open. Since the fourth hydraulic passage 215 and the fifth hydraulic passage 216 are opened, hydraulic pressure supplied from the first pressure chamber 112 may sequentially pass through the first hydraulic passage 211, the second hydraulic passage 212, the fifth hydraulic passage 216, and the fourth hydraulic passage 215, and may be transmitted to the first hydraulic circuit 201 and the second hydraulic circuit 202 after passing through the second hydraulic passage 212 and the third hydraulic passage 213. However, at least one of the fourth valve 434 and the fifth valve 435 may also remain closed as necessary.

The third valve 433 may remain closed, such that the sixth hydraulic passage 214 can be blocked. As a result, hydraulic pressure produced in the first pressure chamber 112 may be prevented from flowing into the second pressure chamber 113 through the sixth hydraulic passage 214, such that a pressure increase rate per stroke of the hydraulic piston 114 may be improved. Therefore, the electronic brake system 3 may obtain a rapid braking response in the initial braking stage.

The hydraulic-pressure supply device 100 of the electronic brake system 3 according to the third embodiment may transition from the low-pressure mode shown in FIG. 14 to the high-pressure mode shown in FIG. 15 before the hydraulic piston 114 moves forward by a maximum distance.

Referring to FIG. 15, if a hydraulic pressure sensed by each of the passage pressure sensor PS2 is higher than a predetermined pressure level, the ECU may transition from the low-pressure mode to the high-pressure mode. During the high-pressure mode, the third valve 433 may transition to the open state, such that the sixth hydraulic passage 214 may be open. Therefore, some parts of the hydraulic pressure produced in the first pressure chamber 112 may be transmitted to the second pressure chamber 113 either after sequentially passing through the first hydraulic passage 211, the second hydraulic passage 212, and the sixth hydraulic passage 214, or after sequentially passing through the first hydraulic passage 211, the second hydraulic passage 212, the fifth hydraulic passage 216, and the sixth hydraulic passage 214, such that the resultant hydraulic pressure can allow the hydraulic piston 114 to move farther forward and load applied to the motor 120 can also be reduced.

In the high-pressure mode, some parts of the pressure medium discharged from the first pressure chamber 112 may flow into the second pressure chamber 113, such that the pressure increase rate per stroke is reduced. However, some parts of a hydraulic pressure produced in the first pressure chamber 112 may allow the hydraulic piston 114 to move farther forward, such that a maximum pressure of the pressure medium can be increased. The reason why the maximum pressure of the pressure medium is increased is that the drive shaft 133 passes through the second pressure chamber 113 so that a volume change rate per stroke of the hydraulic piston 114 is relatively smaller in the second pressure chamber 113 than in the first pressure chamber 112.

In addition, as the hydraulic piston 114 moves farther forward, a hydraulic pressure of the first pressure chamber 112 is increased, force needed for backward movement of the hydraulic piston 114 affected by the increased hydraulic pressure of the first pressure chamber 112 becomes stronger, such that load applied to the motor 120 is also increased. However, the sixth hydraulic circuit 214 is open under control of the third valve 433, and some parts of the pressure medium discharged from the first pressure chamber 112 are transmitted to the second pressure chamber 113, such that a hydraulic pressure may also occur in the second pressure chamber 113, resulting in reduction of load applied to the motor 120.

A method for supplying a brake pressure to the wheel cylinders 40 by backward movement of the hydraulic piston 114 will hereinafter be described.

Figure 16:
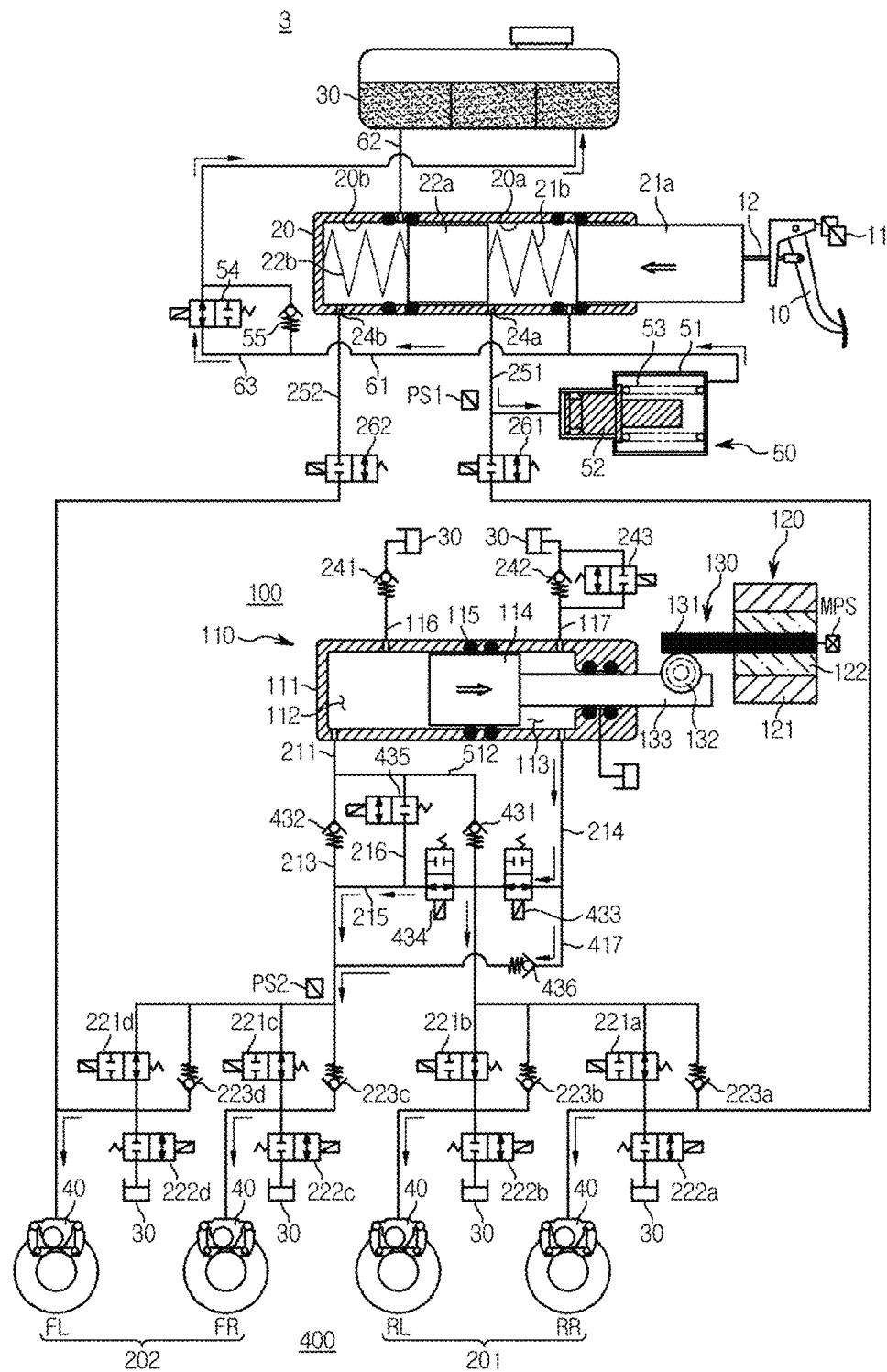
FIG. 16 is a hydraulic circuit diagram illustrating the electronic brake system for releasing brake pressure of a low-pressure mode by backward movement of a hydraulic piston according to a third embodiment of the present disclosure.

FIG. 16 is a hydraulic circuit diagram illustrating the electronic brake system 3 for providing brake pressure by backward movement of the hydraulic piston 114 according to the third embodiment of the present disclosure. Referring to FIG. 16, during the initial braking stage, if the driver depresses the brake pedal 10, the motor 120 may rotate in an opposite direction, rotational force of the motor 120 may be transmitted to the hydraulic-pressure providing unit 110 by the power switching unit 130, the hydraulic piston 114 of the hydraulic-pressure providing unit 110 moves backward, such that hydraulic pressure may occur in the second pressure chamber 113. Hydraulic pressure discharged from the second pressure chamber 113 may be transmitted to the wheel cylinders 40 respectively provided at four wheels through the first hydraulic circuit 201 and the second hydraulic circuit 202, resulting in occurrence of braking force.

In more detail, hydraulic pressure from the second pressure chamber 113 may be directly transmitted to two wheel cylinders 40 mounted to the first hydraulic circuit 201 not only through the sixth hydraulic passage 214 connected to the second communication hole 111b, but also through the second hydraulic passage 212. In this case, the first and second inlet valves 221a and 221b may remain open, and the first and second outlet valves 222a and 221b may remain closed, such that hydraulic pressure can be prevented from leaking to the reservoir 30.

In addition, hydraulic pressure from the second pressure chamber 113 may sequentially pass through the sixth hydraulic passage 214 connected to the second communication hole 111b, the fourth hydraulic passage 215, and the third hydraulic passage 213, or may sequentially pass through the sixth hydraulic passage 214, the seventh hydraulic passage 417, and the third hydraulic passage 213, such that the resultant hydraulic pressure is directly transmitted to the wheel cylinders 40 of the second hydraulic circuit 202. In this case, the third and fourth inlet valves 221c and 221d may remain open, and the third and fourth outlet valves 222c and 222d may remain closed, such that hydraulic pressure is prevented from leaking to the reservoir 30.

In this case, the third valve 433 may transition to the open state such that the sixth and fourth hydraulic passages 214 and 215 are open. The sixth valve 436 is provided as a check valve for allowing the pressure medium to flow from the second pressure chamber 113 to the wheel cylinders 40, such that the seventh hydraulic passage 417 may also be open.

In addition, the fifth valve 435 may remain closed, such that the fifth hydraulic passage 216 can be blocked. As a result, hydraulic pressure produced in the second pressure chamber 113 may be prevented from flowing into the first pressure chamber 112 through the fifth hydraulic passage 216, such that a pressure increase rate per stroke of the hydraulic piston 114 may be improved. Therefore, the electronic brake system 3 may obtain a rapid braking response in the initial braking stage.

In this case, the third dump valve 243 may transition to the closed state. Since the third dump valve 243 is closed, hydraulic pressure of the pressure medium can rapidly and stably occur in the second pressure chamber 113, and hydraulic pressure from the second pressure chamber 113 may be discharged only to the sixth hydraulic passage 214.

An electronic brake system 4 according to the fourth embodiment of the present disclosure will hereinafter be described.

In the following detailed description of the electronic brake system 4 according to the fourth embodiment, the remaining parts other than other constituent elements denoted by different reference numbers not shown in the electronic brake system 3 of the third embodiment are identical to those of the electronic brake system 3 of the third embodiment, and as such a detailed description thereof will herein be omitted to avoid redundant description thereof.

Figure 17:
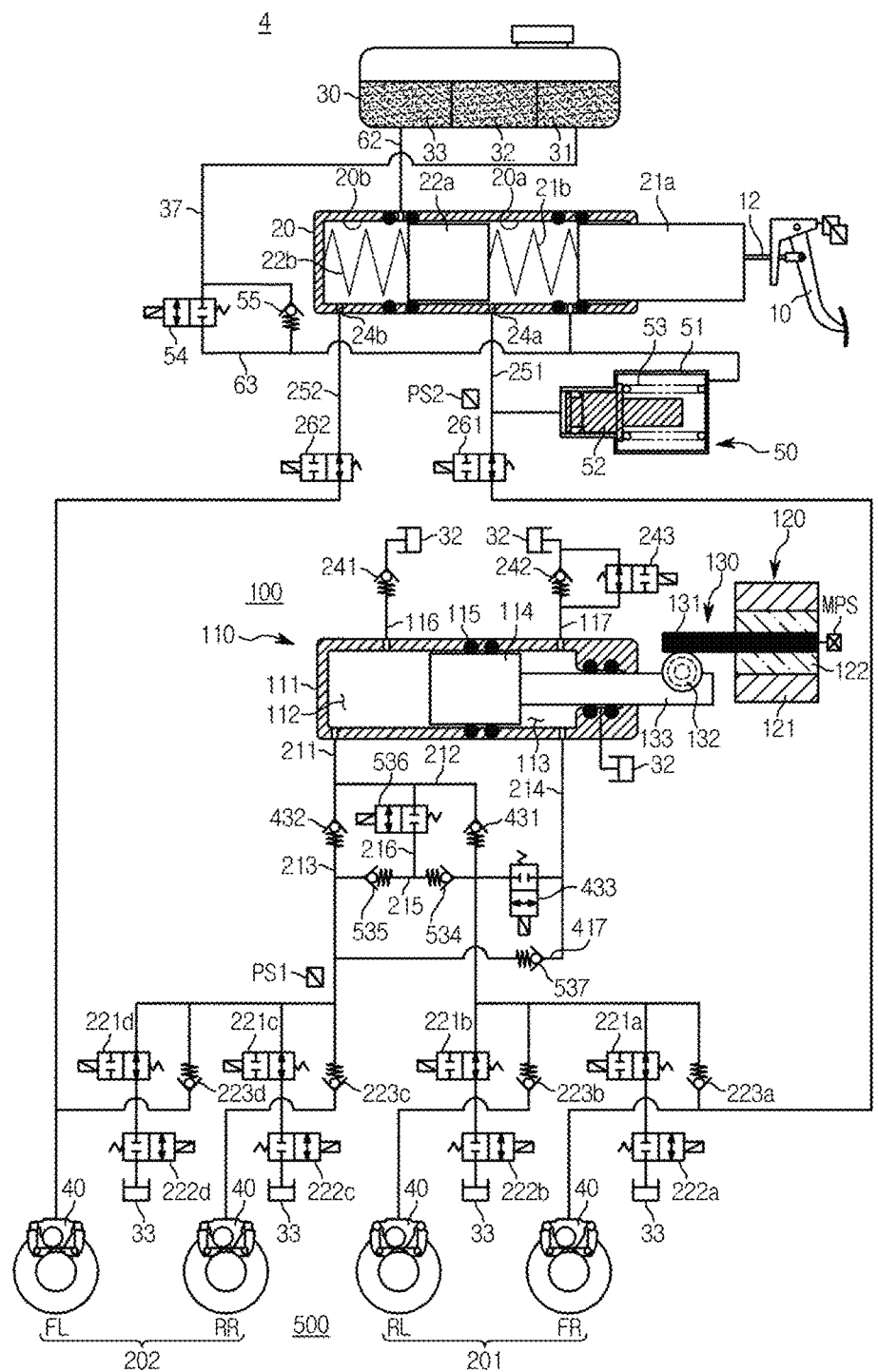
FIG. 17 is a hydraulic circuit diagram illustrating an electronic brake system according to a fourth embodiment of the present disclosure.

FIG. 17 is a hydraulic circuit diagram illustrating the electronic brake system 4 according to the fourth embodiment of the present disclosure.

Referring to FIG. 17, the first hydraulic passage 211 may be provided to connect the first pressure chamber 112 to the first and second hydraulic circuits 201 and 202. The first hydraulic passage 211 may be branched into a second hydraulic passage 212 communicating with the first hydraulic circuit 201 and a third hydraulic passage 213 communicating with the second hydraulic circuit 202. As a result, hydraulic pressure generated by the first pressure chamber 112 according to forward movement of the hydraulic piston 114 may be transmitted to the first hydraulic circuit 201 and the second hydraulic circuit 202 through the second hydraulic passage 212 and the third hydraulic passage 213.

The second hydraulic passage 212 may be provided with a first valve 431 to control flow of a pressure medium, and the third hydraulic passage 213 may be provided with a second valve 432 to control flow of a pressure medium. The first and second valves 431 and 432 may be implemented as check valves that allow a pressure medium to flow from the first pressure chamber 112 to the first and second hydraulic circuits 201 and 202 and prevent the pressure medium from flowing from the first and second hydraulic circuits 201 and 202 to the first pressure chamber 112. That is, the first and second valves 431 and 432 may allow hydraulic pressure of the first pressure chamber 112 to flow into the first and second hydraulic circuits 201 and 202, and may prevent hydraulic pressure of the first and second hydraulic circuits 201 and 202 from leaking to the first pressure chamber 112 through the second and third hydraulic passages 212 and 213.

The sixth hydraulic passage 214 may connect the second pressure chamber 113 to the first hydraulic circuit 201, and may be provided by branching of a seventh hydraulic passage 417. The seventh hydraulic passage 417 may be branched from the front end of the third valve 433 on the sixth hydraulic passage 214, and may be connected to the rear end of the second valve 432 on the third hydraulic passage 213. In addition, both ends of the fourth hydraulic passage 215 may respectively communicate with the rear ends of the first and second valves 431 and 432 on the second and third hydraulic passages 212 and 213, such that the second hydraulic passage 212 may be connected to the third hydraulic passage 213. Both ends of the fifth hydraulic passage 216 may respectively communicate with the front end of the first valve 431 and the fourth hydraulic passage 215 on the second hydraulic passage 212, such that the second hydraulic passage 212 may be connected to the fourth hydraulic passage 215.

The sixth hydraulic passage 214 may be provided with a third valve 433 to flow of a pressure medium. The third valve 433 may be implemented as a bidirectional valve to control flow of the pressure medium flowing through the sixth hydraulic passage 214. The third valve 433 may be implemented as a normally closed (NC) solenoid valve that remains closed in a normal state and is then open upon receiving an opening signal from the ECU.

The fourth hydraulic passage 215 may be provided with a fourth valve 534 and a fifth valve 535 that are used to control flow of a pressure medium.

The fourth valve 534 may be disposed between a first position connected to the fifth hydraulic passage 216 on the fourth hydraulic passage 215 and a second position connected to the second hydraulic passage 212 on the fourth hydraulic passage 215. The fourth valve 534 may be implemented as a check valve that allows the pressure medium to flow in only one direction from the second point to the first point and prevents the pressure medium from flowing in a direction from the first point to the second point.

The fifth valve 535 may be disposed between a third position connected to the fifth hydraulic passage 216 on the fourth hydraulic passage 215 and a fourth position connected to the third hydraulic passage 213 on the fourth hydraulic passage 215. The fifth valve 535 may be implemented as a check valve that allows the pressure medium to flow in only one direction from the fourth point to the third point and prevents the pressure medium from flowing in a direction from the third point to the fourth point.

The sixth valve 536 may be implemented as a bidirectional valve to control flow of the pressure medium flowing through the fifth hydraulic passage 216. The sixth valve 536 may be implemented as a normally closed (NC) solenoid valve that remains closed in a normal state and is then open upon receiving an opening signal from the ECU.

The seventh hydraulic passage 417 may be provided with a seventh valve 537 to control flow of the pressure medium.

The seventh valve 537 may be implemented as a check valve that allows a pressure medium to flow from the sixth hydraulic passage 214 communicating with the second pressure chamber 113 to the third hydraulic passage 213 and prevents the pressure medium from flowing from the third hydraulic passage 213 to the sixth hydraulic passage 214. That is, the seventh valve 537 may prevent hydraulic pressure of the second hydraulic circuit 202 from leaking to the sixth hydraulic passage 214 through the seventh hydraulic passage 417.

A method for operating the electronic brake system 4 according to the fourth embodiment of the present disclosure will hereinafter be described.

The electronic brake system 4 according to the fourth embodiment may allow the hydraulic-pressure supply device 100 to be used in a low-pressure mode and a high-pressure mode in different ways. The hydraulic control unit 500 may operate in different ways according to the low-pressure mode and the high-pressure mode. The hydraulic-pressure supply device 100 may use the high-pressure mode, such that the hydraulic-pressure supply device 100 can provide a high hydraulic pressure without increasing an output level of the motor 120, resulting in reduction in load applied to the motor 120. As a result, the production cost and weight of the brake system can be reduced and stable brake force can be obtained, resulting in an increase in durability and operational reliability of the brake system.

Figure 18:
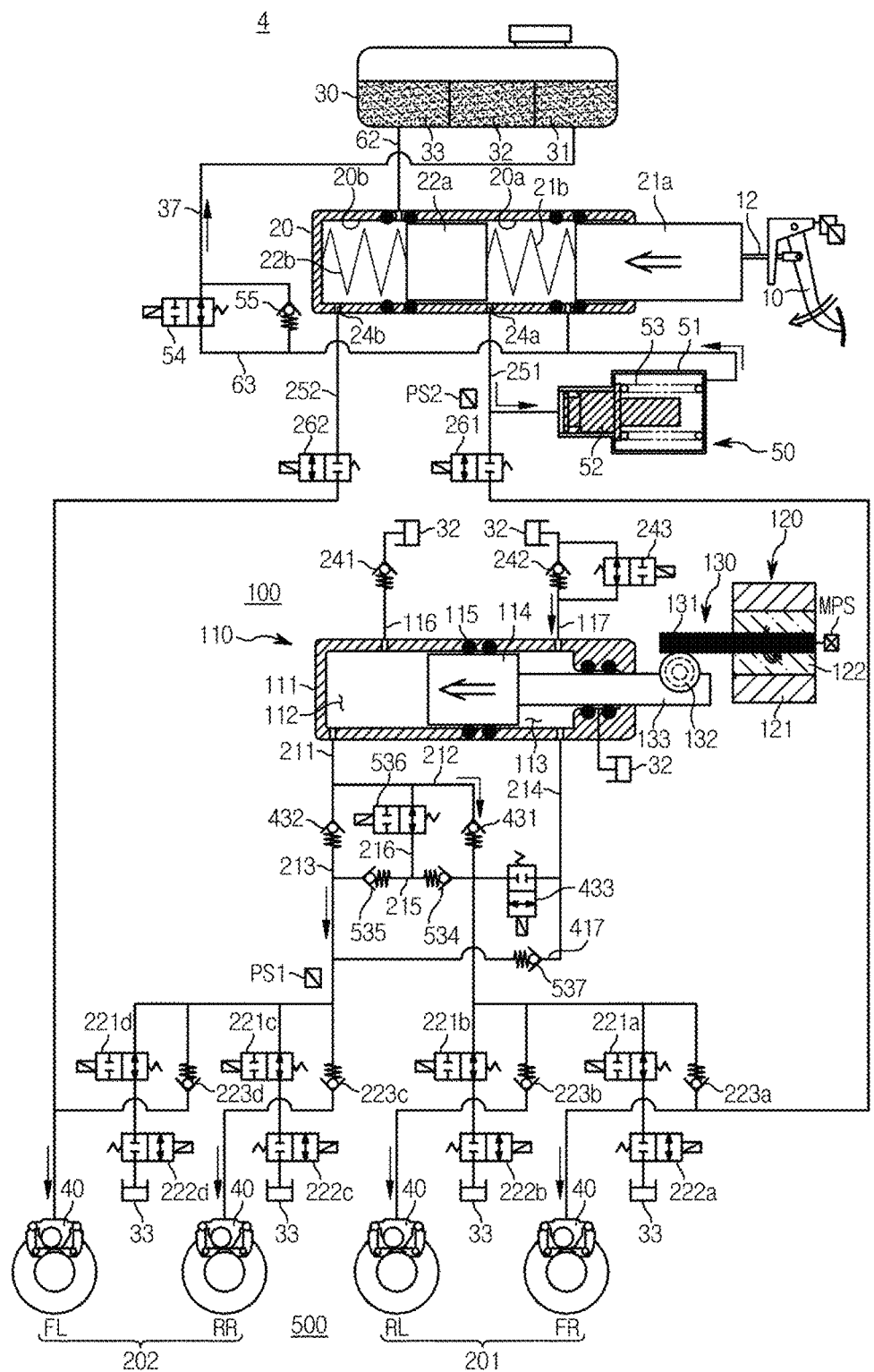
FIG. 18 is a hydraulic circuit diagram illustrating the electronic brake system for providing brake pressure of a low-pressure mode by forward movement of a hydraulic piston according to a fourth embodiment of the present disclosure.
Figure 19:
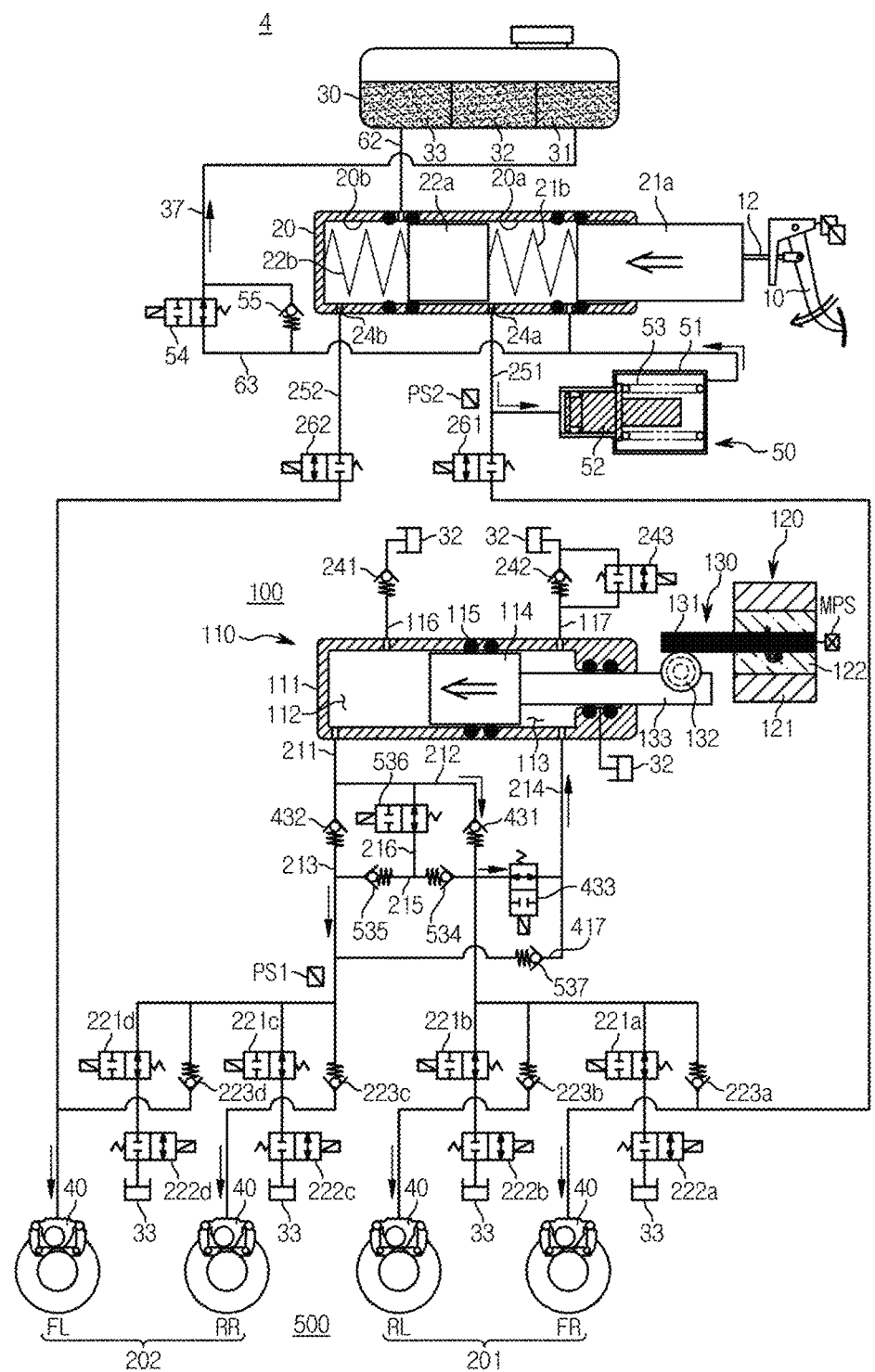
FIG. 19 is a hydraulic circuit diagram illustrating the electronic brake system for releasing brake pressure of a high-pressure mode by backward movement of a hydraulic piston according to a fourth embodiment of the present disclosure.

FIG. 18 is a hydraulic circuit diagram illustrating the electronic brake system 4 for providing brake pressure of the low-pressure mode by forward movement of the hydraulic piston 114 according to the fourth embodiment of the present disclosure. FIG. 19 is a hydraulic circuit diagram illustrating the electronic brake system 4 for providing brake pressure of the high-pressure mode by forward movement of the hydraulic piston 114 according to the fourth embodiment of the present disclosure.

Referring to FIG. 18, when the driver depresses the brake pedal 10 in the initial braking stage, the motor 120 may rotate in one direction, rotational force of the motor 120 may be transmitted to the hydraulic-pressure providing unit 110 by the power switching unit 130, the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided to four wheels through the first hydraulic circuit 201 and the second hydraulic circuit 202, such that braking force occurs in the wheel cylinders 40.

In more detail, hydraulic pressure supplied from the first pressure chamber 112 may be directly transmitted to the wheel cylinders 40 provided in the first hydraulic circuit 201 not only through the first hydraulic passage 211 connected to the first communication hole 111a, but also through the second hydraulic passage 212. In this case, the first and second inlet valves 221a and 222b respectively installed in two passages branched from the first hydraulic circuit 201 may remain open, and the first and second outlet valves 222a and 222b installed in passages branched from two passages branched from the first hydraulic circuit 201 may remain closed, such that hydraulic pressure is prevented from leaking to the reservoir 30.

In addition, hydraulic pressure supplied from the first pressure chamber 112 may be directly transmitted to the wheel cylinders 40 provided in the second hydraulic circuit 202 not only through the first hydraulic passage 211 connected to the first communication hole 111a, but also through the third hydraulic passage 213. In this case, the third and fourth inlet valves 221c and 222d respectively installed in two passages branched from the second hydraulic circuit 202 may remain open, and the third and fourth outlet valves 222c and 222d installed in passages branched from two passages branched from the second hydraulic circuit 202 may remain closed, such that hydraulic pressure is prevented from leaking to the reservoir 30. The sixth valve 536 may transition to the open state, or may remain closed as necessary.

The third valve 433 may remain closed, such that the sixth hydraulic passage 214 can be blocked. As a result, hydraulic pressure produced in the first pressure chamber 112 may be prevented from flowing into the second pressure chamber 113 through the sixth hydraulic passage 214, such that a pressure increase rate per stroke of the hydraulic piston 114 may be improved. Therefore, the electronic brake system 4 may obtain a rapid braking response in the initial braking stage.

The hydraulic-pressure supply device 100 of the electronic brake system 4 according to the fourth embodiment may transition from the low-pressure mode shown in FIG. 18 to the high-pressure mode shown in FIG. 19 before the hydraulic piston 114 moves forward by a maximum distance.

Referring to FIG. 19, if a hydraulic pressure sensed by each of the passage pressure sensor PS2 is higher than a predetermined pressure level, the ECU may transition from the low-pressure mode to the high-pressure mode. During the high-pressure mode, the third valve 433 may transition to the open state, such that the sixth hydraulic passage 214 may be open. Therefore, some parts of the hydraulic pressure produced in the first pressure chamber 112 may be transmitted to the second pressure chamber 113 after sequentially passing through the first hydraulic passage 211, the second hydraulic passage 212, and the sixth hydraulic passage 214, such that the resultant hydraulic pressure can allow the hydraulic piston 114 to move farther forward and load applied to the motor 120 can also be reduced.

In the high-pressure mode, some parts of the pressure medium discharged from the first pressure chamber 112 may flow into the second pressure chamber 113, such that the pressure increase rate per stroke is reduced. However, some parts of a hydraulic pressure produced in the first pressure chamber 112 may allow the hydraulic piston 114 to move farther forward, such that a maximum pressure of the pressure medium can be increased. The reason why the maximum pressure of the pressure medium is increased is that the drive shaft 133 passes through the second pressure chamber 113 so that a volume change rate per stroke of the hydraulic piston 114 is relatively smaller in the second pressure chamber 113 than in the first pressure chamber 112.

In addition, as the hydraulic piston 114 moves farther forward, a hydraulic pressure of the first pressure chamber 112 is increased, force needed for backward movement of the hydraulic piston 114 affected by the increased hydraulic pressure of the first pressure chamber 112 becomes stronger, such that load applied to the motor 120 is also increased. However, the sixth hydraulic circuit 214 is open under control of the third valve 433, and some parts of the pressure medium discharged from the first pressure chamber 112 are transmitted to the second pressure chamber 113, such that a hydraulic pressure may also occur in the second pressure chamber 113, resulting in reduction of load applied to the motor 120.

A method for supplying a brake pressure to the wheel cylinders 40 by backward movement of the hydraulic piston 114 will hereinafter be described.

Figure 20:
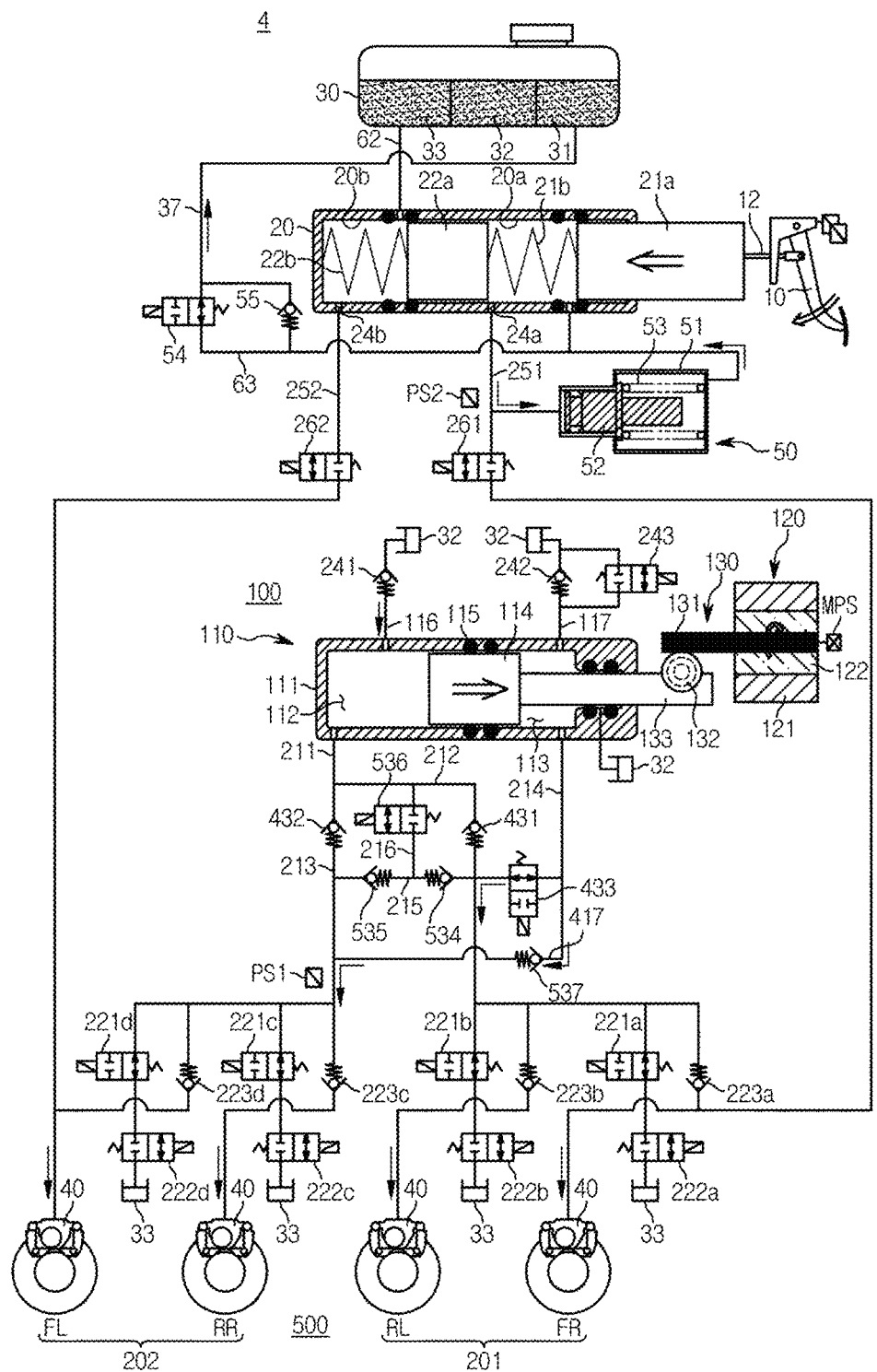
FIG. 20 is a hydraulic circuit diagram illustrating the electronic brake system for releasing brake pressure of a low-pressure mode by backward movement of a hydraulic piston according to a fourth embodiment of the present disclosure.

FIG. 20 is a hydraulic circuit diagram illustrating the electronic brake system 4 for providing brake pressure by backward movement of the hydraulic piston 114 according to the fourth embodiment of the present disclosure. Referring to FIG. 20, during the initial braking stage, if the driver depresses the brake pedal 10, the motor 120 may rotate in an opposite direction, rotational force of the motor 120 may be transmitted to the hydraulic-pressure providing unit 110 by the power switching unit 130, the hydraulic piston 114 of the hydraulic-pressure providing unit 110 moves backward, such that hydraulic pressure may occur in the second pressure chamber 113. Hydraulic pressure discharged from the second pressure chamber 113 may be transmitted to the wheel cylinders 40 respectively provided at four wheels through the first hydraulic circuit 201 and the second hydraulic circuit 202, resulting in occurrence of braking force.

In more detail, hydraulic pressure from the second pressure chamber 113 may be directly transmitted to two wheel cylinders 40 mounted to the first hydraulic circuit 201 not only through the sixth hydraulic passage 214 connected to the second communication hole 111b, but also through the second hydraulic passage 212. In this case, the first and second inlet valves 221a and 221b may remain open, and the first and second outlet valves 222a and 221b may remain closed, such that hydraulic pressure can be prevented from leaking to the reservoir 30.

In addition, hydraulic pressure from the second pressure chamber 113 may sequentially pass through the sixth hydraulic passage 214 connected to the second communication hole 111b, the seventh hydraulic passage 417, and the third hydraulic passage 413, such that the resultant hydraulic pressure is directly transmitted to the wheel cylinders 40 of the second hydraulic circuit 202. In this case, the third and fourth inlet valves 221c and 221d may remain open, and the third and fourth outlet valves 222c and 222d may remain closed, such that hydraulic pressure is prevented from leaking to the reservoir 30.

In this case, the seventh valve 537 is provided as a check valve for allowing the pressure medium to flow from the second pressure chamber 113 to the wheel cylinders 40, such that the seventh hydraulic passage 417 may be open.

The sixth valve 536 may remain closed, such that the fifth hydraulic passage 216 can be blocked. As a result, hydraulic pressure produced in the second pressure chamber 113 may be prevented from flowing into the first pressure chamber 112 through the fifth hydraulic passage 216, such that a pressure increase rate per stroke of the hydraulic piston 114 may be improved. Therefore, the electronic brake system 4 may obtain a rapid braking response in the initial braking stage.

In this case, the third dump valve 243 may transition to the closed state. Since the third dump valve 243 is closed, hydraulic pressure of the pressure medium can rapidly and stably occur in the second pressure chamber 113, and hydraulic pressure from the second pressure chamber 113 may be discharged only to the sixth hydraulic passage 214.

A method for releasing brake pressure in a normal operation state of the electronic brake system 4 according to the fourth embodiment of the present disclosure will hereinafter be described with reference to the attached drawings.

Figure 21:
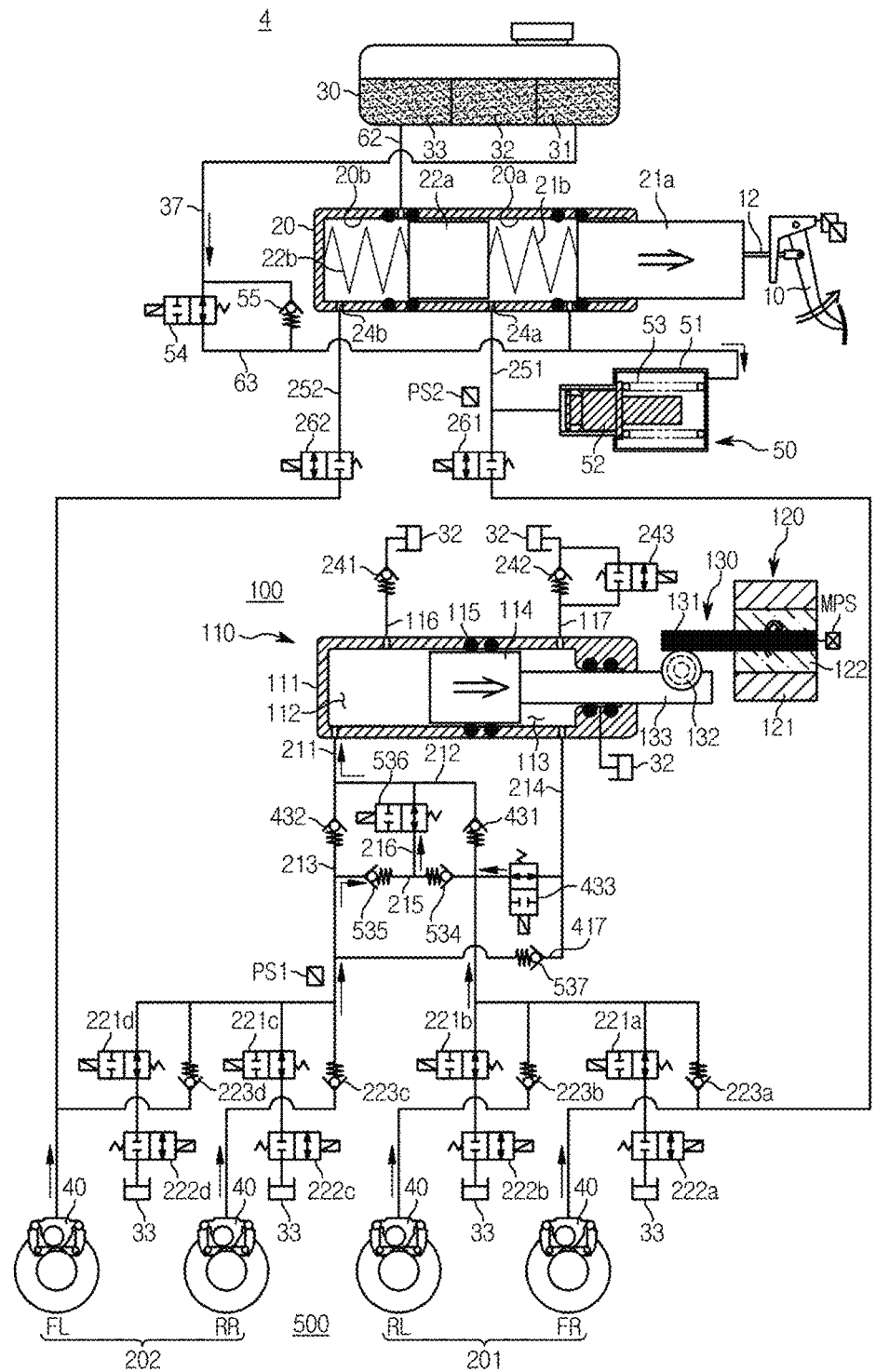
FIG. 21 is a hydraulic circuit diagram illustrating the electronic brake system for releasing brake pressure of a high-pressure mode by backward movement of a hydraulic piston according to a fourth embodiment of the present disclosure.
Figure 22:
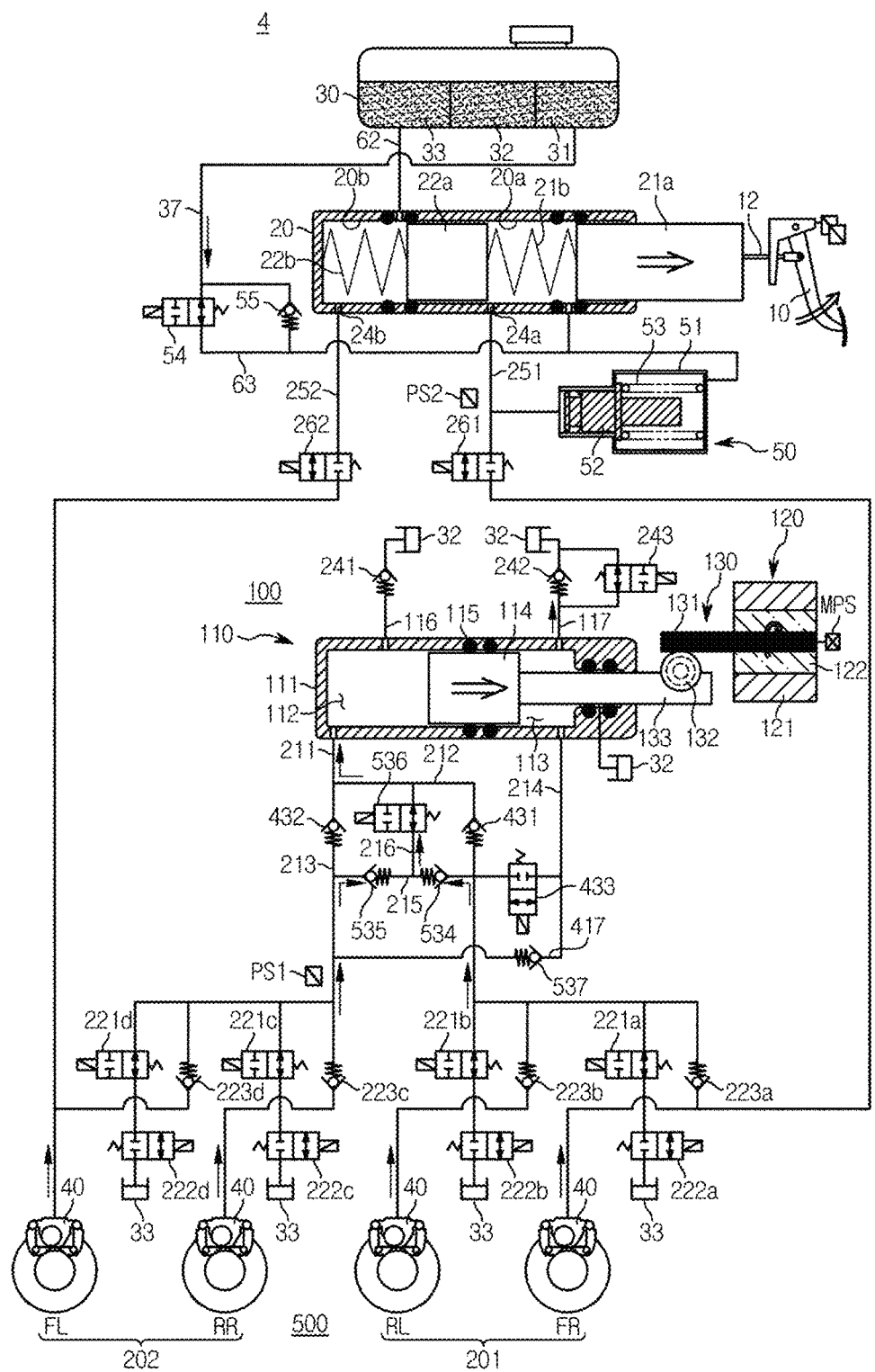
FIG. 22 is a hydraulic circuit diagram illustrating the electronic brake system for releasing brake pressure of a low-pressure mode by backward movement of a hydraulic piston according to a fourth embodiment of the present disclosure.

FIG. 21 is a hydraulic circuit diagram illustrating the electronic brake system 4 for releasing brake pressure of the high-pressure mode by backward movement of the hydraulic piston 114 according to the fourth embodiment of the present disclosure. FIG. 22 is a hydraulic circuit diagram illustrating the electronic brake system 4 for releasing brake pressure of the low-pressure mode by backward movement of the hydraulic piston 114 according to the fourth embodiment of the present disclosure.

Referring to FIG. 21, when a pedal effort applied to the brake pedal 10 is released, the motor 120 produces rotational force in an opposite direction to the braking rotation direction and transmits the rotational force to the power switching unit 130, the worm shaft 131, the worm wheel 132, and the drive shaft 133 of the power switching unit 130 may rotate in the opposite direction to the braking rotation direction, such that the hydraulic piston 114 moves back to an original position thereof. As a result, hydraulic pressure from the first pressure chamber 112 may be released, or a negative pressure may occur in the first pressure chamber 112. Simultaneously, a hydraulic pressure discharged from the wheel cylinders 40 may be transmitted to the first pressure chamber 112 through the first and second hydraulic circuits 201 and 202.

In more detail, a negative pressure produced in the first pressure chamber 112 may release a pressure from the wheel cylinders 40 mounted to the first hydraulic circuit 201 after passing through the second hydraulic passage 212, the fifth hydraulic passage 215, the fifth hydraulic passage 216, and the first hydraulic passage 211. In this case, the first and second inlet valves 221a and 221b respectively installed in two passages branched from the first hydraulic circuit 201 may remain open, and the first and second outlet valves 222a and 222b respectively installed in two passages branched from the second hydraulic circuit 202 may remain closed, such that the pressure medium of the reservoir 30 is prevented from flowing into the first pressure chamber 112. In this case, the sixth valve 536 provided in the fifth hydraulic passage 216 may be controlled to be open.

In addition, a negative pressure produced in the first pressure chamber 112 may release a pressure from the wheel cylinders 40 mounted to the second hydraulic circuit 202 after passing through the third hydraulic passage 213, the fourth hydraulic passage 215, the fifth hydraulic passage 216, and the first hydraulic passage 211. In this case, the first and second inlet valves 221*a* and 221*b* respectively installed in two passages branched from the second hydraulic circuit 202 may remain open, and the first and second outlet valves 222*a* and 222*b* respectively installed in two passages branched from the second hydraulic circuit 202 may remain closed, such that the pressure medium of the reservoir 30 is prevented from flowing into the first pressure chamber 112.

Meanwhile, the third valve 433 may also transition to the open state and the sixth hydraulic passage 214 may be open, such that the first pressure chamber 112 may communicate with the second pressure chamber 113.

That is, in order to form a negative pressure in the first pressure chamber 112, the hydraulic piston 114 should move backward. However, when hydraulic pressure of the pressure medium is present in the second pressure chamber 113, unexpected resistance may occur in backward movement of the hydraulic piston 114. Therefore, the third valve 433 may transition to the open state in a manner that the first pressure chamber 112 may communicate with the second pressure chamber 113, such that the pressure medium of the second pressure chamber 113 may flow into the first pressure chamber 112.

In this case, the third dump valve 243 may transition to the closed state. Since the third dump valve 243 is closed, the pressure medium of the second pressure chamber 113 may be discharged only to the fourth hydraulic passage 214. However, the third dump valve 243 may remain open as necessary, such that the pressure medium of the second pressure chamber 113 may also flow into the reservoir 30.

In addition, when a negative pressure applied to each of the first and second hydraulic circuits 201 and 202 is measured to be higher than a target pressure release value corresponding to a released pedal effort of the brake pedal 10, at least one of the first to fourth outlet valves 222 is open, such that the resultant pressure may be controlled to correspond to the target pressure value. In addition, the first and second cut valves 261 and 262 respectively installed in the first and second backup passages 251 and 252 may be closed, such that a negative pressure produced in the master cylinder 20 may not be transmitted to the hydraulic control unit 200.

Meanwhile, during a high-pressure mode shown in FIG. 21, not only the pressure medium stored in the wheel cylinders 40 but also the pressure medium stored in the second pressure chamber 113 may be supplied to the first pressure chamber 112 due to a negative pressure produced in the first pressure chamber 112 affected by backward movement of the hydraulic piston 114, such that a pressure reduction rate of the wheel cylinders 40 is at a low level. Therefore, it may be difficult to rapidly release brake pressure in the high-pressure mode. As a result, the operation for releasing brake pressure of the high-pressure mode may be used only in a high-pressure situation of the brake pressure. In order to rapidly release a brake pressure that is equal to or less than a predetermined brake pressure, the operation mode may transition to the operation for releasing brake pressure in the low-pressure mode shown in FIG. 22.

Referring to FIG. 22, when the brake pressure is released in the low-pressure mode, the third dump valve 243 may transition to the open state or may remain open, instead of closing the sixth hydraulic passage 214 affected by the third valve 433 that remains closed or transitions to the closed state, such that the second pressure chamber 113 may communicate with the reservoir 30.

When the brake pressure is released in the low-pressure mode, a negative pressure produced in the first pressure chamber 112 may be used only to recover (or retrieve) the pressure medium of the wheel cylinders 40, such that a pressure reduction rate per stroke of the hydraulic piston 114 may be increased more than in the other case in which a brake pressure is released in the high-pressure mode. In this case, hydraulic pressure produced in the second pressure chamber 113 by backward movement of the hydraulic piston 114 may be transmitted to the reservoir 30 due to the open state of the third dump valve 243.

An inspection mode of the electronic brake system 4 according to the fourth embodiment of the present disclosure will hereinafter be described.

The inspection mode may include a first inspection mode for inspecting the presence or absence of a leak in the simulation device 50, and a second inspection mode for inspecting the presence or absence of air in the master cylinder 20.

The inspection mode may inspect the presence or absence of a leak either in the master cylinder 20 or in the simulation device 50. The electronic brake system according to this embodiment may perform the inspection mode before the vehicle starts driving or during traveling or stopping of the vehicle, such that the electronic brake system may periodically or frequently inspect the presence or absence of device malfunction.

Figure 23:
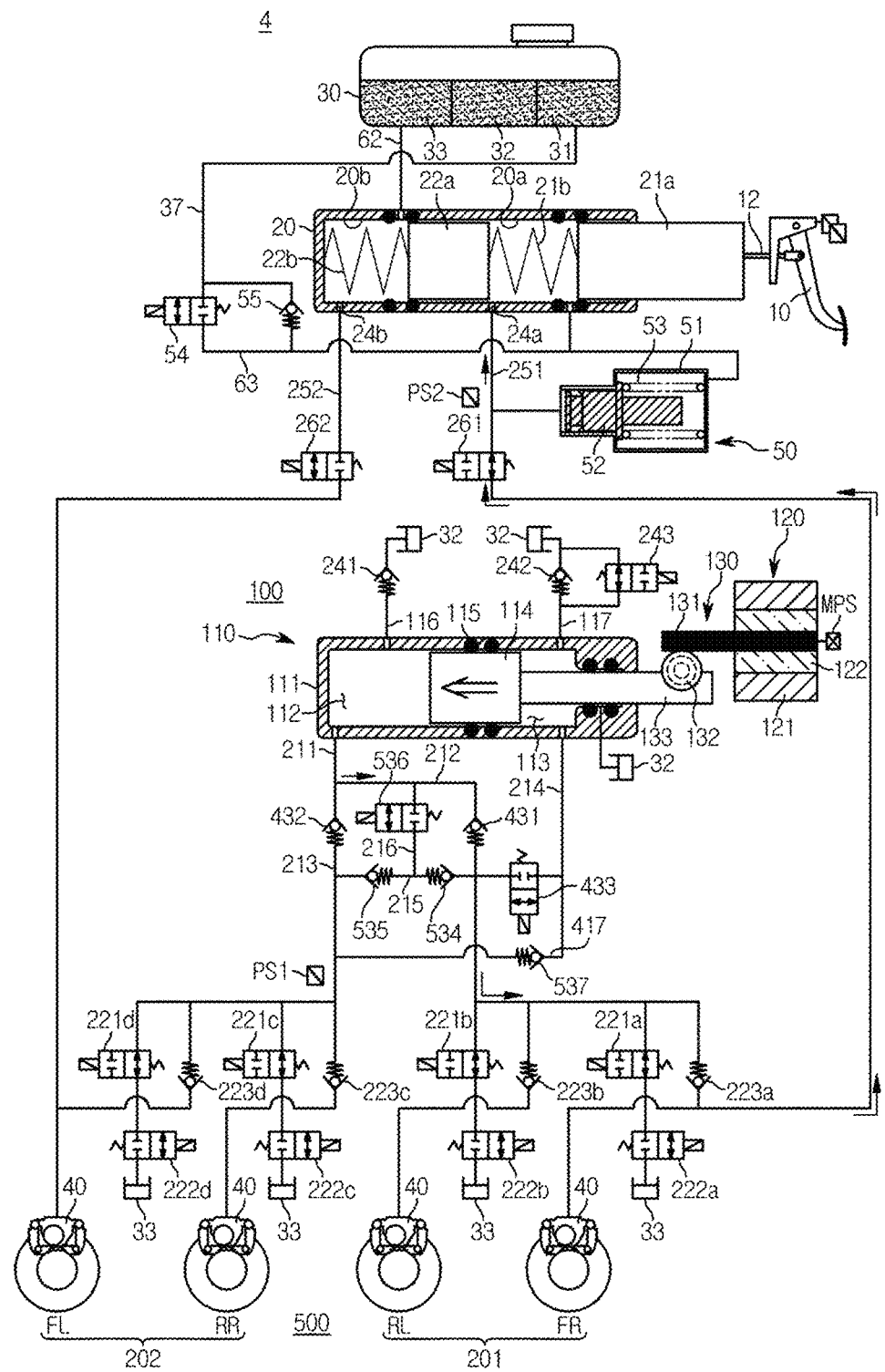
FIG. 23 is a hydraulic circuit diagram illustrating an operation state of the electronic brake system staying in an inspection mode according to a fourth embodiment of the present disclosure.

FIG. 23 is a hydraulic circuit diagram illustrating an operation state of the electronic brake system 4 configured to inspect the presence or absence of a leak either in the master cylinder 20 or in the simulator valve 54 according to the fourth embodiment of the present disclosure.

Referring to FIG. 23, during the inspection mode, the electronic brake system 4 may be controlled in a manner that individual valves are controlled to return to the initial braking stage in which the valves do not operate, and may supply hydraulic pressure only to the first backup passage 251 connected to the simulation 50 from among the first and second backup passages 251 and 252. Therefore, the second cut valve 262 may transition to the closed state so as to prevent hydraulic pressure discharged from the hydraulic-pressure supply device 100 from flowing into the master cylinder 20 through the second backup passage 252. In addition, since the simulator valve 54 transitions to the closed state, the hydraulic pressure flowing from the hydraulic-pressure supply device 100 to the master cylinder 20 is prevented from leaking to the reservoir 30 through the simulation device 50 and the first reservoir passage 61.

During the inspection mode, the ECU may generate hydraulic pressure using the hydraulic-pressure supply device 100, and may analyze a pressure value of the master cylinder 20 measured by the backup-passage pressure sensor PS1, such that the ECU may determine the presence or absence of a leak either in the master cylinder 20 or in the simulation device 50. The ECU may compare a pressing-medium hydraulic pressure value estimated to be generated in response to the operation of the hydraulic-pressure supply device 100 with an actual inner pressure of the first master chamber 20*a* measured by the backup-passage pressure sensor PS1, such that the ECU may diagnose the presence or absence of a leak or air in the master cylinder 20, and may also diagnose the presence or absence of a leak in the simulation device 50. In more detail, the ECU may compare a first hydraulic pressure value of the first pressure chamber 112, that is calculated and estimated based on the operation of the hydraulic-pressure supply device 100 with a second hydraulic pressure value actually measured by the backup-passage pressure sensor PS1. If two hydraulic pressure values (i.e., the first hydraulic pressure value and the second hydraulic pressure value) are identical to each other, the ECU may determine the absence of a leak in the master cylinder 20 or in the simulator valve 54 and may also determine the absence of the air in the master cylinder 20. In contrast, when the first hydraulic pressure value is lower than the second hydraulic pressure value, this means that some parts of hydraulic pressure of the pressure medium supplied to the first master chamber 20*a* are lost, such that the ECU may determine the presence of a leak either in the master cylinder 20 or in the simulator valve 54 or the presence of air in the master cylinder 20, and may inform the driver of the result of determination.

An electronic brake system 5 according to the fifth embodiment of the present disclosure will hereinafter be described.

In the following detailed description of the electronic brake system 5 according to the fifth embodiment, the remaining parts other than other constituent elements denoted by different reference numbers not shown in the electronic brake system 4 of the fourth embodiment are identical to those of the electronic brake system 4 of the fourth embodiment, and as such a detailed description thereof will herein be omitted to avoid redundant description thereof.

Figure 24:
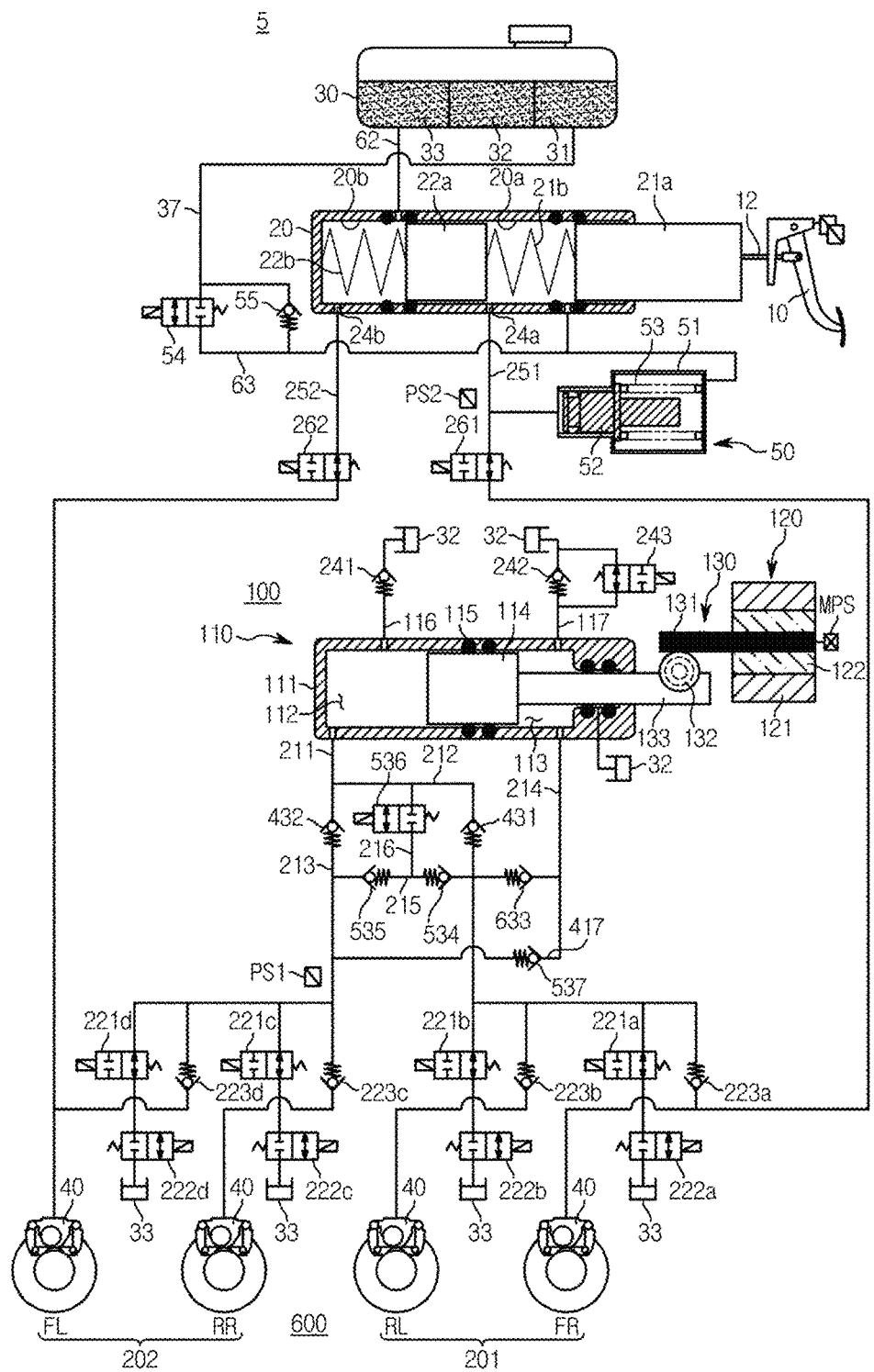
FIG. 24 is a hydraulic circuit diagram illustrating an electronic brake system according to a fifth embodiment of the present disclosure.

FIG. 24 is a hydraulic circuit diagram illustrating the electronic brake system 5 according to the fifth embodiment of the present disclosure.

Referring to FIG. 24, the first hydraulic passage 211 may be provided to connect the first pressure chamber 112 to the first and second hydraulic circuits 201 and 202. The first hydraulic passage 211 may be branched into a second hydraulic passage 212 communicating with the first hydraulic circuit 201 and a third hydraulic passage 213 communicating with the second hydraulic circuit 202. As a result, hydraulic pressure generated by the first pressure chamber 112 according to forward movement of the hydraulic piston 114 may be transmitted to the first hydraulic circuit 201 and the second hydraulic circuit 202 through the second hydraulic passage 212 and the third hydraulic passage 213.

The second hydraulic passage 212 may be provided with a first valve 431 to control flow of the pressure medium, and the third hydraulic passage 213 may be provided with a second valve 432 to control flow of the pressure medium. The first and second valves 431 and 432 may be implemented as check valves that allow a pressure medium to flow from the first pressure chamber 112 to the first and second hydraulic circuits 201 and 202 and prevent the pressure medium from flowing from the first and second hydraulic circuits 201 and 202 to the first pressure chamber 112. That is, the first and second valves 431 and 432 may allow hydraulic pressure of the first pressure chamber 112 to flow into the first and second hydraulic circuits 201 and 202, and may prevent hydraulic pressure of the first and second hydraulic circuits 201 and 202 from leaking to the first pressure chamber 112 through the second and third hydraulic passages 212 and 213.

The sixth hydraulic passage 214 may connect the second pressure chamber 113 to the first hydraulic circuit 201, and may be provided by branching of a seventh hydraulic passage 417. The seventh hydraulic passage 417 may be branched from the front end of a third valve 633 on the sixth hydraulic passage 214, and may be connected to the rear end of the second valve 432 on the third hydraulic passage 213. In addition, both ends of the fourth hydraulic passage 215 may respectively communicate with the rear ends of the first and second valves 431 and 432 on the second and third hydraulic passages 212 and 213, such that the second hydraulic passage 212 may be connected to the third hydraulic passage 213. Both ends of the fifth hydraulic passage 216 may respectively communicate with the front end of the first valve 431 and the fourth hydraulic passage 215 on the second hydraulic passage 212, such that the second hydraulic passage 212 may be connected to the fourth hydraulic passage 215.

The sixth hydraulic passage 214 may be provided with the third valve 633 to flow of the pressure medium. The third valve 633 may be implemented as a check valve that allows flow of the pressure medium flowing from the second pressure chamber 113 communicating with the sixth hydraulic passage 214 to the second hydraulic passage 212 and prevents the pressure medium from flowing the second hydraulic passage 212 to the second pressure chamber 113.

The fourth hydraulic passage 215 may be provided with a fourth valve 534 and a fifth valve 535 that are used to control flow of the pressure medium.

The fourth valve 534 may be disposed between a first position connected to the fifth hydraulic passage 216 on the fourth hydraulic passage 215 and a second position connected to the second hydraulic passage 212 on the fourth hydraulic passage 215. The fourth valve 534 may be implemented as a check valve that allows the pressure medium to flow in only one direction from the second point to the first point and prevents the pressure medium from flowing in the direction from the first point to the second point.

The fifth valve 535 may be disposed between a third position connected to the fifth hydraulic passage 216 on the fourth hydraulic passage 215 and a fourth position connected to the third hydraulic passage 213 on the fourth hydraulic passage 215. The fifth valve 535 may be implemented as a check valve that allows the pressure medium to flow in only one direction from the fourth point to the third point and prevents the pressure medium from flowing in the direction from the third point to the fourth point.

The sixth valve 536 may be implemented as a bidirectional valve to control flow of the pressure medium flowing through the fifth hydraulic passage 216. The sixth valve 536 may be implemented as a normally closed (NC) solenoid valve that remains closed in a normal state and is then open upon receiving an opening signal from the ECU.

The seventh hydraulic passage 417 may be provided with a seventh valve 537 to control flow of the pressure medium.

The seventh valve 537 may be implemented as a check valve that allows the pressure medium to flow from the sixth hydraulic passage 214 communicating with the second pressure chamber 113 to the third hydraulic passage 213 and prevents the pressure medium from flowing from the third hydraulic passage 213 to the sixth hydraulic passage 214. That is, the sixth fourth valve 537 may prevent hydraulic pressure of the second hydraulic circuit 202 from leaking to the sixth hydraulic passage 214 through the seventh hydraulic passage 417.

A method for operating the electronic brake system 6 according to the sixth embodiment of the present disclosure will hereinafter be described.

In the following detailed description of the electronic brake system 6 according to the sixth embodiment, the remaining parts other than other constituent elements denoted by different reference numbers not shown in the electronic brake system 4 of the fourth embodiment are identical to those of the electronic brake system 4 of the fourth embodiment, and as such a detailed description thereof will herein be omitted to avoid redundant description thereof.

Figure 25:
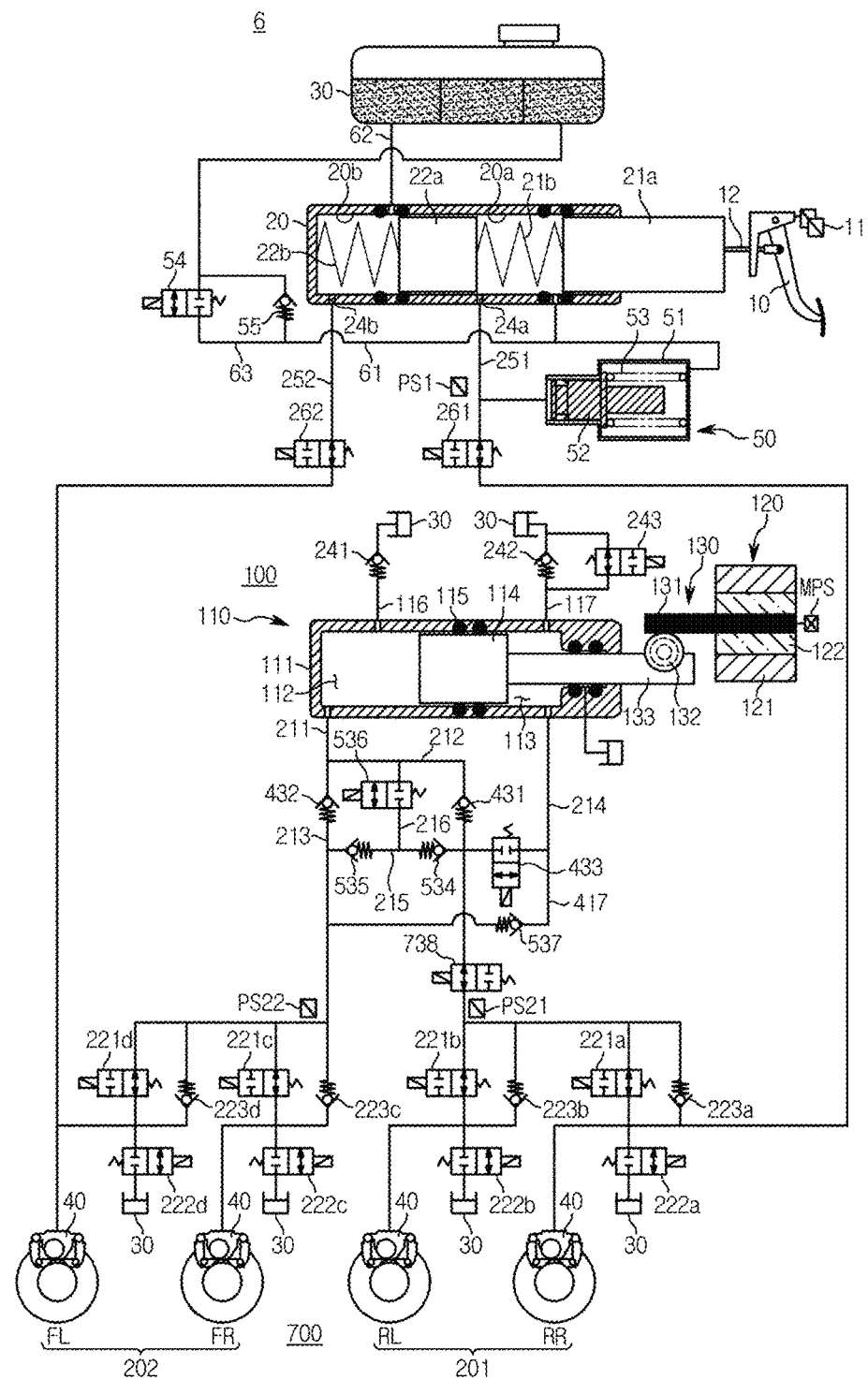
FIG. 25 is a hydraulic circuit diagram illustrating an electronic brake system according to a sixth embodiment of the present disclosure.

FIG. 25 is a hydraulic circuit diagram illustrating the electronic brake system 6 according to the sixth embodiment of the present disclosure.

Referring to FIG. 25, a hydraulic control unit 700 may further include an eighth valve 738 that is provided in the second hydraulic passage 212 to control flow of the pressure medium.

A second valve 231 and an eighth valve 738 to control flow of the pressure medium may be sequentially provided in the second hydraulic passage 212. The eighth valve 738 may be provided at the rear end of a specific position connected to the fourth hydraulic passage 212 on the second hydraulic passage 212. That is, the eighth valve 738 may be disposed between the first hydraulic circuit 201 and a specific position connected to the fourth hydraulic passage 214 on the second hydraulic passage 212. The eighth valve 738 may be implemented as a bidirectional valve to control flow of the pressure medium received through the second hydraulic passage 212. The eighth valve 738 may be implemented as a normally open (NO) solenoid valve that remains open in a normal state and is then open upon receiving a closing signal from the ECU.

The eighth valve 738 may be disposed between the pressure chamber of the hydraulic pressure generator and at least one wheel cylinder to be used for regenerative braking, such that the eighth valve 738 may selectively connect the pressure chamber to the corresponding hydraulic circuit or may selectively sever such connection between the pressure chamber and the corresponding hydraulic circuit, such that only some parts of hydraulic pressure of the pressure medium may be transmitted to the corresponding wheel cylinder. For example, as shown in FIG. 25, the eighth valve 738 may be provided in the second hydraulic passage 212 between the first pressure chamber 112 and the first hydraulic circuit 201 provided with the wheel cylinders 40 of the rear wheels RL and RR in which rear-wheel regenerative braking is implemented, such that the eighth valve 738 may selectively connect the first pressure chamber 112 to the first hydraulic circuit 201 or may selectively sever such connection between the first pressure chamber 112 and the first hydraulic circuit 201, and thus only some parts of hydraulic pressure of the pressure medium can be transmitted to the rear wheel cylinders 40.

In more detail, during the initial braking stage, if the driver depresses the brake pedal 10, the motor 120 may rotate in one direction, rotational force of the motor 120 may be transmitted to the hydraulic-pressure providing unit 110 by the power switching unit 130, the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided at four wheels through the first hydraulic circuit 201 and the second hydraulic circuit 202, resulting in occurrence of braking force.

Thereafter, when the ECU determines that regenerative braking is driven in the rear wheels (for example, in the wheel cylinders 40 of the first hydraulic circuit 201), the ECU may calculate the magnitude of a brake hydraulic pressure calculated in response to a difference between a driver-requested brake pressure and a regenerative braking pressure, and the first hydraulic circuit 201 may close the eighth valve 738 after applying hydraulic pressure corresponding to the corresponding pressure level to the rear wheel cylinders 40. Accordingly, a brake hydraulic pressure of the rear wheels in which regenerative braking has occurred may be less than in a non-operation state of the regenerative-braking.

The ECU may stably control a brake hydraulic pressure flowing from the hydraulic-pressure supply device 100 to the rear wheel cylinders 40 of the first hydraulic circuit 201 using the passage pressure sensor PS21 that senses hydraulic pressure of the first hydraulic circuit 201. In more detail, the ECU may allow the passage pressure sensor PS22 to sense a brake hydraulic pressure applied to the front wheel cylinders 40 of the second hydraulic circuit 202 that receives only a brake hydraulic pressure affected by hydraulic pressure produced from the hydraulic-pressure supply device 100, may compare the sensed brake hydraulic pressure with the brake hydraulic pressure applied to the rear wheel cylinders 40 of the first hydraulic circuit 201, and may more precisely control a rear-wheel brake hydraulic pressure that needs to be blocked or reduced by the rear wheel cylinders 40 of the first hydraulic circuit 201 during regenerative braking.

As described above, during rear-wheel regenerative braking, the ECU may control operation of the eighth valve 738, such that a brake hydraulic pressure applied to the rear wheel cylinders 40 of the first hydraulic circuit 201 can be stably adjusted according to a regenerative braking pressure. As a result, a brake pressure or braking force can be evenly applied to four wheels of the vehicle, such that stability in vehicle braking is increased and oversteer or understeer of the vehicle is prevented, resulting in increased driving stability of the vehicle.

A method for operating the electronic brake system 7 according to the seventh embodiment of the present disclosure will hereinafter be described.

In the following detailed description of the electronic brake system 7 according to the seventh embodiment, the remaining parts other than other constituent elements denoted by different reference numbers not shown in the electronic brake system 6 of the sixth embodiment are identical to those of the electronic brake system 6 of the sixth embodiment, and as such a detailed description thereof will herein be omitted to avoid redundant description thereof.

Figure 26:
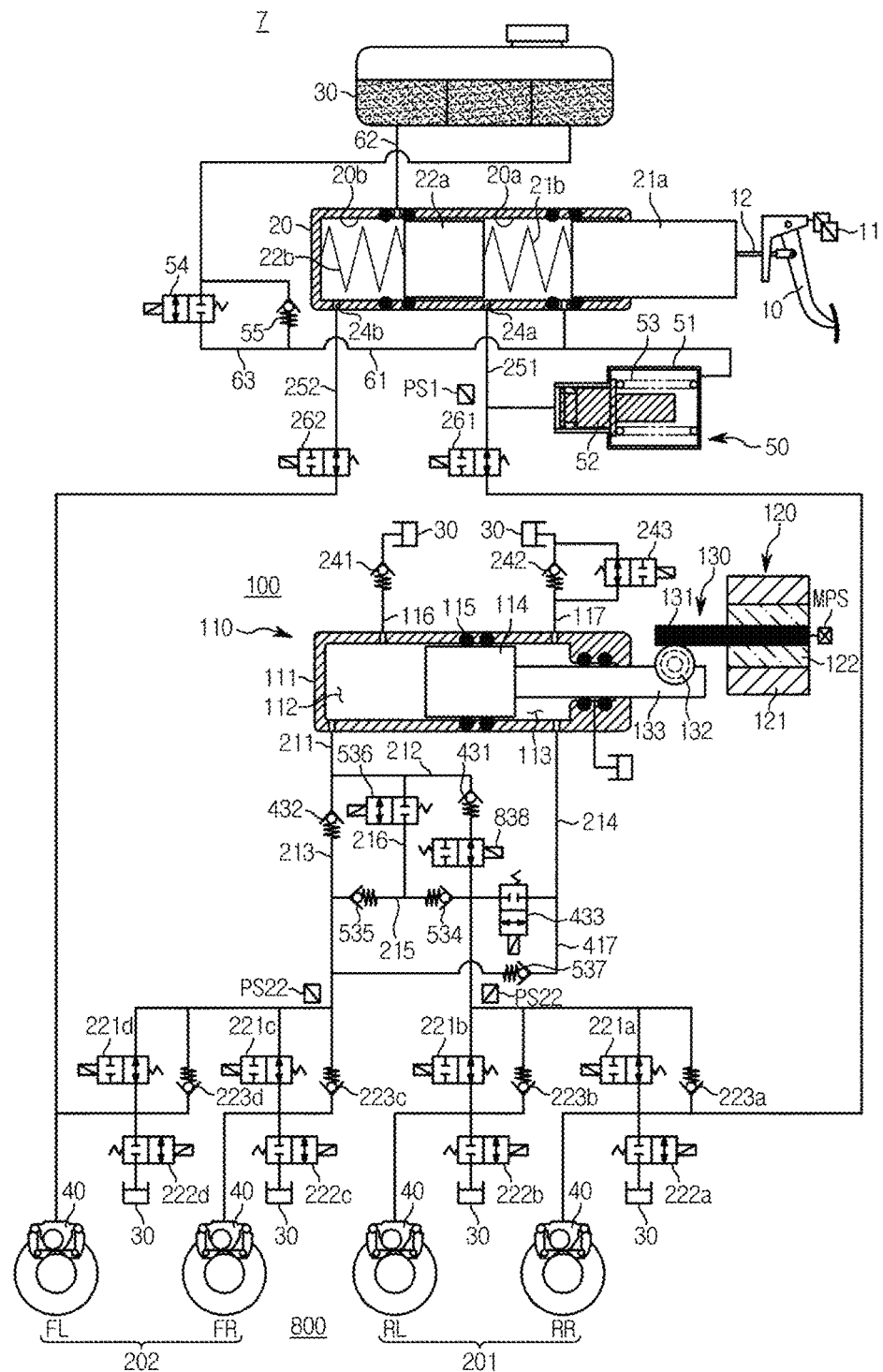
FIG. 26 is a hydraulic circuit diagram illustrating an electronic brake system according to a seventh embodiment of the present disclosure.

FIG. 26 is a hydraulic circuit diagram illustrating the electronic brake system 7 according to the seventh embodiment of the present disclosure.

Referring to FIG. 26, a hydraulic control unit 800 may further include an eighth valve 838 that is provided in the second hydraulic passage 212 to control flow of a pressure medium.

A second valve 231 and an eighth valve 838 to control flow of the pressure medium may be sequentially provided in the second hydraulic passage 212. The eighth valve 838 may be provided at the front end of a specific position connected to the fourth hydraulic passage 214 on the second hydraulic passage 212. That is, the eighth valve 838 may be disposed between the fourth hydraulic passage 214 and a specific position at which the first valve 431 is provided on the second hydraulic passage 212. The eighth valve 838 may be implemented as a bidirectional valve to control flow of the pressure medium received through the second hydraulic passage 212. The eighth valve 838 may be implemented as a normally open (NO) solenoid valve that remains open in a normal state and is then open upon receiving a closing signal from the ECU.

The eighth valve 838 may be disposed between the pressure chamber of the hydraulic pressure generator and at least one wheel cylinder to be used for regenerative braking, such that the eighth valve 838 may selectively connect the pressure chamber to the corresponding hydraulic circuit or may selectively sever such connection between the pressure chamber and the corresponding hydraulic circuit, such that only some parts of hydraulic pressure of the pressure medium may be transmitted to the corresponding wheel cylinder. For example, as shown in FIG. 26, the eighth valve 838 may be provided in the second hydraulic passage 212 between the first pressure chamber 112 and the first hydraulic circuit 201 provided with the wheel cylinders 40 of the rear wheels RL and RR in which rear-wheel regenerative braking is implemented, such that the eighth valve 838 may selectively connect the first pressure chamber 112 to the first hydraulic circuit 201 or may selectively sever such connection between the first pressure chamber 112 and the first hydraulic circuit 201, and thus only some parts of hydraulic pressure of the pressure medium can be transmitted to the rear wheel cylinders 40.

In more detail, during the initial braking stage, if the driver depresses the brake pedal 10, the motor 120 may rotate in one direction, rotational force of the motor 120 may be transmitted to the hydraulic-pressure providing unit 110 by the power switching unit 130, the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided at four wheels through the first hydraulic circuit 201 and the second hydraulic circuit 202, resulting in occurrence of braking force.

Thereafter, when the ECU determines that regenerative braking is driven in the rear wheels (for example, in the wheel cylinders 40 of the first hydraulic circuit 201), the ECU may calculate the magnitude of a brake hydraulic pressure calculated in response to a difference between a driver-requested brake pressure and a regenerative braking pressure, and the first hydraulic circuit 201 may close the eighth valve 838 after applying hydraulic pressure corresponding to the corresponding pressure level to the rear wheel cylinders 40. Accordingly, a brake hydraulic pressure of the rear wheels in which regenerative braking has occurred may be less than in a non-operation state of the regenerative-braking.

The ECU may stably control a brake hydraulic pressure flowing from the hydraulic-pressure supply device 100 to the rear wheel cylinders 40 of the first hydraulic circuit 201 using the passage pressure sensor PS21 that senses hydraulic pressure of the first hydraulic circuit 201. In more detail, the ECU may allow the passage pressure sensor PS22 to sense a brake hydraulic pressure applied to the front wheel cylinders 40 of the second hydraulic circuit 202 that receives only a brake hydraulic pressure caused by hydraulic pressure produced from the hydraulic-pressure supply device 100, may compare the sensed brake hydraulic pressure with the brake hydraulic pressure applied to the rear wheel cylinders 40 of the first hydraulic circuit 201, and may more precisely control a rear-wheel brake hydraulic pressure that needs to be blocked or reduced by the rear wheel cylinders 40 of the first hydraulic circuit 201 during regenerative braking.

As described above, during rear-wheel regenerative braking, the ECU may control operation of the eighth valve 838, such that a brake hydraulic pressure applied to the rear wheel cylinders 40 of the first hydraulic circuit 201 can be stably adjusted according to a regenerative braking pressure. As a result, a brake pressure or braking force can be evenly applied to four wheels of the vehicle, such that stability in vehicle braking is increased and oversteer or understeer of the vehicle is prevented, resulting in increased driving stability of the vehicle.

As is apparent from the above description, the electronic brake system and the method for operating the same according to the embodiments of the present disclosure may stably distribute a brake pressure to wheels of a vehicle during regenerative braking of the vehicle.

The electronic brake system and the method for operating the same according to the embodiments of the present disclosure may improve driving stability of a vehicle.

The electronic brake system and the method for operating the same according to the embodiments of the present disclosure may stably and efficiently brake a vehicle in various driving situations.

The electronic brake system and the method for operating the same according to the embodiments of the present disclosure may stably generate high brake pressure.

The electronic brake system and the method for operating the same according to the embodiments of the present disclosure may increase performance and operational stability of a product.

The electronic brake system and the method for operating the same according to the embodiments of the present disclosure may provide stable brake pressure in an abnormal state of constituent elements or in a leakage state of a pressure medium.

The electronic brake system according to the embodiments of the present disclosure may be simplified in structure, may reduce the number of constituent elements, such that the size and weight of a product can be reduced.

The electronic brake system and the method for operating the same according to the embodiments of the present disclosure may improve product durability by reducing load applied to constituent elements.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electronic brake system comprising:
    a hydraulic-pressure supply device configured to generate a hydraulic pressure by operating a hydraulic piston using an electric signal that is output in response to a displacement of a brake pedal, and include a first pressure chamber formed at one side of the hydraulic piston movably disposed in a cylinder block, and a second pressure chamber formed at the other side of the hydraulic piston; and
    a hydraulic control unit configured to include a first hydraulic circuit to control a hydraulic pressure applied to two wheel cylinders of front wheels, and a second hydraulic circuit to control a hydraulic pressure applied to two other wheel cylinders of rear wheels,
    wherein the hydraulic control unit includes:
    a first hydraulic passage configured to communicate with the first pressure chamber;
    second and third hydraulic passages branched from the first hydraulic passage, and respectively connected to the first and second hydraulic circuits;
    a fourth hydraulic passage configured to connect the second hydraulic passage to the third hydraulic passage; and a fifth hydraulic passage configured to connect the second hydraulic passage to the fourth hydraulic passage, wherein the electronic brake system further comprises a first valve provided in the second hydraulic passage to control flow of a pressure medium provided to the two other cylinders of the rear wheels.

2. The electronic brake system according to claim 1, wherein the hydraulic control unit includes:
a sixth hydraulic passage connected to the second hydraulic passage while communicating with the second pressure chamber.

3. The electronic brake system according to claim 2, wherein the hydraulic control unit includes:
second valve provided in the second hydraulic passage to control flow of a pressure medium;
a third valve provided in the third hydraulic passage to control flow of a pressure medium;
a fourth valve provided in the sixth hydraulic passage to control flow of a pressure medium;
a fifth valve disposed between one position connected to the fifth hydraulic passage on the fourth hydraulic passage and another position connected to the second hydraulic passage on the fourth hydraulic passage;
a sixth valve disposed between one position connected to the fifth hydraulic passage on the fourth hydraulic passage and another position connected to the third hydraulic passage on the fourth hydraulic passage; and
a seventh valve provided in the fifth hydraulic passage.

4. The electronic brake system according to claim 3, wherein:
each of the first, fourth, and seventh valves is provided as a solenoid valve to control bidirectional flow of the pressure medium;
the second valve is provided as a check valve that allows only flow of the pressure medium flowing from the first pressure chamber to the first hydraulic circuit;
the third valve is provided as a check valve that allows only flow of the pressure medium flowing from the first pressure chamber to the second hydraulic circuit;
the fifth valve is provided as a check valve that allows only flow of the pressure medium flowing from the second hydraulic passage to the position connected to the fifth hydraulic passage; and
the sixth valve is provided as a check valve that allows only flow of the pressure medium flowing from the third hydraulic passage to the position connected to the fifth hydraulic passage.

5. The electronic brake system according to claim 4, further comprising:
a generator provided in two wheel cylinders of the first hydraulic circuit.

6. The electronic brake system according to claim 5, further comprising:
a reservoir configured to store a pressure medium therein;
a master cylinder configured to include a master chamber and a master piston, wherein the master piston is provided to form a displacement changeable by operation of a brake pedal, pressurizes the pressure medium stored in the master chamber, and discharges the pressurized pressure medium;
a simulation device configured to include a simulation chamber and a simulation piston, wherein the simulation piston is provided to form a displacement changeable by the pressure medium discharged from the master chamber, pressurizes the pressure medium stored in the simulation chamber, and discharges the pressurized pressure medium; and a reservoir passage through which the master chamber, the simulation chamber, and the reservoir communicate with one another.

7. The electronic brake system according to claim 6, further comprising:
a simulator check valve provided in the reservoir passage, and allows the pressure medium to flow in only one direction from the reservoir to the master chamber and the simulation chamber; and
a simulator valve provided in a bypass passage connected parallel to the simulator check valve on the reservoir passage, and configured to control flow of bidirectional flow of the pressure medium.

8. The electronic brake system according to claim 7, wherein:
the master piston includes a first master piston directly pressurized by the brake pedal and a second master piston indirectly pressurized by the first master piston;
the master chamber includes a first master chamber in which the first master piston is disposed and a second master chamber in which the second master piston is disposed;
the simulation piston is provided to form a displacement by operation of the pressure medium that is pressurized and discharged from the first master chamber; and
the reservoir passage is provided to allow the first master chamber, the simulation chamber, and the reservoir to communicate with one another.

9. The electronic brake system according to claim 8, wherein the simulation device further includes a reaction force spring configured to elastically support the simulation piston.

10. The electronic brake system according to claim 9, further comprising:
a first dump passage configured to connect the first pressure chamber to the reservoir;
a second dump passage configured to connect the second pressure chamber to the reservoir;
a first dump valve provided in the first dump passage to control flow of the pressure medium, and provided as a check valve that allows only flow of the pressure medium flowing from the reservoir to the first pressure chamber;
a second dump valve provided in the second dump passage to control flow of the pressure medium, and provided as a check valve that allows only flow of a pressure medium flowing from the reservoir to the second pressure chamber; and
a third dump valve provided in a bypass passage connected parallel to the second dump valve on the second dump passage so as to control flow of the pressure medium, and provided as a solenoid valve that controls bidirectional flow of the pressure medium flowing between the reservoir and the second pressure chamber.

11. The electronic brake system according to claim 10, further comprising:
a first backup passage configured to connect the first master chamber to the first hydraulic circuit;
a second backup passage configured to connect the second master chamber to the second hydraulic circuit;
a first cut valve provided in the first backup passage to control flow of the pressure medium; and
a second cut valve provided in the second backup passage to control flow of the pressure medium.

12. A method for operating the electronic brake system according to claim 11, the method comprising:
performing an abnormal operation mode, wherein the abnormal operation mode includes:
opening the first cut valve in a manner that the first master chamber communicates with the first hydraulic circuit, and
opening the second cut valve in a manner that the second master chamber communicates with the second hydraulic circuit.

13. A method for operating the electronic brake system according to claim 11, the method comprising:
performing an inspection mode in which presence or absence of a leak in the master cylinder or in the simulator valve is confirmed,
wherein the inspection mode includes:
closing the simulator valve and the second cut valve, and opening the first cut valve;
supplying a hydraulic pressure generated by activation of the hydraulic-pressure supply device to the first master chamber, and
comparing an estimated pressing-medium hydraulic pressure value scheduled to be generated based on a displacement of the hydraulic piston with a hydraulic pressure value of the pressure medium supplied to the first master chamber.

14. A method for operating the electronic brake system according to claim 8, the method comprising:
performing a normal operation mode,
wherein the normal operation mode includes:
opening the simulator valve, and
generating a displacement of the simulation piston by the pressure medium discharged from the first master chamber, and allowing the pressure medium stored in the simulation chamber to flow into the reservoir through the reservoir passage.

15. The electronic brake system according to claim 5, wherein the first valve is disposed between the first hydraulic circuit and a specific position connected to the sixth hydraulic passage on the second hydraulic passage.

16. A method for operating the electronic brake system according to claim 5, the method comprising:
performing a normal operation mode provided with a regenerative braking mode in which two wheel cylinders provided at the first hydraulic circuit perform a regenerative braking mode using the generator,
wherein the regenerative braking mode closes the first valve and thus prevents a hydraulic pressure from flowing into the first hydraulic circuit.

17. A method for operating the electronic brake system according to claim 4, the method comprising:
performing a normal operation mode, wherein the normal operation mode is classified into a low-pressure mode for providing a relatively low hydraulic pressure and a high-pressure mode for providing a relatively high hydraulic pressure according to a level of a hydraulic pressure flowing from the hydraulic-pressure supply device to the wheel cylinders, and controls the low-pressure mode and the high-pressure mode to be sequentially carried out according to the level of the hydraulic pressure flowing from the hydraulic-pressure supply device to the wheel cylinders.

18. The method according to claim 17, wherein the low-pressure mode includes:
opening the first valve; and
supplying a hydraulic pressure formed in the first pressure chamber by forward movement of the hydraulic piston, to the first hydraulic circuit and the second hydraulic circuit.

19. The method according to claim 18, wherein the high-pressure mode includes:
opening the first valve;
after lapse of the low-pressure mode, supplying some parts of the hydraulic pressure formed in the first pressure chamber by forward movement of the hydraulic piston, to the first hydraulic circuit and the second hydraulic circuit;
opening the sixth valve; and
supplying some parts of a remaining hydraulic pressure of the hydraulic pressure formed in the first pressure chamber to the second pressure chamber.

* * * * *